(12) United States Patent
Ueno et al.

(10) Patent No.: US 7,507,011 B2
(45) Date of Patent: Mar. 24, 2009

(54) SURFACE LIGHT SOURCE EQUIPMENT AND APPARATUS USING THE SAME

(75) Inventors: Yoshihiro Ueno, Kusatsu (JP); Katsuyuki Manabe, Kyoto (JP); Masayuki Shinohara, Nagaokakyo (JP)

(73) Assignee: OMRON Corporation, Kyoto (JP)

( * ) Notice: Subject to any disclaimer, the term of this patent is extended or adjusted under 35 U.S.C. 154(b) by 155 days.

(21) Appl. No.: 11/431,943

(22) Filed: May 10, 2006

(65) Prior Publication Data

US 2008/0002432 A1 Jan. 3, 2008

Related U.S. Application Data

(63) Continuation of application No. PCT/JP2004/016266, filed on Nov. 2, 2004.

(30) Foreign Application Priority Data

Nov. 10, 2003 (JP) .............................. 2003-380295

(51) Int. Cl.
F21V 7/04 (2006.01)

(52) U.S. Cl. .................... 362/625; 362/612; 362/618

(58) Field of Classification Search ................ 362/625, 362/626, 623–624, 628, 629, 618, 612
See application file for complete search history.

(56) References Cited

U.S. PATENT DOCUMENTS

| D171,856 | S | * | 3/1954 | Mont | ...................... | D6/430 |
|---|---|---|---|---|---|---|
| 2,771,334 | A | * | 11/1956 | Wahlbom | ................ | 312/140.2 |
| 2,808,305 | A | * | 10/1957 | Jackson | .................... | 312/140.2 |
| 2,995,408 | A | * | 8/1961 | Kobrin | .................... | 312/140.2 |
| 3,140,133 | A | * | 7/1964 | Kraft | ........................ | 312/140.2 |
| 3,532,403 | A | * | 10/1970 | Koski | ...................... | 312/140.2 |

(Continued)

FOREIGN PATENT DOCUMENTS

JP          8-29623         2/1996

(Continued)

OTHER PUBLICATIONS

Patent Abstracts of Japan, Publication No. 2003-215584, Publication Date: Jul. 30, 2003, 36 pages.

(Continued)

*Primary Examiner*—Sandra L. O'Shea
*Assistant Examiner*—Gunyoung T. Lee
(74) *Attorney, Agent, or Firm*—Osha • Liang LLP

(57) ABSTRACT

A surface light source equipment includes a light source and a light conductive plate having a light outgoing surface from which a light introduced from the light source outgoes. The light conductive plate is configured so tat the outgoing light is spread across substantially the entire surface of the light outgoing surface, and a plurality of patterns for reflection of a light conducted in the light conductive plate is formed on an opposite surface to the light outgoing surface of the light conductive plate. The respective patterns are structured such that, as viewed from a direction perpendicular to the light outgoing surface, a light is incident from a substantially fixed direction determined for every pattern. Each of the patterns has an inclined surface on a light incident side. The inclined surface substantially wholly shields both side surfaces of the pattern, as viewed from a direction of light incidence.

6 Claims, 63 Drawing Sheets

U.S. PATENT DOCUMENTS

| | | | | |
|---|---|---|---|---|
| 3,588,209 | A * | 6/1971 | Nathan | 312/140.2 |
| 3,841,728 | A * | 10/1974 | Petersen et al. | 312/140.2 |
| D258,478 | S * | 3/1981 | Zola | D6/481 |
| 4,437,714 | A * | 3/1984 | Struck | 312/281 |
| 4,747,644 | A * | 5/1988 | Gallery et al. | 312/140 |
| D306,664 | S * | 3/1990 | Pouch | D6/429 |
| 5,353,716 | A * | 10/1994 | Wilbert | 108/150 |
| 5,382,087 | A * | 1/1995 | Pouch | 312/140.2 |
| 5,405,192 | A * | 4/1995 | McGrath | 312/108 |
| 5,518,127 | A * | 5/1996 | Warmack et al. | 211/193 |
| D375,216 | S * | 11/1996 | Intardonato | D6/481 |
| 5,575,549 | A * | 11/1996 | Ishikawa et al. | 362/625 |
| 5,582,471 | A * | 12/1996 | Lin | 312/211 |
| 5,915,602 | A * | 6/1999 | Nelson | 222/608 |
| D419,000 | S * | 1/2000 | Galloway | D6/481 |
| 6,039,414 | A * | 3/2000 | Melane et al. | 312/205 |
| 6,167,182 | A * | 12/2000 | Shinohara et al. | 385/129 |
| 6,196,712 | B1 * | 3/2001 | Elm | 366/197 |
| D449,750 | S * | 10/2001 | Antonioni | D6/481 |
| 6,334,689 | B1 * | 1/2002 | Taniguchi et al. | 362/619 |
| 6,402,334 | B1 * | 6/2002 | Yu-San | 362/619 |
| 6,454,452 | B1 * | 9/2002 | Sasagawa et al. | 362/561 |
| 6,485,157 | B2 * | 11/2002 | Ohkawa | 362/625 |
| 6,576,887 | B2 * | 6/2003 | Whitney et al. | 250/227.11 |
| 6,632,317 | B1 * | 10/2003 | Hofer | 156/293 |
| 6,684,576 | B2 * | 2/2004 | Grandin | 52/36.1 |
| D488,650 | S * | 4/2004 | Muenzberg | D6/495 |
| 6,746,129 | B2 * | 6/2004 | Ohkawa | 362/625 |
| 6,755,546 | B2 * | 6/2004 | Ohkawa | 362/626 |
| 6,774,964 | B2 * | 8/2004 | Funamoto et al. | 349/113 |
| 6,960,009 | B2 * | 11/2005 | Shinohara et al. | 362/601 |
| 7,121,709 | B2 * | 10/2006 | Shinohara et al. | 362/606 |
| 7,163,330 | B2 * | 1/2007 | Matsui et al. | 362/603 |
| 7,195,389 | B2 * | 3/2007 | Parker et al. | 362/606 |

FOREIGN PATENT DOCUMENTS

| | | |
|---|---|---|
| JP | 2003-187620 | 7/2003 |
| JP | 2003-215584 | 7/2003 |
| JP | 2004-227913 | 8/2004 |

OTHER PUBLICATIONS

Patent Abstracts of Japan, Publication No. 08-029623, Publication Date: Feb. 2, 1996, 18 pages.
Patent Abstracts of Japan, Publication No. 2004-227913, Publication Date: Aug. 12, 2004, 31 pages.
International Search Report issued for International Appl. No. PCT/JP2004/016266 mailed on Dec. 28, 2004 and English translation thereof, 4 pages.
European Search Report dated Jul. 5, 2007 issued in PCT/JP2004016266, 3 pages.
Patent Abstracts of Japan, Publication No. 2003-187620, Publication Date: Jul. 4, 2003, 1 page.

* cited by examiner

— COVENTIONAL EXAMPLE

— EMBODIMENT 1

— Embodiment 1
— Conventional Example

ANGLE (deg.)

ANGLE (deg.)

Figure 35. (a)
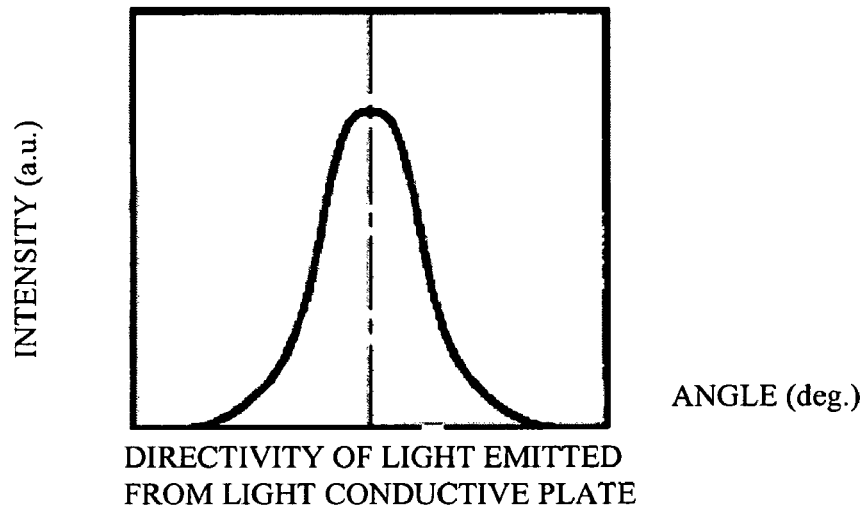
DIRECTIVITY OF LIGHT EMITTED
FROM LIGHT CONDUCTIVE PLATE
Figure 35. (b)
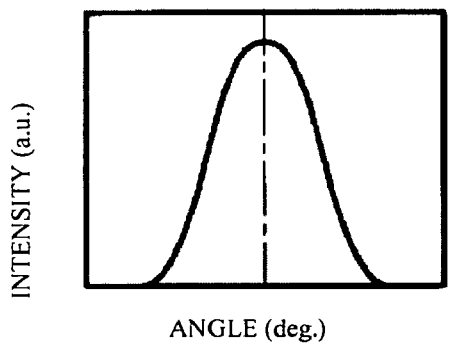
DIFFUSION CHARACTERISTIC OF
DIFFUSION PLATE
Figure 35. (b)'
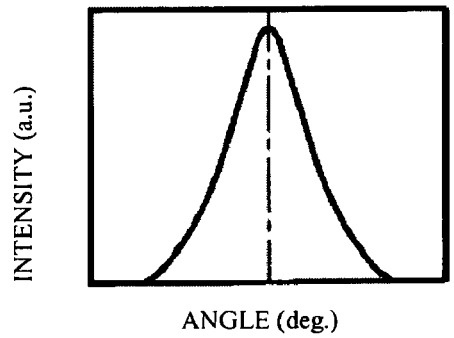
DIRECTIVITY OF LIGHT TRANSMITTED
THROUGH DIFFUSION PLATE
Figure 35. (c)
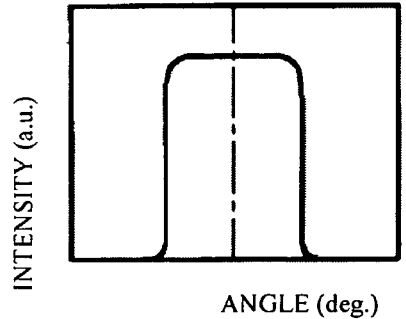
DIFFUSION CHARACTERISTIC OF
DIFFUSION PLATE
Figure 35. (c)'
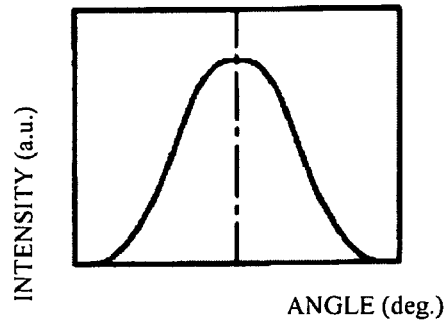

Figure 35. (d)

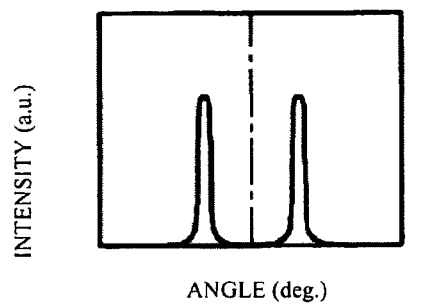

DIFFUSION CHARACTERISTIC OF
DIFFUSION PLATE

Figure 35. (d)'

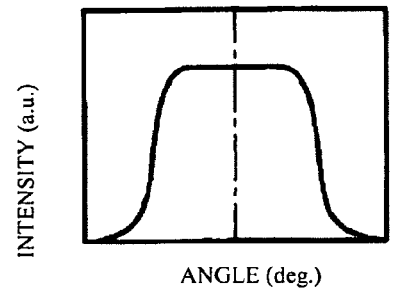

DIRECTIVITY OF LIGHT TRANSMITTED
THROUGH DIFFUSION PLATE

Figure 36. (a)

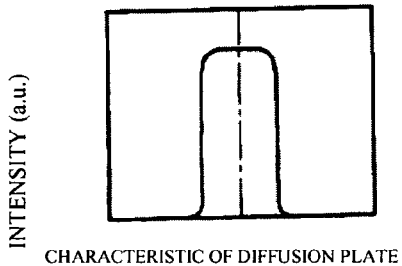

CHARACTERISTIC OF DIFFUSION PLATE

Figure 36. (b)

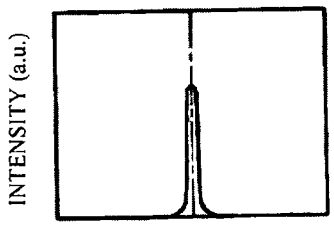

CHARACTERISTIC OF LIGHT OUTGOING
FROM LIGHT CONDUCTIVE PLATE

Figure 36. (b)'

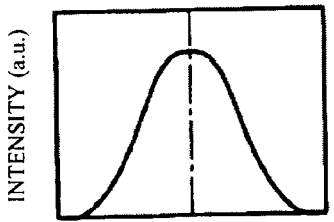

CHARACTERISTIC OF LIGHT OUTGOING
FROM LIGHT CONDUCTIVE PLATE

Figure 36. (c)

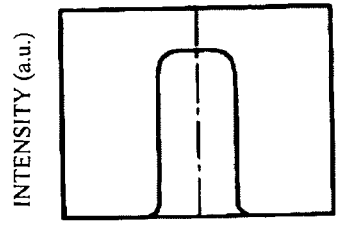

CHARACTERISTIC OF LIGHT TRANSMITTED THROUGH
LIGHT CONDUCTIVE PLATE AND DIFFUSION PLATE

Figure 36. (c)'

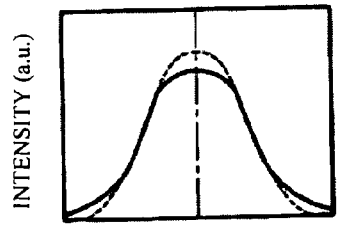

CHARACTERISTIC OF LIGHT TRANSMITTED THROUGH
LIGHT CONDUCTIVE PLATE AND DIFFUSION PLATE

DIFFUSION CHARACTERISTIC OF REFLECTION TYPE
LIQUID-CRYSTAL DISPLAY PANEL

OUTGOING ANGLE

OUTGOING LIGHT ANGLE CHARACTERISTIC OF
LIGHT CONDUCTIVE PLATE

OUTGOING ANGLE

OUTGOING LIGHT ANGLE CHARACTERISTIC FROM
REFLECTION TYPE LIQUID-CRYSTAL PANEL

OUTGOING ANGLE

SURFACE LIGHT SOURCE EQUIPMENT AND APPARATUS USING THE SAME

TECHNICAL FIELD

The present invention relates to a surface light source equipment, and more particular, to a surface light source equipment used as a backlight or a front light for image display units, lighting fitting, etc. Also, the invention relates to an apparatus using the surface light source equipment.

BACKGROUND ART

A surface light source equipment is used as a backlight for transmission type liquid-crystal display panels, etc. A liquid-crystal display panel transmits or shields light every each pixel to thereby create a picture, but a liquid-crystal display panel itself does not posses the function of emitting a light, so that a surface light source equipment for a backlight is required.

FIG. 1 is a schematic plan view showing a conventional surface light source equipment used as a backlight. The surface light source equipment 21 comprises a light emission part 23 (such light emission part is called a point light source), in which several (preferably, one) light emission elements such as LED (light emitting diode) chips are gathered in one location to be made minute. With the surface light source equipment 21, the light emission part 23 in the form of a point light source is arranged in opposition to a side (a light incident surface 22a) of a light conductive plate 22, which is made of a transparent resin, such as polycarbonate resin, having a high refractive index. A multiplicity of diffusion patterns 24 are arranged discretely on circular arcs, which are centered on the light emission part 23 to be concentric therewith, on an underside of the light conductive plate 22. As shown in FIGS. 2 and 3(a), the respective diffusion patterns 24 are recessed in the form of a triangular groove on the underside of the light conductive plate 22 to extend in circumferential directions of virtual concentric circles centered on the light emission part 23, and normal lines to reflection surfaces 25 of the respective diffusion patterns 24 are directed parallel to directions (this direction is referred to as r axial direction), which connect between the light emission part 23 and the diffusion patterns 24, as viewed in plan view. Also, the diffusion patterns 24 are formed to be gradually increased in pattern density as they are distant from the light emission part 23.

As shown in FIG. 2, with the surface light source equipment 21, when the light emission part 23 is caused to emit light, the light L outgoing from the light emission part 23 enters the light conductive plate 22 from the light incident surface 22a to propagate to a side distant from the light emission part 23 while repeating total reflection on upper and lower surfaces of the light conductive plate 22. When the light L diffusion-reflected by reflection surfaces 25 of the diffusion patterns 24 on the lower surface of the light conductive plate 22 is incident at an incidence angle, which is smaller than a critical angle of total reflection, upon a light outgoing surface 22b on the upper surface of the light conductive plate 22, it outgoes from the light outgoing surface 22b.

With the surface light source equipment 21, the light L diffusion-reflected by the diffusion patterns 24 is diffused in a plane, which includes the r axial direction and is perpendicular to the light outgoing surface 22b, but not diffused in a direction out of the plane and advances straight as viewed in a direction perpendicular to the light outgoing surface 22b after being reflected by the diffusion patterns 24. Therefore, light outgoing in an optional orientation about the light emission part 23 is not varied in quantity even when diffused by the diffusion patterns 24, and the quantity of light transmitted in the light conductive plate 22 is determined by the quantity of light outgoing from the light emission part 23 in respective orientations. Accordingly, with such surface light source equipment 21, the light outgoing surface 22b can be wholly and uniformly made bright by making a light L having a quantity according to a distance, over which the light conductive plate 22 is transmitted, in respective orientations in the light conductive plate 22 from the light emission part 23. Therefore, by combining the surface light source equipment with a transmission type liquid-crystal display panel, it is possible to manufacture a liquid crystal display, which is excellent in visibility from a wide direction, and besides it is possible to contribute to saving of power consumption in a liquid crystal display.

The diffusion patterns 24 used in the surface light source equipment 21 is designed to be in the form of a triangular prism as shown in FIG. 3(a), and sides 26 positioned on both side ends of the reflection surfaces 25 are designed to be made perpendicular to a back surface of the light conductive plate 22. However, actually, the both sides 26 of the diffusion patterns 24 are gently inclined due to molded sagging generated when the light conductive plate 22 is molded by injection molding or the like.

When the both sides 26 of the diffusion patterns 24 are inclined, a part of the light L made incident upon the diffusion patterns 24 from the light emission part 23 is reflected by the sides 26 of the diffusion patterns 24, and the light L reflected by the sides 26 is scattered in irregular directions as shown in FIG. 3(b) to be increased in directivity, thus damaging the controllability of light, which propagates in the light conductive plate 22. Also, since the light L reflected by the sides 26 is scattered in irregular directions to become a loss light Ls, the cause for a decrease in brightness of the light outgoing surface 22b is brought about.

DISCLOSURE OF THE INVENTION

Problems that the Invention is to Solve

It is an object of the invention to make scatter of light in irregular directions hard with a diffusion pattern even in the case where molded sagging is generated on a side of the diffusion pattern.

Means for Solving the Problems

The invention provides a first surface light source equipment comprising a light source and a light conductive plate, by which a light introduced from the light source is spread on a substantially whole light outgoing surface to outgo from the light outgoing surface, and wherein a plurality of patterns for reflection of a light conducted in the light conductive plate are formed on an opposite surface to the light outgoing surface of the light conductive plate, the surface light source equipment characterized in that the respective patterns are structured so that a light is incident in a substantially fixed direction determined every pattern as viewed from a direction perpendicular to the light outgoing surface, and both side surfaces of the pattern are substantially wholly shielded by an inclined surface of the pattern, which is positioned on the light incident side, as viewed from a direction of light incidence.

With the first surface light source equipment of the invention, the respective patterns are structured so that a light is incident in a substantially fixed direction determined every pattern as viewed from a direction perpendicular to the light outgoing surface, and both side surfaces of the pattern are substantially wholly shielded by an inclined surface of the pattern, which is positioned on the light incident side, as viewed from a direction of light incidence. In a most typical case, a light conducting path as viewed from a direction perpendicular to the light outgoing surface is oriented in a fixed direction determined every location in respective locations in the light conductive plate, and as viewed from a direction perpendicular to the light outgoing surface, a light made incident upon the respective patterns from a light source advances without bending a direction of advancement, also after being reflected by the patterns. Further, as viewed from the light source, both side surfaces of the pattern are substantially wholly shielded by an inclined surface of the pattern toward the light source. Accordingly, little light strikes against the sides of the patterns in the first surface light source equipment of the invention. Therefore, even when molded sagging is generated on sides of patterns on a light conductive plate, at most a slight light is only made incident upon sides of patterns, on which molded sagging is generated, so that a light becomes hard to be scattered through the sides of patterns in an irregular direction. Therefore, with the first surface light source equipment of the invention, controllability on a light in the light conductive plate is hard to be damaged by scatter of a light on the pattern sides, and a decrease in brightness of the light outgoing surface can be improved.

The invention provides a second surface light source equipment comprising a light source and a light conductive plate, by which a light introduced from the light source is spread on a substantially whole light outgoing surface to outgo from the light outgoing surface, and wherein a plurality of patterns for reflection of a light conducted in the light conductive plate are formed on an opposite surface to the light outgoing surface of the light conductive plate, the surface light source equipment characterized in that the respective patterns are structured so that a light is incident in a substantially fixed direction determined every pattern as viewed from a direction perpendicular to the light outgoing surface, and a portion of an inclined surface positioned on the light incident side of the pattern, which portion is positioned on an opposite side to the light incident side, is shorter in width than a portion positioned on the light incident side.

With the second surface light source equipment of the invention, the respective patterns are structured so that a light is incident in a substantially fixed direction determined every pattern as viewed from a direction perpendicular to the light outgoing surface, and a portion of an inclined surface positioned on the light incident side of the pattern, which portion is positioned on an opposite side to the light incident side, is shorter in width than a portion positioned on the light incident side. In a most typical case, a light conducting path as viewed from a direction perpendicular to the light outgoing surface is oriented in a fixed direction determined every location in respective locations in the light conductive plate, and as viewed from a direction perpendicular to the light outgoing surface, a light made incident upon the respective patterns from a light source advances without bending a direction of advancement, also after being reflected by the patterns. Besides, a portion of an inclined surface of the pattern of the light conductive plate distant from a light source is shorter in width than a portion close to the light source, both side surfaces of the pattern hide behind the inclined surface of the pattern toward the light source. Accordingly, little light strikes against the sides of the patterns. Therefore, even when molded sagging is generated on sides of patterns on the light conductive plate, at most a slight light is only made incident upon sides of patterns, on which molded sagging is generated, so that a light becomes hard to be scattered through the sides of patterns in an irregular direction. Therefore, with the surface light source equipment of the invention, controllability on a light in the light conductive plate is hard to be damaged by scatter of a light on the pattern sides, and a decrease in brightness of the light outgoing surface can be improved.

With the embodiments of the first and second surface light source equipments of the invention, the light source comprises a point light source, a prism sheet is arranged on an observation side of the light conductive plate, and after a light conducted in the light conductive plate and deflected by the pattern outgoes from the light outgoing surface in a direction inclined relative to a normal line to the light outgoing surface of the light conductive plate, it is deflected by the prism sheet. Here, while a minute light emission element such as LED chips, small lamps is used for a point light source, it is not required that the light emission element be single, it may comprise a plurality of light emission elements (for example, a plurality of red, green, blue LED chips are sealed integrally), and a plurality of light sources, in which a light emission element is sealed, may be arranged close to one another. According to the embodiment, a light outgoing obliquely from the light outgoing surface of the light conductive plate can be deflected by the prism sheet to outgo in an optional direction (a direction perpendicular to the light outgoing surface).

In addition, the constituent elements of the invention can be combined as far as possible.

Effect of the Invention

According to the invention, even when molded sagging is generated on sides of the diffusion patterns formed on the light conductive plate, the light conductive plate and in its turn the surface light source equipment are made hard to be affected thereby.

BRIEF DESCRIPTION OF THE DRAWINGS

FIG. 1 is a schematic plan view showing a construction of a conventional surface light source equipment having a light emission part in the form of a point light source.

FIG. 2 is a view illustrating an action of diffusion patterns in the surface light source equipment shown in FIG. 1.

FIG. 3(a) is a perspective view showing a direction of reflection of a light when the light is incident upon an ideal diffusion pattern, and FIG. 3(b) is a perspective view showing a direction of reflection of a light when the light is incident upon a diffusion pattern, on which molded sagging is generated.

FIG. 4 is an exploded perspective view showing a construction of a surface light source equipment according to Embodiment 1 of the invention.

FIG. 5 is a schematic cross sectional view showing the surface light source equipment according to Embodiment 1.

FIG. 6 shows an arrangement of diffusion patterns formed on a light conductive plate in the surface light source equipment according to Embodiment 1.

FIG. 7(a) is a perspective view showing a single diffusion pattern in Embodiment 1, and FIG. 7(b) is a plan view showing the diffusion pattern, and FIG. 7(c) is a front view showing the diffusion pattern.

FIG. 8(a) is a partially fragmentary, plan view showing an irregular diffusion plate of a diffusion prism sheet used in the surface light source equipment according to Embodiment 1, FIG. 8(*b*) is a plan view showing repeated patterns, which form the irregular diffusion plate, and FIG. 8(*c*) is an enlarged perspective view showing a projection, which forms the repeated patterns.

FIG. 9 is a perspective view showing a prism sheet being a diffusion prism sheet used in the surface light source equipment according to Embodiment 1 as viewed from a back side.

FIG. 10 is a schematic, perspective view showing the behavior of a light in the surface light source equipment according to Embodiment 1.

FIG. 12 is a view illustrating the relationship between a quantity of a light outgoing in the range of Δθ from a light emission part, and an area of a light conductive plate in the range of Δθ.

FIG. 16 is a view illustrating the definition of molded sagging generated on a diffusion pattern.

FIG. 17 is a view illustrating the definition of a distance Rs from a light source, used in an abscissa in FIGS. 18 and 19.

FIG. 18 is a view illustrating the relationship between a distance Rs from a light source and an average width G of a diffusion pattern.

FIG. 19 is a view illustrating the relationship between a distance Rs from a light source and a ratio of molded sagging to a width of a diffusion pattern.

FIG. 21 is a view illustrating a comparison of the relationship between a distance Rs from a light source and the relative intensity of an outgoing light between Embodiment 1 and a comparative example.

FIG. 23 is a view showing a structure of a diffusion pattern, by which a light is caused to outgo vertically from a light emission surface.

FIG. 24 is a view illustrating the directivity of a light outgoing from a light conductive plate formed with the above-described diffusion pattern.

FIG. 25 is a perspective view showing the directivity of a light outgoing from the light conductive plate of FIG. 23.

FIG. 26 is a view showing radial unevenness (bright line) in brightness generated in a surface light source equipment.

FIG. 27 is a view illustrating the directivity, in a ω direction and in a φ direction, of a light transmitted through a prism sheet placed on a light conductive plate and shown in FIG. 9.

FIG. 28 is a perspective view showing the directivity of a light when the prism sheet shown in FIG. 9 is used.

FIG. 29 is a perspective view showing a surface light source equipment, in which a linear light source and a prism sheet are used, and its directivity.

FIG. 30 is a perspective view showing the directivity of a light outgoing from the surface light source equipment shown in FIG. 29.

FIG. 31 is a view illustrating the directivity of a general diffusion plate.

FIG. 32 is a view illustrating the directivity in a ω direction and in a φ direction in the case where the diffusion plate shown in FIG. 31 is placed on the prism sheet shown in FIG. 9.

FIG. 33 is a view illustrating the directivity when a parallel light is incident vertically upon the irregular diffusion plate shown in FIG. 8.

FIG. 34 is a view illustrating the directivity in a ω direction and in a φ direction in the case where the irregular diffusion plate shown in FIG. 33 is placed on the prism sheet shown in FIG. 9.

[FIG. 35] FIG. 35(*a*) is a view illustrating the directivity of a light outgoing from a light conductive plate. FIGS. 35(*b*), 35(*c*), and 35(*d*) are views illustrating the diffusion characteristic of a diffusion plate. FIGS. 35(*b*)', 35(*c*)', and 35(*d*)', respectively, are views illustrating the directivity of a light outgoing from a light conductive plate and transmitting a diffusion plate having the characteristic shown in FIGS. 35(*b*), 35(*c*), and 35(*d*).

[FIG. 36] FIG. 36(*a*) is a view illustrating the diffusion characteristic of a diffusion plate. FIGS. 36(*b*) and 36(*b*)' are views illustrating the directivity of a light outgoing from a light conductive plate. FIG. 36(*c*) is a view illustrating the directivity after a light having the directivity shown in FIG. 36(*b*) is transmitted through the diffusion plate having the directivity shown in FIG. 36(*a*). FIG. 36(*c*)' is a view illustrating the directivity after a light having the directivity shown in FIG. 36(*b*)' is transmitted through the diffusion plate having the directivity shown in FIG. 36(*a*).

FIG. 38 is a view showing a light outgoing from a light conductive plate having the diffusion pattern shown in FIG. 37.

FIG. 39 is a perspective view showing a surface light source equipment, in which a light conductive plate of another configuration is used.

FIG. 40 is an exploded, perspective view showing a construction of a surface light source equipment according to Embodiment 2 of the invention.

FIG. 41 is a view showing the behavior of a planar shape light of a light emission part used in the surface light source equipment according to Embodiment 2.

FIG. 42 is a view illustrating the directivity of a light outgoing from the light emission part shown in FIG. 41 and using a regular reflection plate on a back surface.

FIG. 43 is a view illustrating the directivity of an outgoing light in the case where the regular reflection plate on the back surface of the light emission part shown in FIG. 41 is replaced by a diffusion reflection plate.

FIG. 44 is a view illustrating a way to find a light intensity (energy) in a α direction in FIGS. 42 and 43.

FIG. 45 is a view indicating an ideal directional characteristic, a directional characteristic in case of using a prism sheet, and a directional characteristic in a x-axis direction and a y-axis direction in case of using a diffusion pattern.

FIG. 46(a) is a view illustrating a directional characteristic of a light spread in a thickness-wise direction (a z-axis direction) of a light conductive plate, FIG. 46(b) is a view illustrating a directional characteristic of a light spread in a width-wise direction (a x-axis direction) of a light conductive plate, and FIG. 46(c) is a view illustrating a directional characteristic of a light spread in the thickness-wise direction and in the width-wise direction (the z-axis direction, the x-axis direction) of a light conductive plate.

FIG. 47 is a view showing a manner, in which a light is varied in direction, when a light spread in a width-wise direction of a light conductive plate is total-reflected by a reflection surface of a diffusion pattern.

FIG. 48(a) and FIG. 48(b) are views showing a further manner, in which a light is varied in direction, when a light spread in a width-wise direction of a light conductive plate is total-reflected by a reflection surface of a diffusion pattern.

FIG. 49 is a view showing the behavior of a light transmitted through a reflection surface of a diffusion pattern and again made incident upon a light conductive plate from the back surface.

FIG. 50(a) is a view showing a direction of a light before being made indent upon a diffusion pattern. FIG. 50(b) is a view showing a direction of a light total-reflected by a reflection surface of a diffusion pattern and a light after reflection. FIG. 50(c) is a view showing a direction of a light transmitted through a reflection surface of a diffusion pattern and again made incident from the back surface, and a light after being again made incident.

FIG. 51 is a view indicating a spatial frequency of a light as viewed in a direction of advancement of a light (a y-axis direction) in a light conductive plate.

FIG. 52 is a view illustrating a directional characteristic of a light outgoing from a light outgoing surface of a surface light source equipment.

FIG. 53 is a view illustrating a way to provide a diffusion pattern in the case where a light is introduced obliquely into a light conductive plate from a light emission part.

FIG. 54 is a view illustrating a way to examine a directional characteristic of a light in a light conductive plate.

FIG. 55 is a view showing the behavior of a reflected light in a diffusion pattern (a comparative example), which is arcuate in cross section.

FIG. 56 is a view showing the behavior of a reflected light in a saw-toothed diffusion pattern (a comparative example).

FIG. 57(a) is a view showing the behavior of a light total-reflected by a reflection surface of a diffusion pattern having a cross section in the form of a right-angled triangle, and FIG. 57(b) is a view showing the behavior of a light transmitted through a front diffusion pattern and reflected by a rear diffusion pattern.

FIG. 58 is a view illustrating the relationship between an outgoing angle φ from a surface light source equipment and light intensity when an angle β of inclination of a diffusion pattern is changed to 45°, 55°, and 65°.

FIG. 59 is a view illustrating the definition of an angle β of inclination of a reflection surface of a diffusion pattern, an angle ρ of inclination of a back surface of a diffusion pattern, and an outgoing angle φ from a light outgoing surface.

FIG. 60 is a view illustrating the relationship between an outgoing angle and light intensity shown in FIG. 58, FIG. 60(a) is a view showing a manner, in which a light made incident substantially horizontally is reflected by a reflection surface, and FIG. 60(b) is a view showing a manner, in which a light made incident from under is reflected by the reflection surface.

FIG. 61(a) is a view illustrating a diffusion characteristic of a reflection type liquid-crystal display panel, FIG. 61(b) is a view illustrating an outgoing light angle intensity characteristic of a light conductive plate, and FIG. 61(c) is a view illustrating an intensity angle characteristic from an outgoing light from a reflection type liquid-crystal display element.

FIG. 62 is a view showing the behavior of a light transmitted through a reflection surface of a diffusion pattern and again made incident from a back surface thereof in the case where an angle ρ of inclination of the back surface of the diffusion pattern is small.

FIG. 63 is a view showing the behavior of a light transmitted through a reflection surface in the case where an angle ρ of inclination of a back surface of the diffusion pattern is small.

FIG. 64(a) is a schematic view showing a direction of advancement of a light introduced into a light conductive plate from a linear light source, FIG. 64(b) is a schematic view showing a direction of advancement of a light introduced into a light conductive plate from a plurality of point light sources arranged at intervals, and FIG. 64(c) is a schematic view showing a direction of advancement of a light introduced into a light conductive plate from a plurality of point light sources collected and arranged in one location.

FIG. 65 is a schematic view showing a modification of Embodiment 2.

FIG. 66 is a perspective view showing a construction of a surface light source equipment according to Embodiment 3 of the invention.

FIG. 67 is a plan view showing a manner, in which two light emission parts are made adjacent to each other and arranged in the vicinity of a light conductive plate.

FIG. 68 is a view showing a configuration of a diffusion pattern according to Embodiment 4 of the invention, FIG. 68(a) being a front view showing the configuration, FIG. 68(b) being a plan view showing the configuration, and FIG. 68(c) being a view as viewed in a direction of light incidence.

FIG. 69 is a schematic view showing a liquid-crystal display, in which a surface light source equipment according to the invention is used.

FIG. 70 is a perspective view showing a portable telephone, in which a surface light source equipment according to the invention is used.

FIG. 71 is a perspective view showing a portable information terminal, in which a surface light source equipment according to the invention is used.

DESCRIPTION OF REFERENCE NUMERALS AND SIGNS

Figure 1:
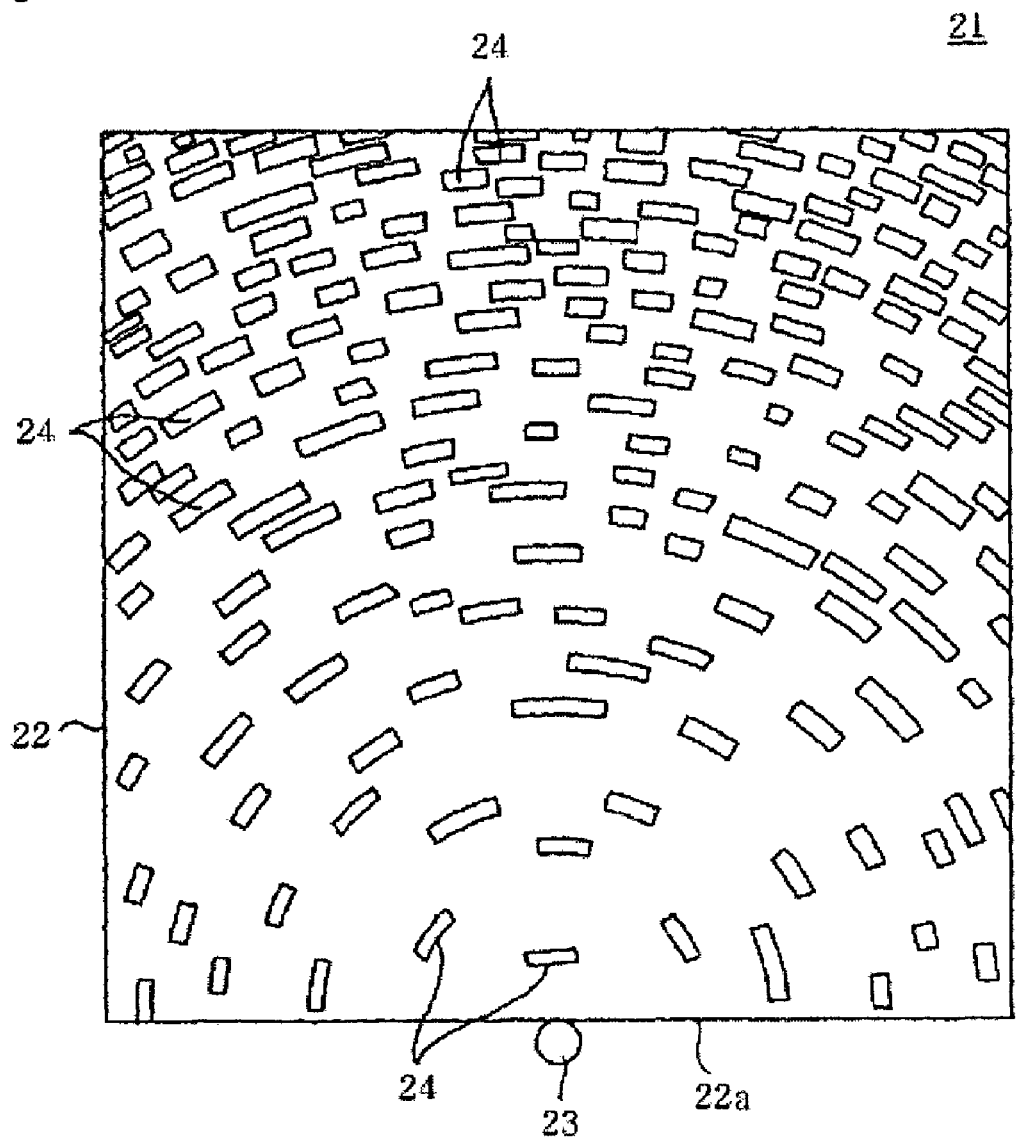
[FIG. 1]
Figure 2:
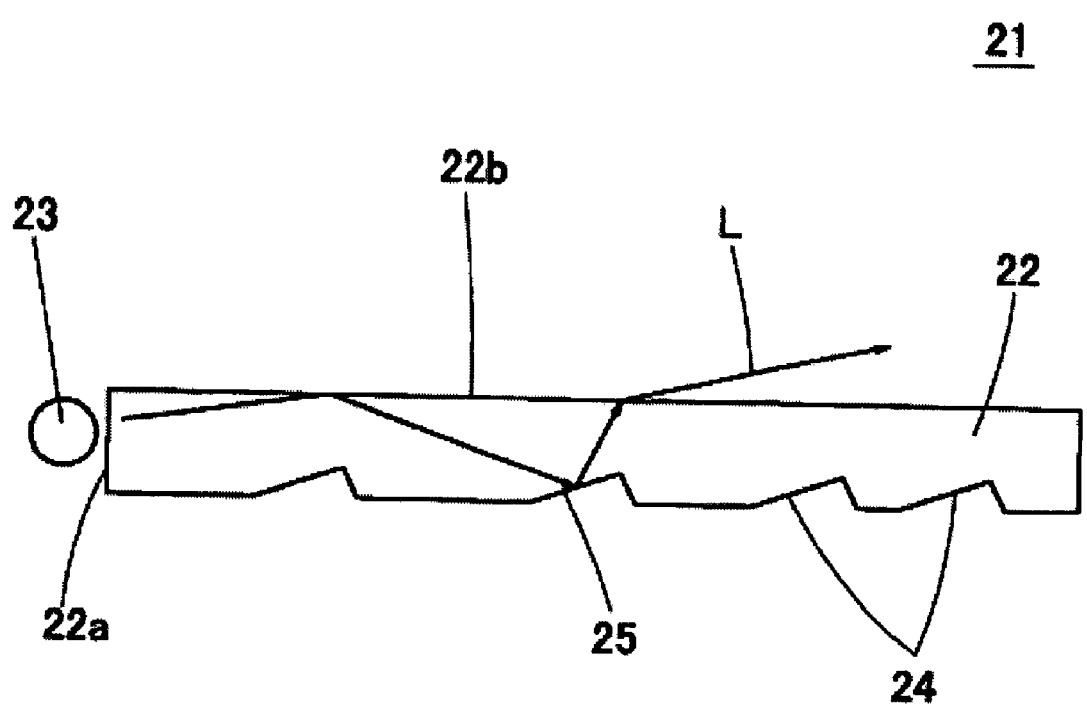
[FIG. 2]
Figure 3:
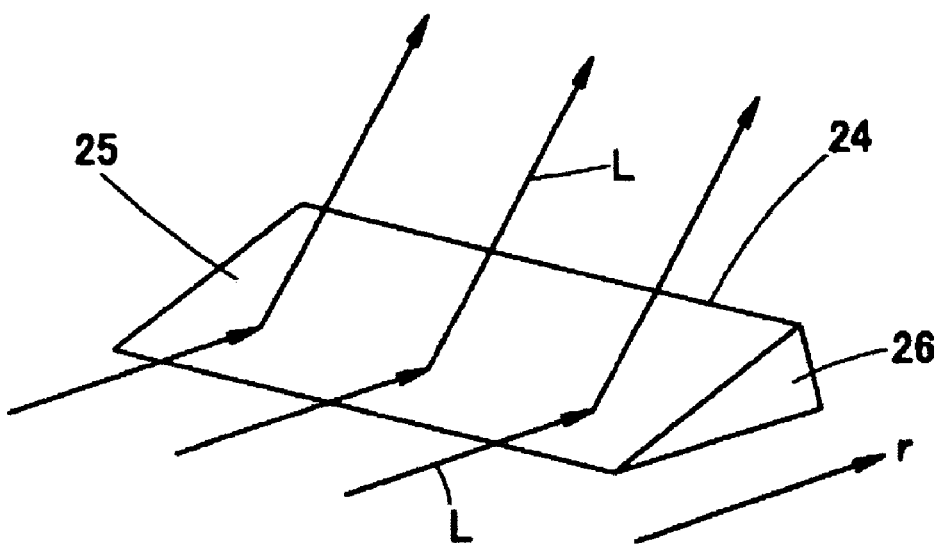
[FIG. 3]
Figure 3:
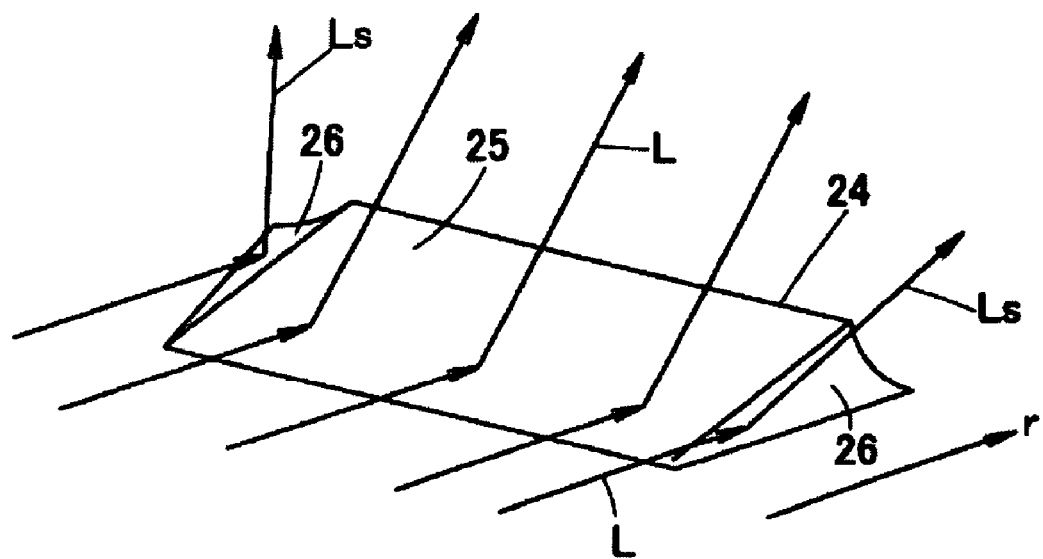

31: surface light source equipment
32: light conductive plate
33: light emission part
35: diffusion prism sheet
36: diffusion pattern
39: irregular diffusion plate 40: prism sheet
45: light outgoing surface
46a: reflection surface of diffusion pattern
46b: side of diffusion pattern
46c back surface of diffusion pattern
51: surface light source equipment
52: light conductive plate
52b: light outgoing surface
53: light emission part
54: diffusion pattern
54a: reflection surface of diffusion pattern
54b: side of diffusion pattern
54c back surface of diffusion pattern

BEST MODE FOR CARRYING OUT THE INVENTION

Preferred embodiments of the invention will be described below in detail with reference to the drawings.

Embodiment 1

Figure 4:
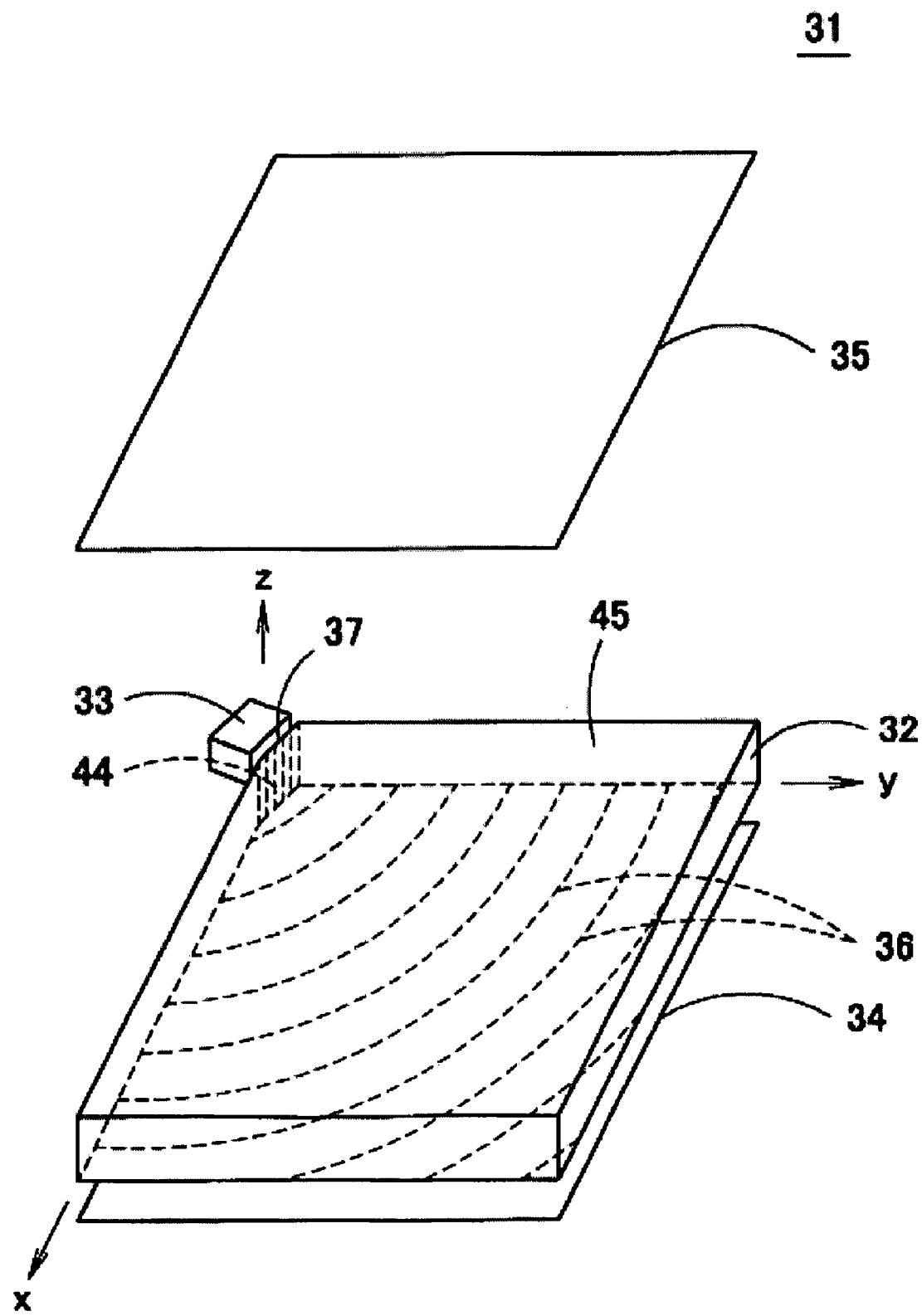
[FIG. 4]
Figure 5:
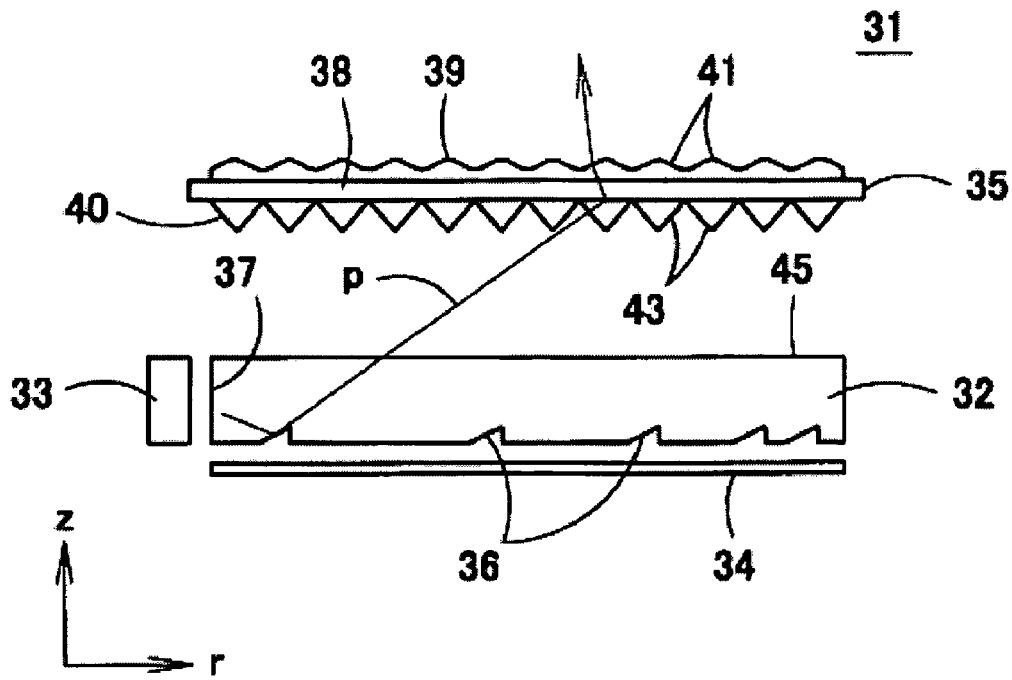
[FIG. 5]

FIG. 4 is an exploded perspective view showing a construction of a surface light source equipment 31 according to Embodiment 1 of the invention, and FIG. 5 is a schematic cross sectional view showing the construction. The surface light source equipment 31 mainly comprises a light conductive plate 32, a light emission part 33, a reflecting plate 34, and a diffusion prism sheet 35. The light conductive plate 32 is formed from a transparent resin, such as polycarbonate resin, methacrylic resin to be in the form of a rectangular flat plate, and provided on a back surface thereof with diffusion patterns 36. Also, one corner of the light conductive plate 32 is cut obliquely as viewed in plan view to form a light incident surface 37.

The light emission part 33 being a light source is formed by sealing one to several LEDs (not shown) in a transparent molding resin and covering surfaces except a front surface of the molding resin with a white resin, and a light outgoing from LEDs is directly reflected or reflected by an interface of the molding resin and the white resin, and then outgoes from a front surface of the light emission part 33. The light emission part 33 has its front surface positioned in opposition to the light incident surface 37 of the light conductive plate 32.

Figure 6:
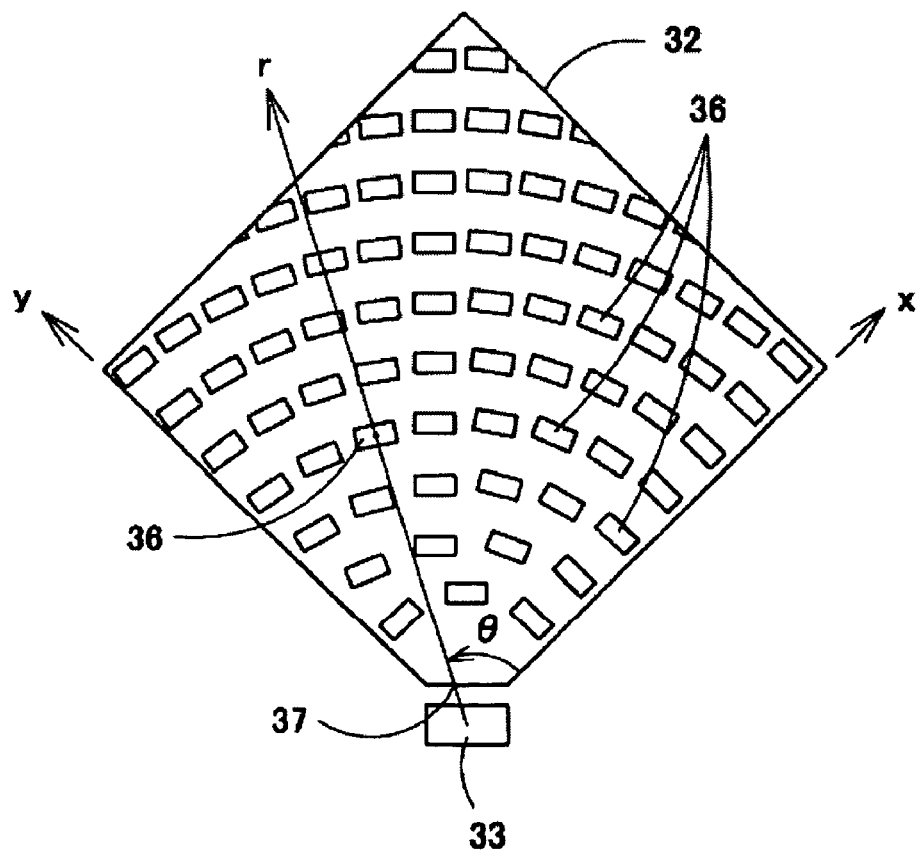
[FIG. 6]

FIG. 6 shows an arrangement of the diffusion patterns 36 formed on the light conductive plate 32. Embodiment 1 of the invention is described assuming that a z-axis is defined in a direction perpendicular to a surface (a light outgoing surface) of the light conductive plate 32 and a x-axis and a y-axis, respectively, are defined in directions in parallel to two side adjacent to the light incident surface 37. Also, when light propagating in an optional direction is taken into consideration or in the case where reflection in an optional diffusion pattern 36 is taken into consideration, a r-axis is defined in a direction in parallel to the surface of the light conductive plate 32 in a plane, which includes a beam of light as propagated and is perpendicular to the light conductive plate 32, or a r-axis is defined in a direction in parallel to the surface of the light conductive plate 32 in a plane, which includes a direction connecting between the light emission part 33 and the associated diffusion pattern 36 and is perpendicular to the light conductive plate 32. Further, θ indicates an angle formed between the x-axis and the r-axis.

The diffusion patterns 36 formed on a lower surface of the light conductive plate 32 are arranged discretely on circular arcs, which are centered on the light emission part 33 (in particular, LED inside) to be concentric therewith, and the respective diffusion patterns 36 are formed linearly by recessing a back surface of the light conductive plate 32 in the form of an asymmetric triangular cross section. An angle of inclination (an angle β of inclination shown in FIG. 11(b)) of a reflection surface of the diffusion patterns 36 having a triangular-shaped cross section and close to the light emission part 33, that is, a reflection surface 46a is desirably 20° or less. Also, the respective diffusion patterns 36 extend linearly in circumferential directions of circles centered on the light emission part 33, and normal lines to reflection surfaces of the respective diffusion patterns 36 are directed parallel to directions (the r axial direction), which connect between the light emission part 33 and the diffusion patterns 36, as viewed in plan view. Also, the diffusion patterns 36 are formed to be gradually increased in pattern density as they are distant from the light emission part 33. However, it does not matter whether the diffusion patterns 36 are substantially uniform in pattern density in the vicinity of the light emission part 33. In addition, optical elements (diffusers) 44 composed of lenses, prisms, etc. may be formed on the light incident surface 37 of the light conductive plate 32 in order to control an orientation pattern of quantity of light, which enters the light conductive plate 32 from the light emission part 33.

Figure 7:
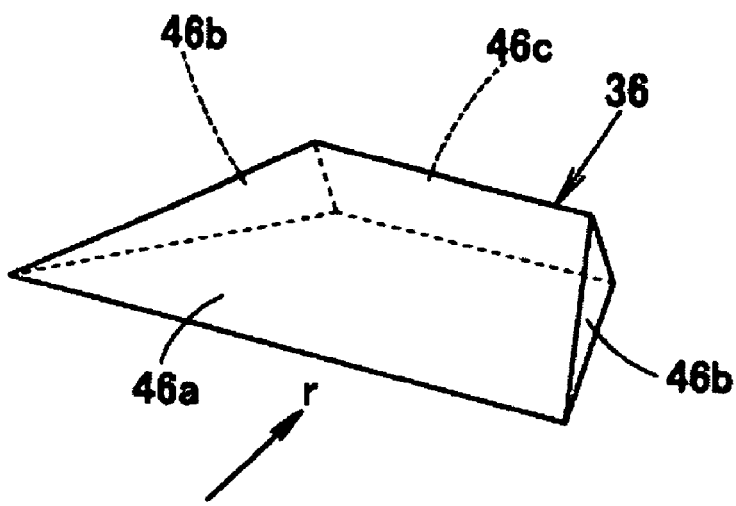
[FIG. 7]
Figure 7:
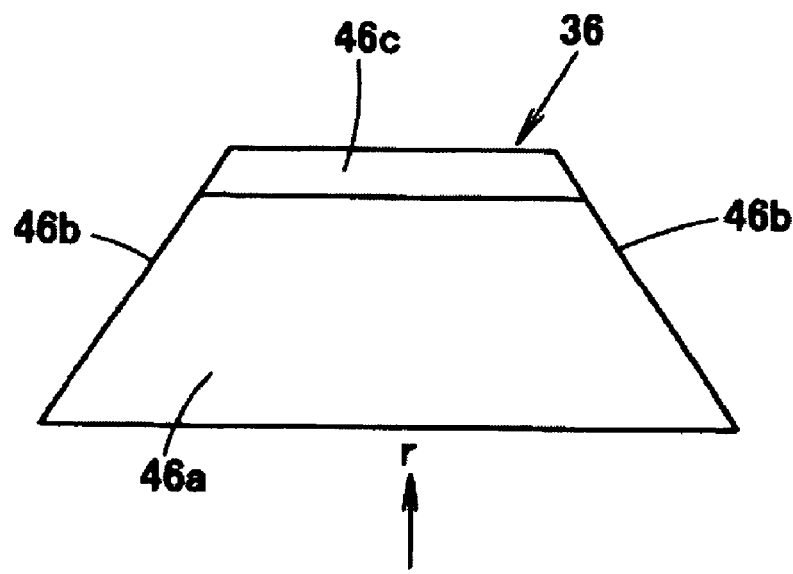
Figure 7:
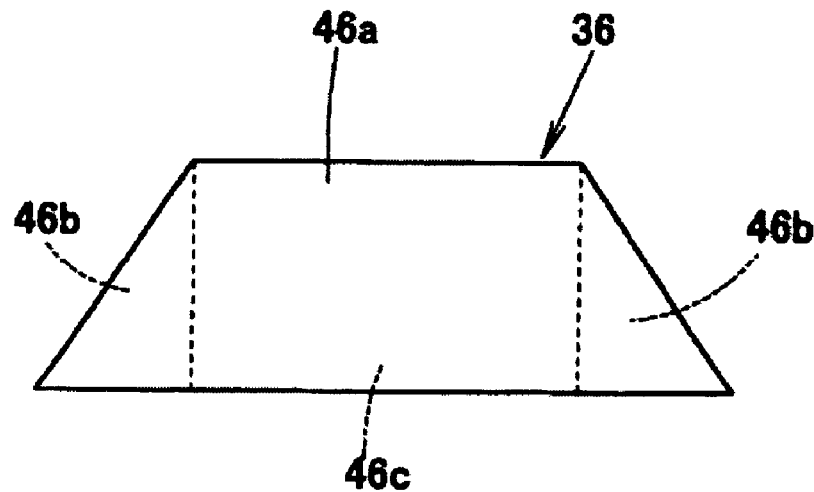

FIG. 7(a) is a perspective view showing a profile of the diffusion pattern 36, FIG. 7(b) is a plan view showing the profile, and FIG. 7(c) is a front view showing the profile. A front edge (an edge toward the light emission part 33) of an inclined surface of the diffusion pattern 36, which faces the light emission part 33, that is, a reflection surface 46a is longer than a rear edge (an edge distant from the light emission part 33). In the illustrated example, the reflection surface 46a of the diffusion pattern 36 is trapezoidal in shape and a back surface 46c is rectangular in shape. Accordingly, when the diffusion pattern 36 is seen from a side of the light emission part 33, left and right sides 46b of the diffusion pattern 36 hide behind the reflection surface 46a are not seen from a side of the light emission part 33.

The reflecting plate 34 shown in FIG. 4 has its surface subjected to mirror treatment by Ag plating and is arranged in opposition to a whole back surface of the light conductive plate 32.

The diffusion prism sheet 35 shown in FIG. 5 comprises a transparent irregular diffusion plate 39 formed on a surface of a transparent plastic sheet 38 and a transparent prism sheet 40 formed on a back surface of the plastic sheet 38. The irregular diffusion plate 39 and the prism sheet 40 are formed by dropping an ultraviolet hardening resin on an upper surface of the plastic sheet 38, using a stamper to push the ultraviolet hardening resin to spread the ultraviolet hardening resin between the stamper and the plastic sheet 38, and irradiating ultraviolet rays on the ultraviolet hardening resin to cure the same (Photo Polymerization method).

FIGS. 8(a), 8(b), and 8(c) are views illustrating a structure of the irregular diffusion plate 39. As shown in FIG. 8(a), the irregular diffusion plate 39 comprises repeated patterns 41 arranged periodically up and down and left and right substantially without clearances. Also, as shown in FIG. 8(b), the repeated patterns 41 comprise convex portions 42, in the form of a cone with a blunt apex as shown in FIG. 8(c), arranged randomly substantially without clearances. A single repeated pattern 41 has a longitudinal width H and a transverse width W, which are larger than a size of a pixel on a liquid-crystal display panel in order to prevent moire stripes, and each of which is preferably 100 μm or more and 1 mm or less. Also, the convex portions 42, which form the repeated patterns 41, are uneven in dimensions and desirably have an outside diameter D of 5 μm or more and 30 μm or less (In particular, about 10 μm is preferable).

Since the irregular diffusion plate 39 is special in diffusion characteristic, the irregular shape of the patterns must be correctly controlled. In this case, since all irregular patterns are made the same by arranging one irregular pattern periodically, all the irregular patterns can be fabricated in the same manner to provide a correct, irregular shape. With such method, however, moire stripes are generated on a screen of a liquid-crystal display panel and pixels become liable to become conspicuous. Conversely, when irregular patterns are to be arranged randomly, the irregular patterns must be changed one by one in shape and size, so that it becomes difficult to fabricate a correct configuration. Also, there is a fear that the irregular diffusion plate is varied in characteristic according to locations. Therefore, with the irregular diffusion plate 39 according to the invention, the repeated patterns 41 are formed by randomly arranging the convex portions 42, which are random in shape and size, and the repeated patterns 41 are arranged periodically whereby manufacture of patterns of the irregular diffusion plate 39 is made easy while generation of moire stripes, etc. is inhibited.

Figure 9:
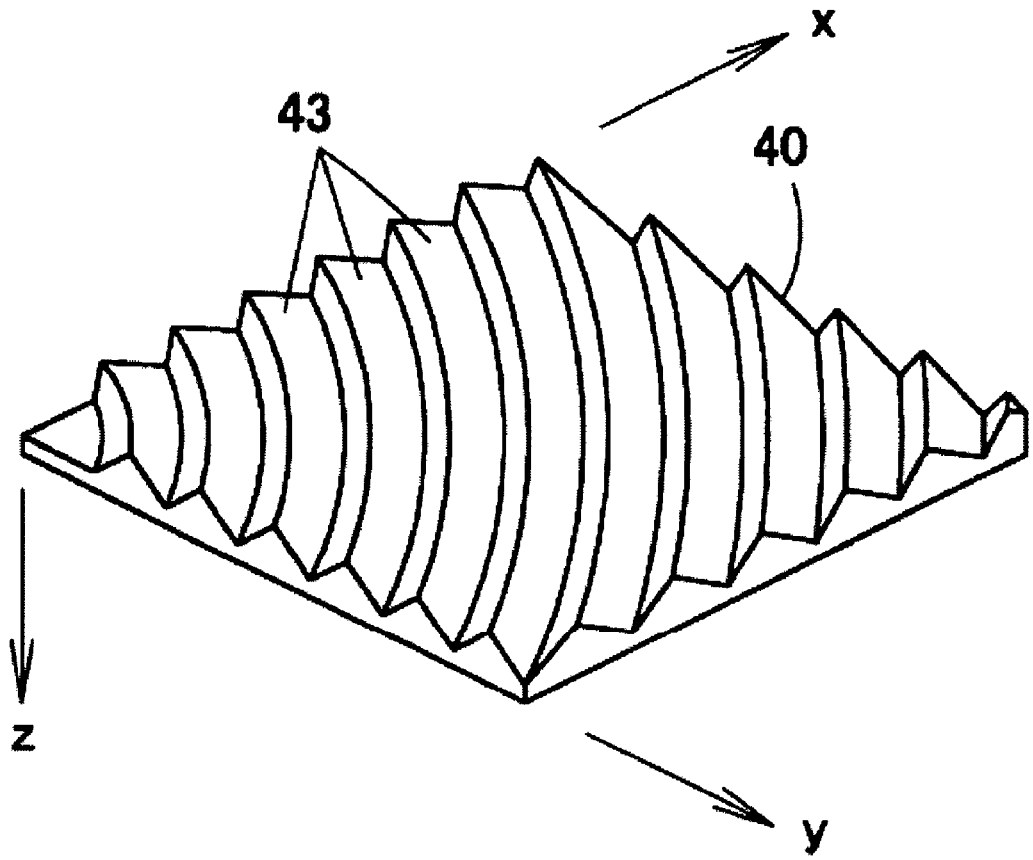
[FIG. 9]

FIG. 9 is a perspective view showing a construction of the prism sheet 40 as viewed from a back side. The prism sheet 40 is provided by arranging arcuate prisms 43 (in FIG. 9, the arcuate prisms 43 are depicted in an exaggerated scale), a cross section of which is triangular to be asymmetric left and right, in a concentric manner, and the respective arcuate prisms 43 are formed arcuate centering on a position, in which LED of the light emission part 33 is arranged.

In addition, the irregular diffusion plate 39 and the prism sheet 40 are not needed to be formed integrally as in Embodiment 1 but may be formed separately and arranged with a clearance therebetween. Rather, when they are formed integral with the plastic sheet 38 as in this embodiment, there is produced an advantage that the whole structure is made small in thickness and cost.

Figure 10:
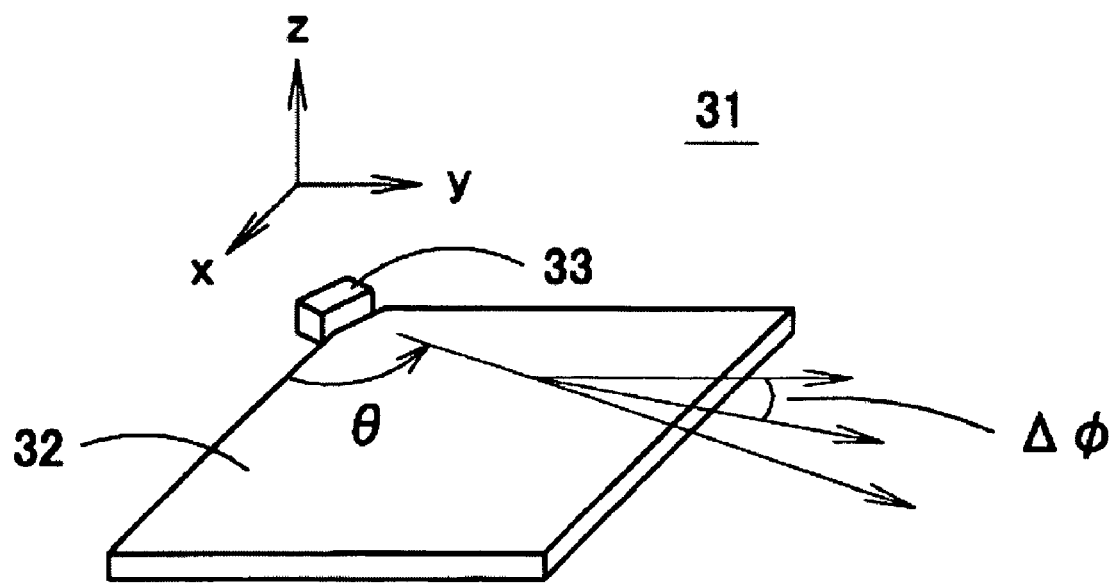
[FIG. 10]
Figure 11:
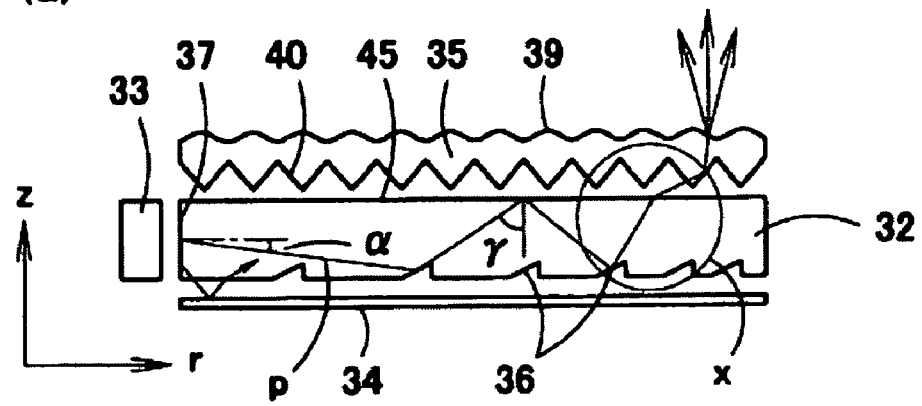
[FIG. 11] FIG. 11(*a*) is a schematic, perspective view showing the behavior of a light in the surface light source equipment, and FIG. 11(*b*) is an enlarged view showing a X part in FIG. 11(*a*).
Figure 11:
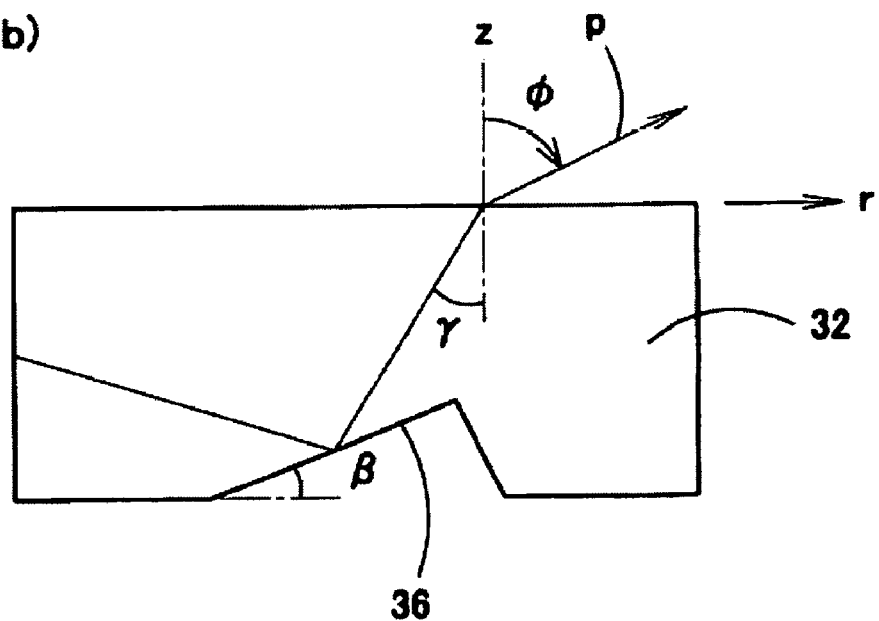
Figure 12:
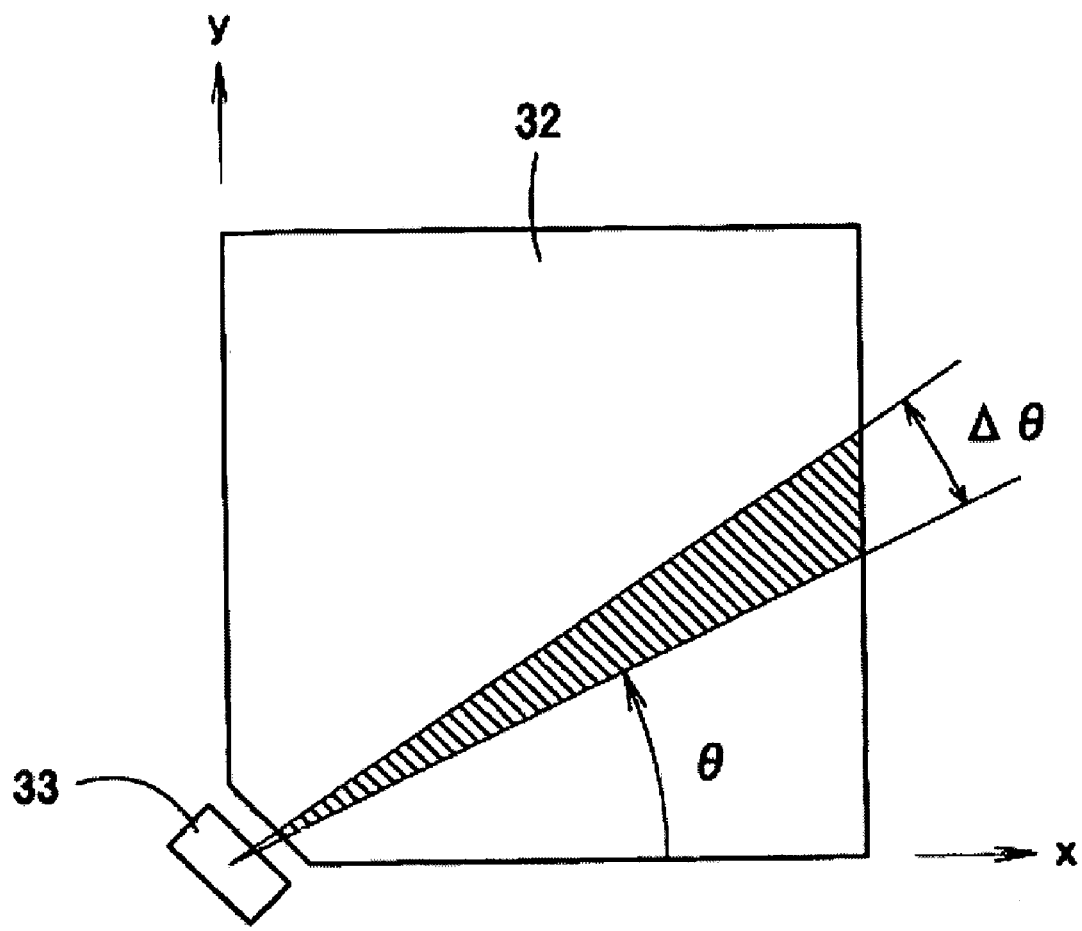
[FIG. 12]

Subsequently, the behavior of the light L in the surface light source equipment 31 will be described with reference to FIGS. 10, 11(*a*), and 11(*b*). FIG. 10 is a view showing the behavior of the light L as viewed from obliquely upwardly of the light conductive plate 32, FIG. 11(*a*) is a view showing the behavior of the light L in a cross section (z r plane) of the light conductive plate 32, and FIG. 11(*b*) is an enlarged view showing a X part in FIG. 11(*a*). The light L outgoing from the light emission part 33 enters the light conductive plate 32 from the light incident surface 37. The light L entering the light conductive plate 32 from the light incident surface 37 advances spreading radially in the light conductive plate 32, and at this time, it is desirable to design the optical elements 44 provided on the light incident surface 37 so that the quantity of the light L spreading in the light conductive plate 32 in respective orientations is in proportion to an area of sectors of the light conductive plate 32 in respective orientations. Specifically, as shown in FIG. 12, the quantity of a light outgoing in a region of Δθ, which is positioned in an optional direction of θ, from a side (a side in a x-axis direction) of the light conductive plate 32 is desirably made in proportion to an area (an area indicated by oblique lines in FIG. 12) of the light conductive plate within the region of Δθ whereby the brightness distribution of the surface light source equipment 31 can be made uniform in respective orientations.

The light L made incident upon the light conductive plate 32 advances in the light conductive plate 32 in a direction (a r-axis) distant from the light emission part 33 while repeating total reflection on upper and lower surfaces of the light conductive plate 32. The light L made incident upon a lower surface of the light conductive plate 32 is decreased in an incidence angle γ to an upper surface (a light outgoing surface 45) of the light conductive plate 32 each time being reflected by the reflection surfaces 46*a* of the diffusion patterns 36, a cross section of which is triangular, and the light L made incident upon the light outgoing surface 45 at the incidence angle γ smaller than a critical angle of total reflection transmits the light outgoing surface 45 to outgo outside the light conductive plate 32 along the light outgoing surface 45. Since all the diffusion patterns 36 are arranged perpendicular to directions, which connect between the light emission part 33 and the respective diffusion patterns 36, the light L diffuses in a plane (z r plane), which includes a direction connecting between the light emission part 33 and the associated diffusion pattern 36 and is perpendicular to the light outgoing surface 45, even when the light L propagated in the light conductive plate 32 is diffused by the diffusion pattern 36, but advances straight without being diffused in a plane (x y plane) in parallel to the light outgoing surface 45.

On the other hand, the light L having transmitted the lower surface of the light conductive plate 32 without being reflected by the lower surface is regular-reflected by the reflecting plate 34, which faces the lower surface of the light conductive plate 32, to return into the light conductive plate 32 to be again propagated in the light conductive plate 32.

Consequently, the light L outgoing from the light outgoing surface 45 of the light conductive plate 32 is considerably limited in range such that when an angle β of inclination of the diffusion patterns 36 having a triangular-shaped cross section is, for example, 12°, an outgoing angle φ of light on the z r plane perpendicular to the light outgoing surface 45 amounts to around 45° to 90°.

Since the light outgoing from the light outgoing surface 45 of the light conductive plate 32 is not spread in a θ direction and a directional angle Δφ in a φ direction is also limited, it becomes one having a considerably narrow directivity. In this manner, the light outgoing along the light outgoing surface 45, being narrow in spread, and being intense in directivity is reflected by inclined surfaces of the prism sheet 40 of the diffusion prism sheet 35 to be thereby bent in a direction perpendicular to the light outgoing surface 45, and then diffused by the irregular diffusion plate 39 of the diffusion prism sheet 35 to be widened in directivity.

Figure 13:
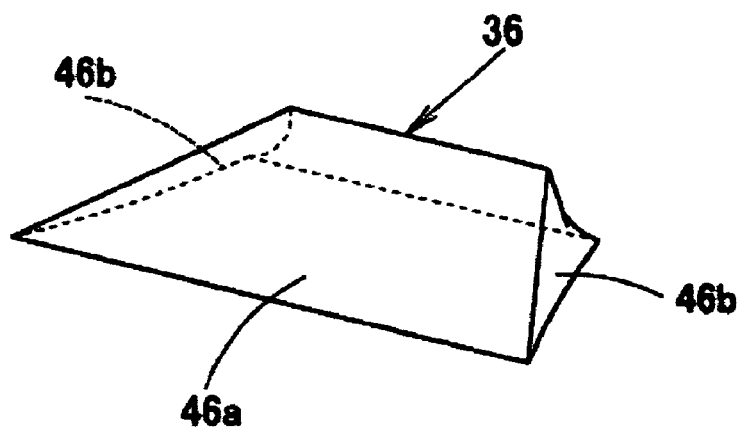
[FIG. 13] FIG. 13(*a*) is a perspective view showing a single diffusion pattern, on which molded sagging is generated, according to Embodiment 1, FIG. 13(*b*) is a plan view showing the single diffusion pattern, and FIG. 13(*c*) is a front view showing the single diffusion pattern.
Figure 13:
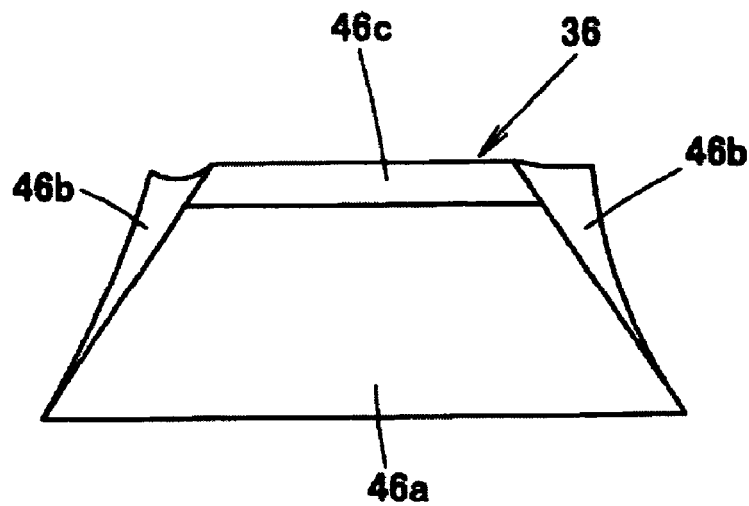
Figure 13:
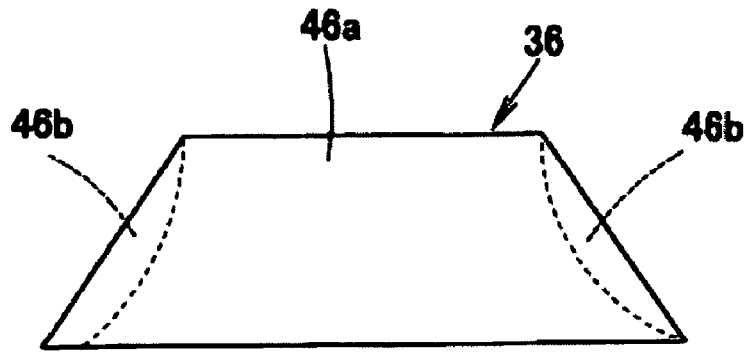
Figure 14:
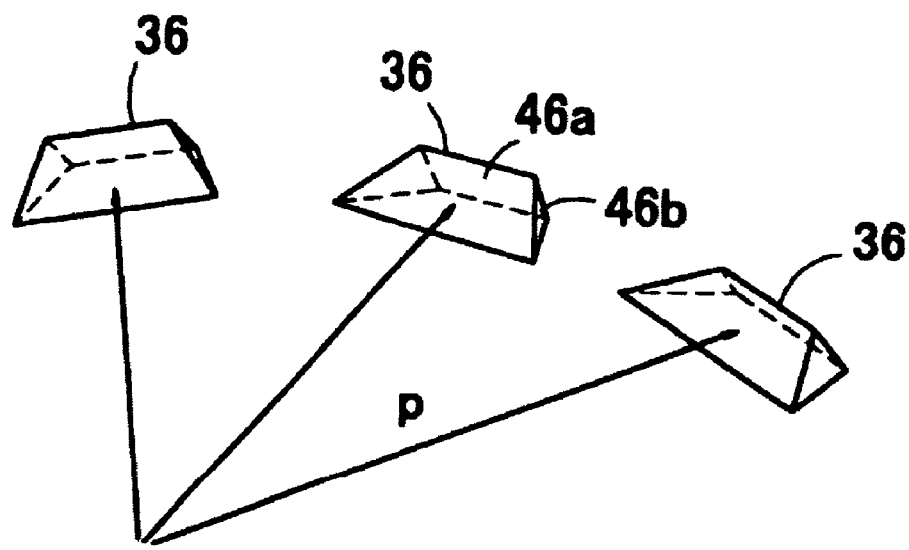
[FIG. 14] FIG. 14(*a*) is a view showing a manner in the case where a light incident upon respective diffusion patterns is made uniform in direction, and FIG. 14(*b*) is a view showing a manner in the case where a light incident upon respective diffusion patterns is not made uniform in direction.
Figure 14:
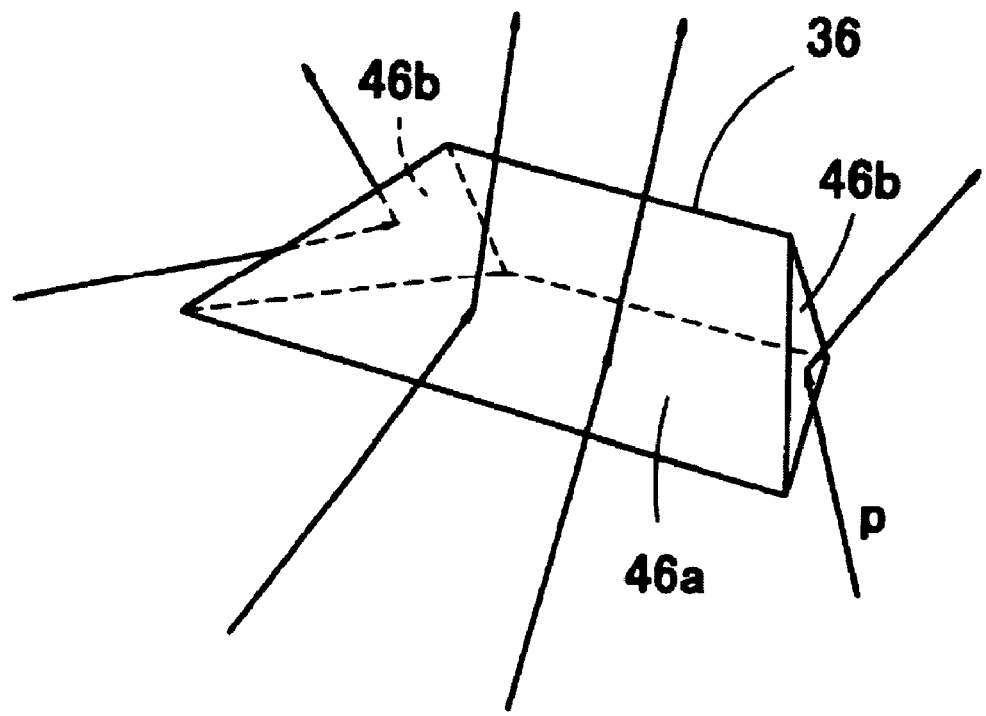

Here, let consider the case where molded sagging in molding the light conductive plate 32 enlarges the left and right sides 46*b* of the diffusion patterns 36 to make the same inclined surfaces. FIG. 13(*a*) is a perspective view showing a profile of the diffusion pattern 36, on which molded sagging is generated, FIG. 13(*b*) is a plan view showing the profile, and FIG. 13(*c*) is a front view showing the profile. The reflection surface 46*a* of the diffusion pattern 36 is trapezoidal in shape, the both sides 46*b* hide behind the reflection surface 46*a*, and when molded sagging is generated on the both sides 46*b* of the diffusion pattern 36, the both sides 46*b*, on which molded sagging is generated, also hide behind the reflection surface 46*a* as shown in FIG. 13. With the surface light source equipment 31, as shown in FIG. 14(*a*), the light L outgoes radially from the light emission part 33 and the light L propagated in the light conductive plate 32 advances straight in the r-axis direction as viewed in plan view, so that the light L made incident upon the diffusion pattern 36 is made incident only upon the reflection surface 46*a* to be reflected but is not made incident upon the sides 46*b*, on which molded sagging is generated, and a ratio of light reflected by the sides 46*b* is very small. Therefore, even when molded sagging is generated on the sides 46*b* of the diffusion pattern 36, it is possible to inhibit damage to controllability in a direction of propagation of the light L and a decrease in brightness of the surface light source equipment 31, which light outgoing from the light outgoing surface 45 becomes a loss light to cause.

In the case where the light L is made incident upon the respective diffusion patterns 36 in random directions, the light L is made incident upon the sides 46b even when the reflection surfaces 46a of the diffusion patterns 36 are trapezoidal in shape as in the comparative example shown in FIG. 14(b), so that the light L reflected by the sides 46b becomes a loss light Ls and so there is not produced an effect that stray light is reduced. In contrast, according to the invention, the light L made incident upon the respective diffusion patterns 36 is substantially fixed in a direction as shown in FIG. 14(a), it is possible to prevent stray light by the sides 46b. That is, the diffusion patterns 36 shaped in this manner produce an effect in the surface light source equipment 31, in which light advances in a substantially one direction as viewed in plan view.

Figure 15:
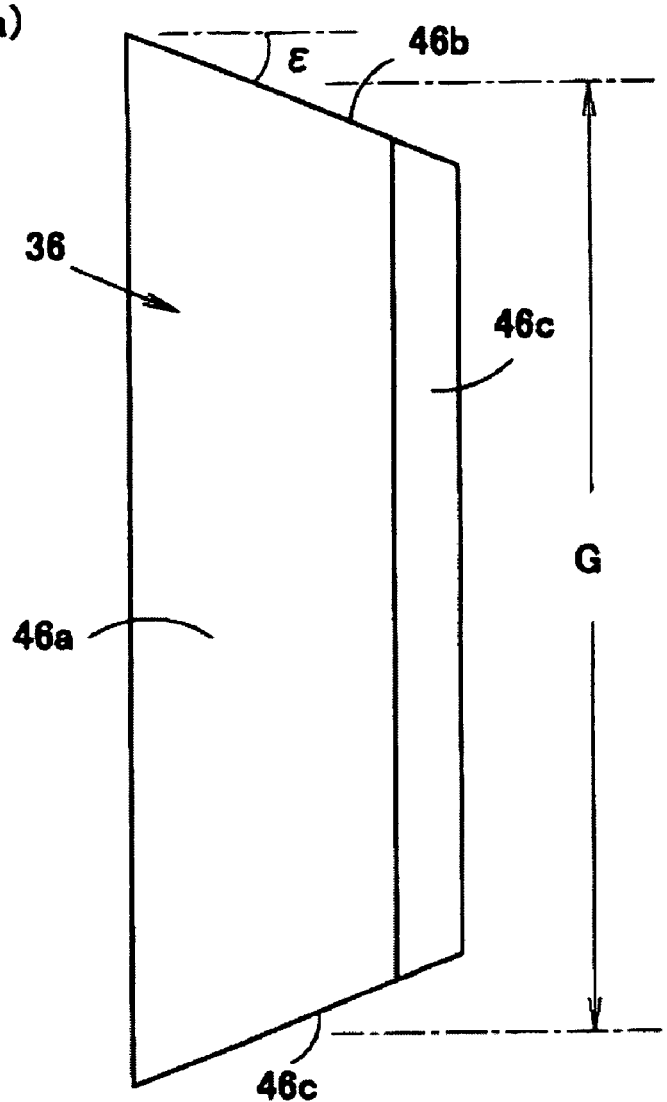
[FIG. 15] FIG. 15(*a*) is an enlarged, plan view showing a diffusion pattern, and FIG. 15(*b*) is a cross sectional view showing the diffusion pattern.
Figure 15:
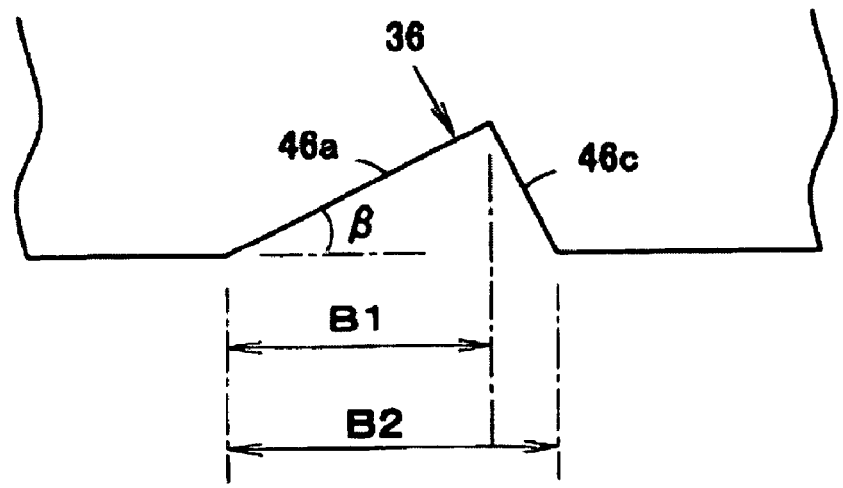

FIG. 15 shows a specific example of the diffusion pattern 36. In the diffusion pattern 36, G=10 to 300 μm and B2=16 μm where G indicates an average width of the diffusion pattern 36 and B2 indicates a horizontal length in a longitudinal direction. Also, B1=12 μm and an angle β of inclination=12° where B1 indicates a horizontal length in a longitudinal direction of the reflection surface 46a and β indicates an angle of inclination thereof. ϵ=20° where ϵ indicates an angle of the both sides 46b as viewed in plan view.

Figure 16:
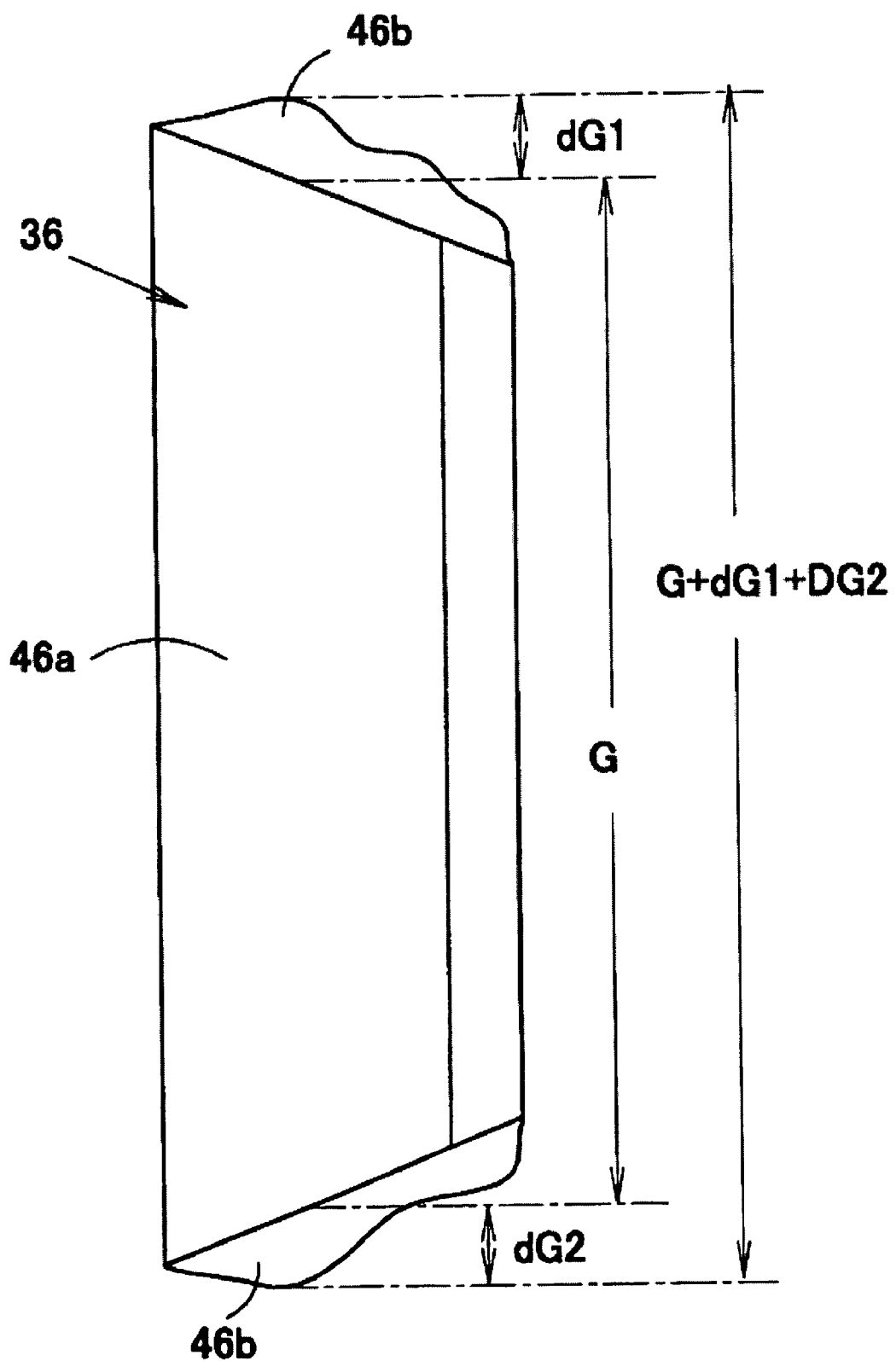
[FIG. 16]

A ratio of molded sagging of the sides 46b is defined as shown in FIG. 16. That is, the following formula is defined ratio of molded sagging=(dG1+dG2)/G where G indicates an average width of the diffusion pattern 36, and dG1, dG2, respectively, indicate distances from an average position of the sides 46b of the diffusion pattern 36 to ends of molded sagging.

Figure 17:
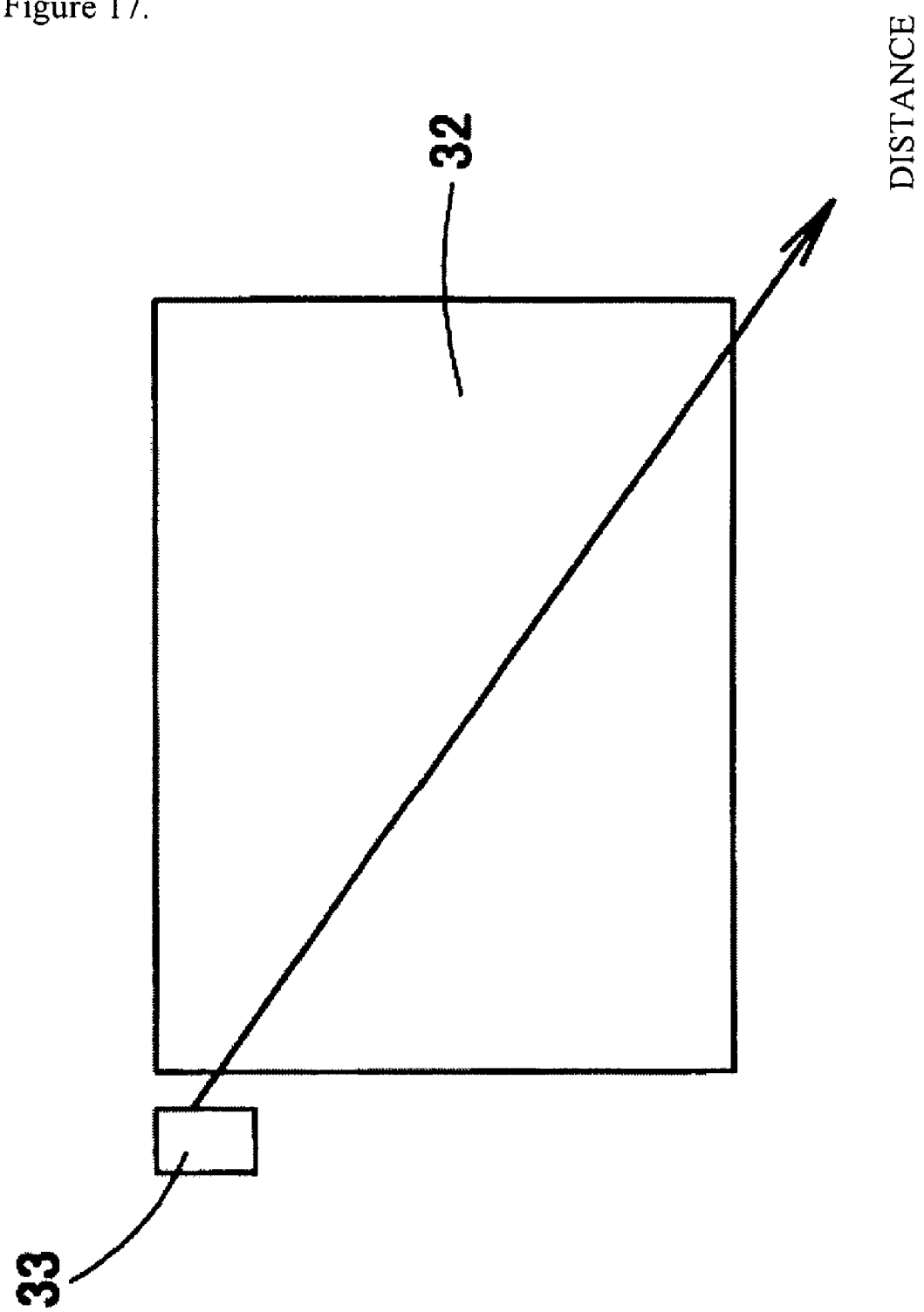
[FIG. 17]
Figure 18:
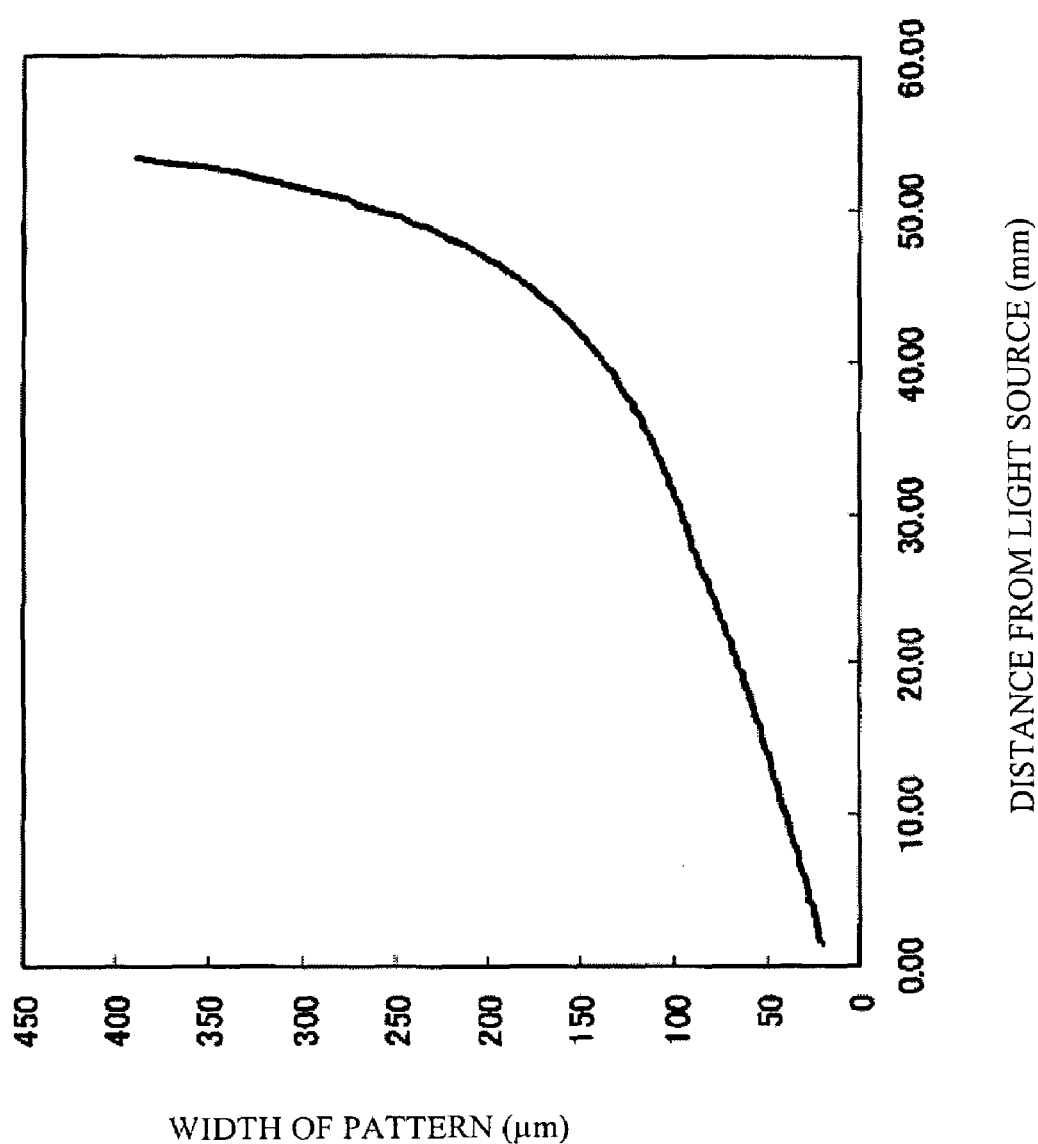
[FIG. 18]
Figure 19:
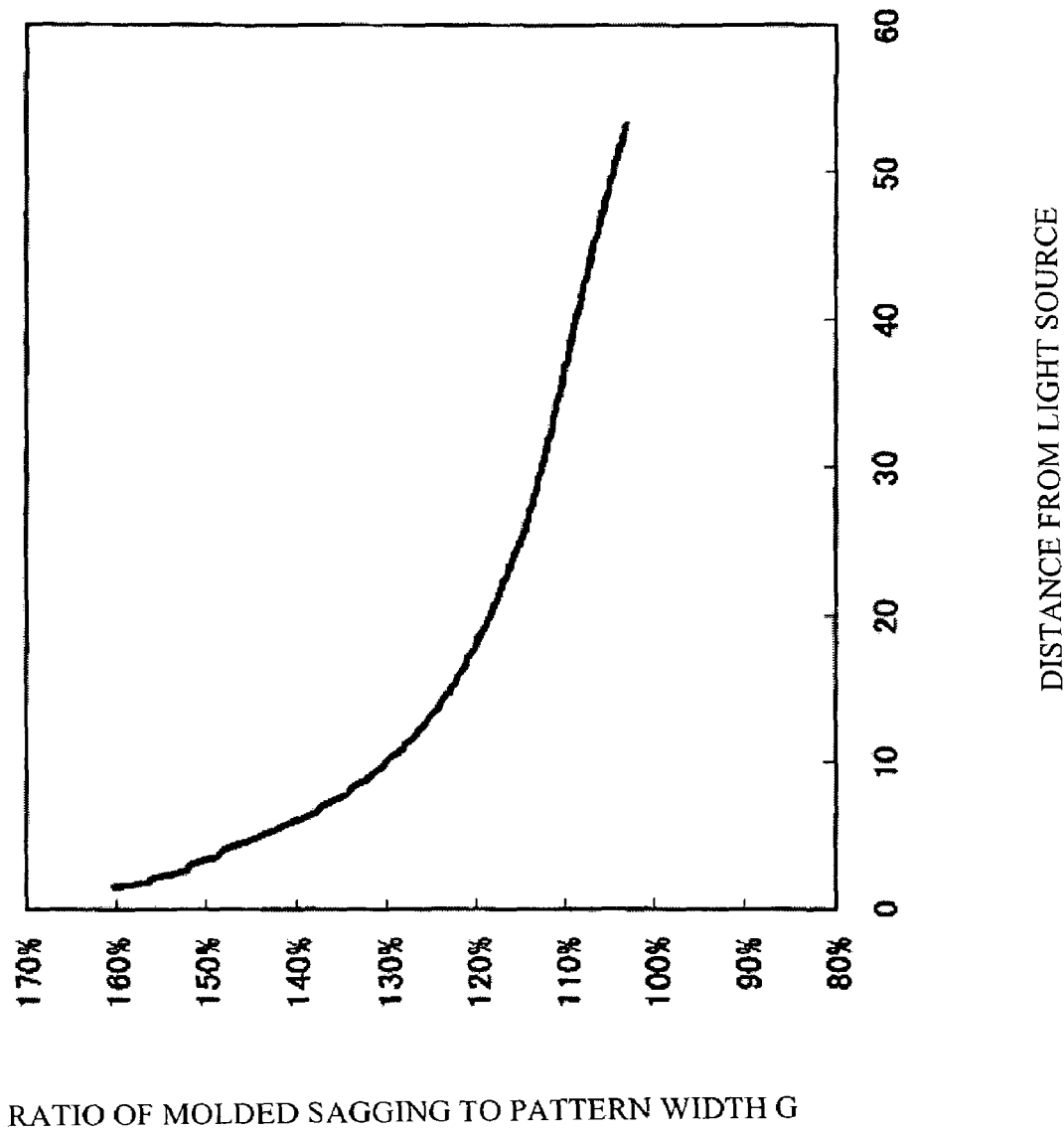
[FIG. 19]

In the diffusion pattern 36 shown in FIG. 15, magnitudes dG1, dG2 of molded sagging, respectively, are in the order of about 4 μm. FIG. 18 illustrates a change in average width of the diffusion pattern 36 versus a distance Rs from the light emission part 33 (a light source) as measured along a diagonal direction in the light conductive plate 32, on a corner of which is arranged the light emission part 33 as shown in FIG. 17, and FIG. 19 illustrates a change in ratio of molded sagging.

Figure 20:
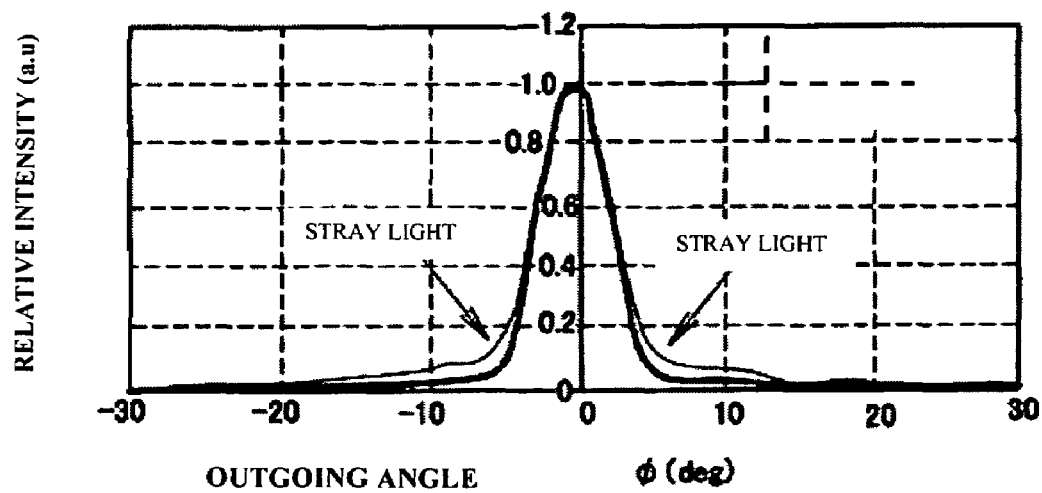
[FIG. 20] FIG. 20(*a*) is a view illustrating the relative intensity of an outgoing light at an outgoing angle ω, and FIG. 20(*b*) is a view illustrating the definition of an outgoing direction.
Figure 20:
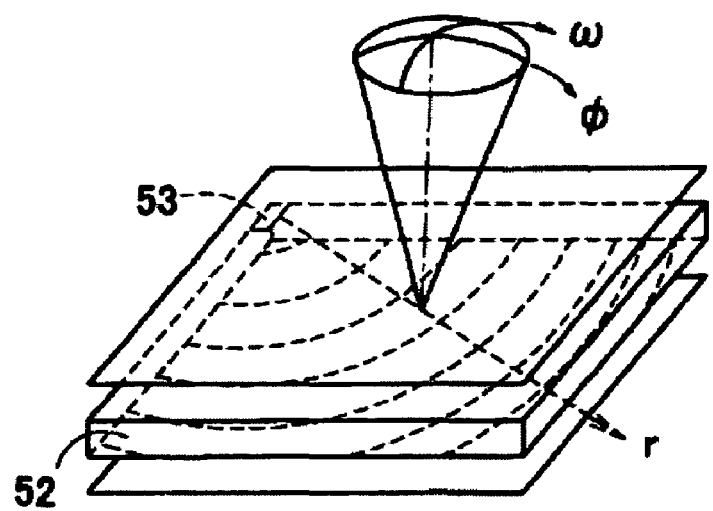

FIG. 20(a) is a view illustrating a directional characteristic in the surface light source equipment 31, which uses the diffusion patterns 36 of Embodiment 1 comprising a reflection surface 46a being trapezoidal in shape, and a conventional surface light source equipment, of which the reflection surfaces 25 are rectangular in shape. In FIG. 20(a), an abscissa represents an outgoing angle ω of light outgoing from the light outgoing surface 45, an ordinate represents a relative intensity of a light outgoing from the light outgoing surface, a thick solid line indicates a directional characteristic of the surface light source equipment 31 of Embodiment 1, and a broken line indicates a directional characteristic of the conventional example. Here, as shown in FIG. 20(b), the abscissa in FIG. 20(a) represents an outgoing angle ω in a circumferential direction where ϕ indicates an outgoing angle in a plane including a direction (the r-axis direction) connecting between the light emission part 33 and the diffusion pattern 36 and being perpendicular to the light outgoing surface 45, and ω indicates an outgoing angle in a plane perpendicular to the plane and the light outgoing surface 45.

As shown in FIG. 20(a), while lower parts of the directional characteristic curve in the conventional example spreads laterally of the directional characteristic curve of Embodiment 1, this is thought to be attributable to stray light scattering at the sides 26 of the diffusion patterns 24. That is, according to Embodiment 1, it is possible to inhibit such stray light.

Figure 21:
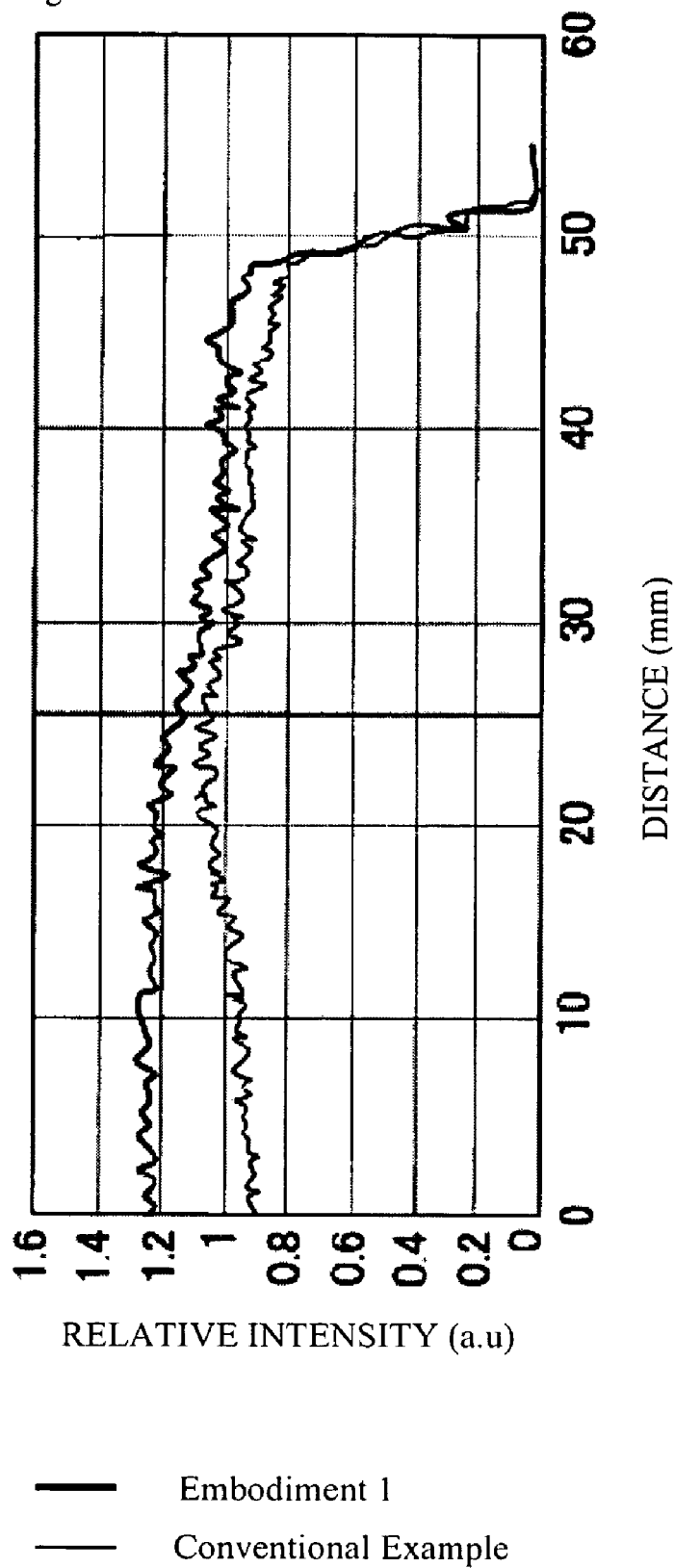
[FIG. 21]

FIG. 21 illustrates results of measurement of a relative intensity of light outgoing from the light outgoing surface 45 along the cross sectional surface of the light conductive plate 32 having a length of 50 mm, an abscissa represents a distance Rs from the light emission part 33 (a light source), and an ordinate represents a relative intensity of an outgoing light. According to the results of measurement, a central portion of the light conductive plate 32 is increased about 15% in outgoing light intensity, and the whole light outgoing surface 45 is increased 14% in outgoing light intensity. Also, it is seen from FIG. 21 that an effect of improvement is large in the vicinity of the light source, which is large in ratio of molded sagging. In addition, while the thick solid line of Embodiment 1 in FIG. 21 shows that variation in light intensity is larger than that in the conventional example, this is because a sample in the conventional example 1 is provided by modifying a shape of the diffusion patterns 24 in the conventional example, in which an arrangement of the diffusion patterns 24 is designed so as to make the light outgoing surface 22b uniform in light intensity, into a trapezoidal shape as viewed in plan view. Therefore, the light outgoing surface 45 can be made uniform in light intensity by redesigning an arrangement of the diffusion patterns 36 of Embodiment 1.

Figure 22:
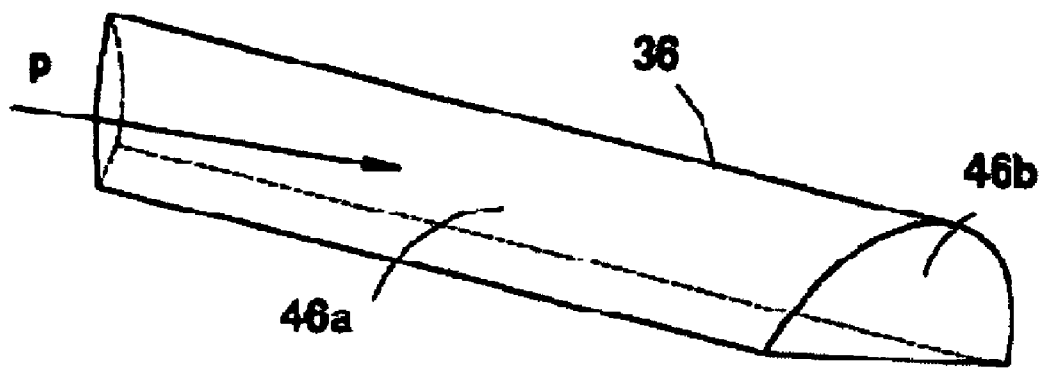
[FIG. 22] FIGS. 22(*a*), 22(*b*), and 22(*c*) are perspective view showing other configurations of a diffusion pattern.
Figure 22:
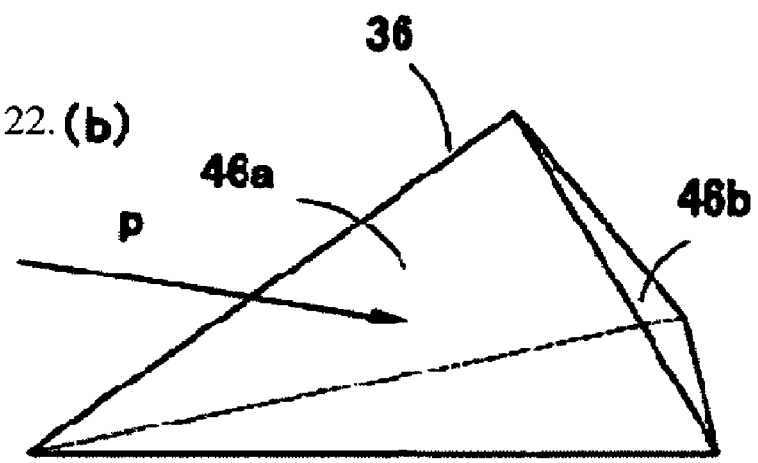
Figure 22:
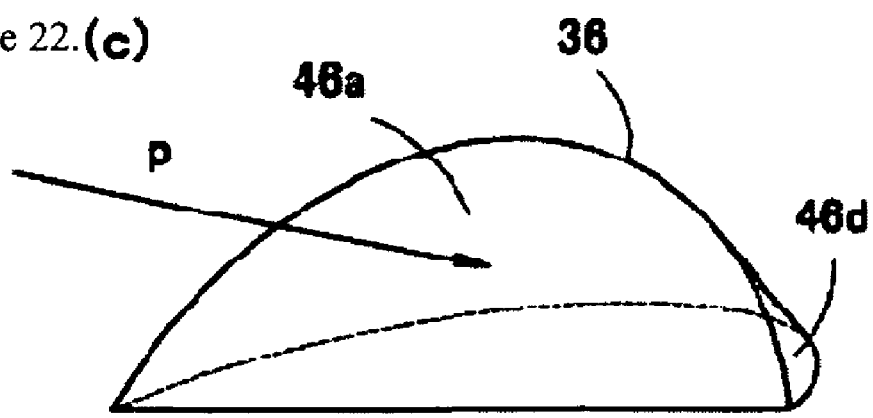

In addition, various other shapes can be adopted for the diffusion patterns 36. As shown in, for example, FIG. 22(a), a diffusion pattern 36 may be semi-circular or arcuate in cross section. Also, as shown in FIG. 22(b), with a diffusion pattern 36, which is substantially in the form of a pyramid and includes a triangular-shaped reflection surface 46a, a normal line to the reflection surface 46a may be made in parallel to a direction connecting to the light emission part 33 as viewed from a direction perpendicular to the light outgoing surface 45, and both side surfaces 46b of the diffusion pattern 36 may hide behind the reflection surface 46a as viewed from the light emission part 33. Alternatively, as shown in FIG. 22(c), with a diffusion pattern 36, which is substantially in the form of a half-circle or half-ellipse and includes a triangular-shaped reflection surface 46a, a normal line to the reflection surface 46a may be made in parallel to a direction connecting to the light emission part 33 as viewed from a direction perpendicular to the light outgoing surface 45, and an outer peripheral surface 46d of the diffusion pattern 36 may hide behind the reflection surface 46a as viewed from the light emission part 33. However, the diffusion pattern 36 being arcuate in cross section or semi-circular in cross section as shown in FIG. 22(a) is not preferable since a directional angle Δϕ in the ϕ direction of the light L outgoing from the light outgoing surface 45 is enlarged. From the same reason, in a case of the diffusion pattern 36 being triangular-shaped in cross section, it is not preferable since the diffusion patterns 36 being different in angle β of inclination are existent in a mixed state. Also, instead of using the diffusion pattern 36, light in the light conductive plate 32 may be scattered by hologram or the like to outgo from the light outgoing surface 45.

Figure 23:
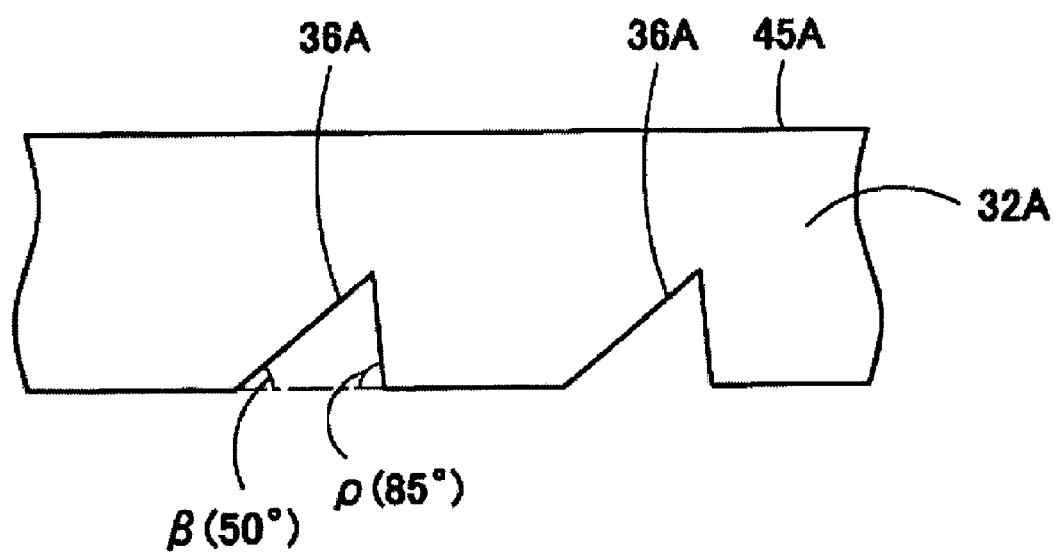
[FIG. 23]
Figure 24:
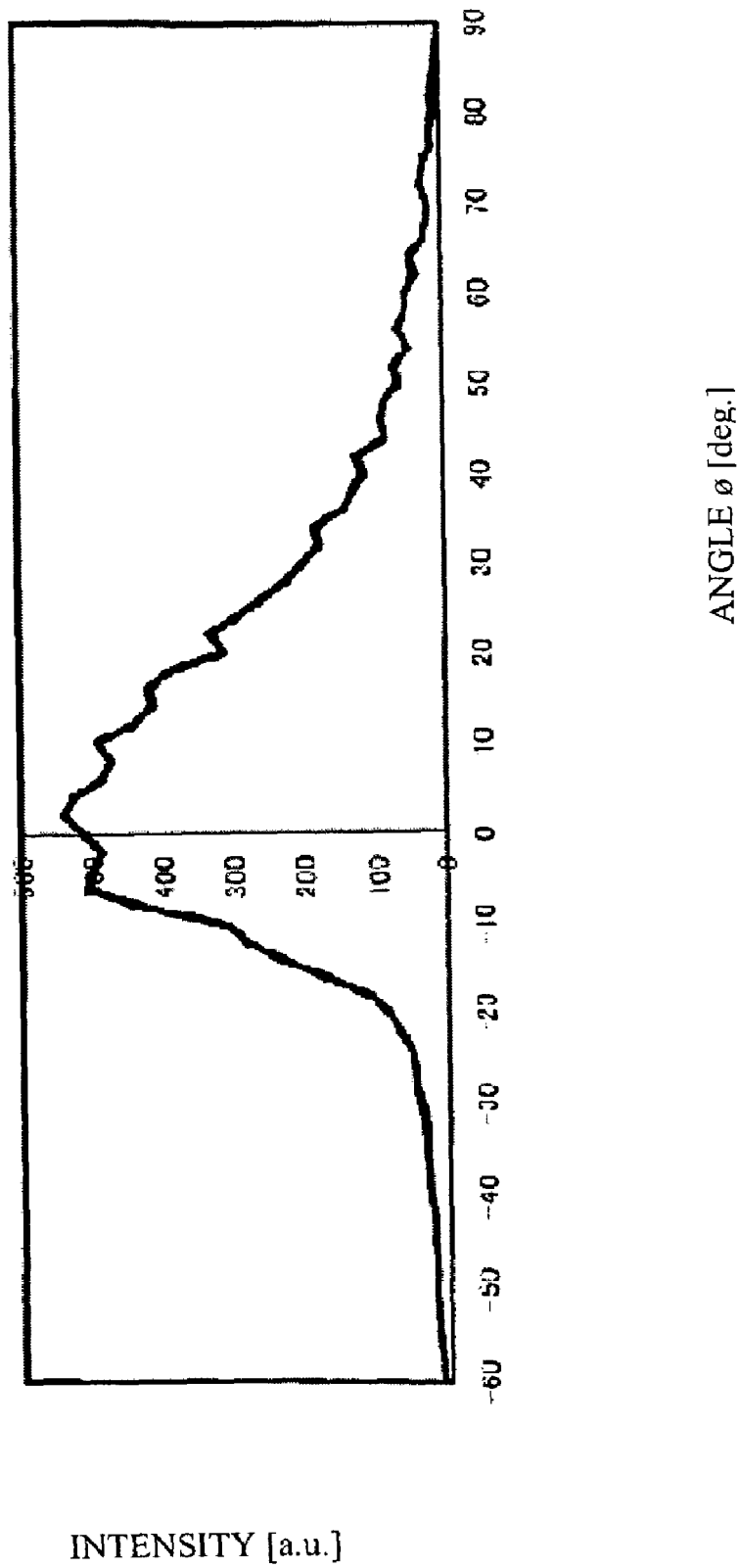
[FIG. 24]

Subsequently, the action of the diffusion prism sheet 35 will be described. First, let consider the case where a light is caused to outgo in a direction perpendicular to a light outgoing surface without the use of the diffusion prism sheet 35. In order to emit a light vertically without the use of the diffusion prism sheet 35, a light must be caused to outgo vertically with diffusion patterns of a light conductive plate. In order to emit a light vertically with the diffusion patterns, it is necessary to increase angles of inclination of inclined surfaces of diffusion patterns 36A formed on a light conductive plate 32A as shown in FIG. 23, so that an angle β of inclination of an inclined surface close to the light emission part 33 amounts to 50° and an angle ρ of inclination of an inclined surface distant from the light emission part 33 amounts to 85°. FIG. 24 is a view illustrating directivity in a z r plane in case of using the light conductive plate 32A formed with the diffusion patterns 36A as shown in FIG. 23, an abscissa represents an angle φ measured from the z-axis in the z r plane, and an ordinate represents an intensity of light. As seen from FIG. 24, the directivity in this case is asymmetric on a side (φ<0) close to the light emission part 33 and on a side (φ>0) distant from the light emission part 33, and considerably broad on the side distant from the light emission part 33. Incidentally, an angle φ (a half-value width), at which intensity becomes half a peak value, is about −13° on the side close to the light emission part 33 while it is about 26° on the side distant from the light emission part 33. In addition, a half-value width of light intensity in a ω direction in a plane, which is perpendicular to the z r plane and in parallel to the z-axis, is about 5° (see FIG. 27).

Figure 25:
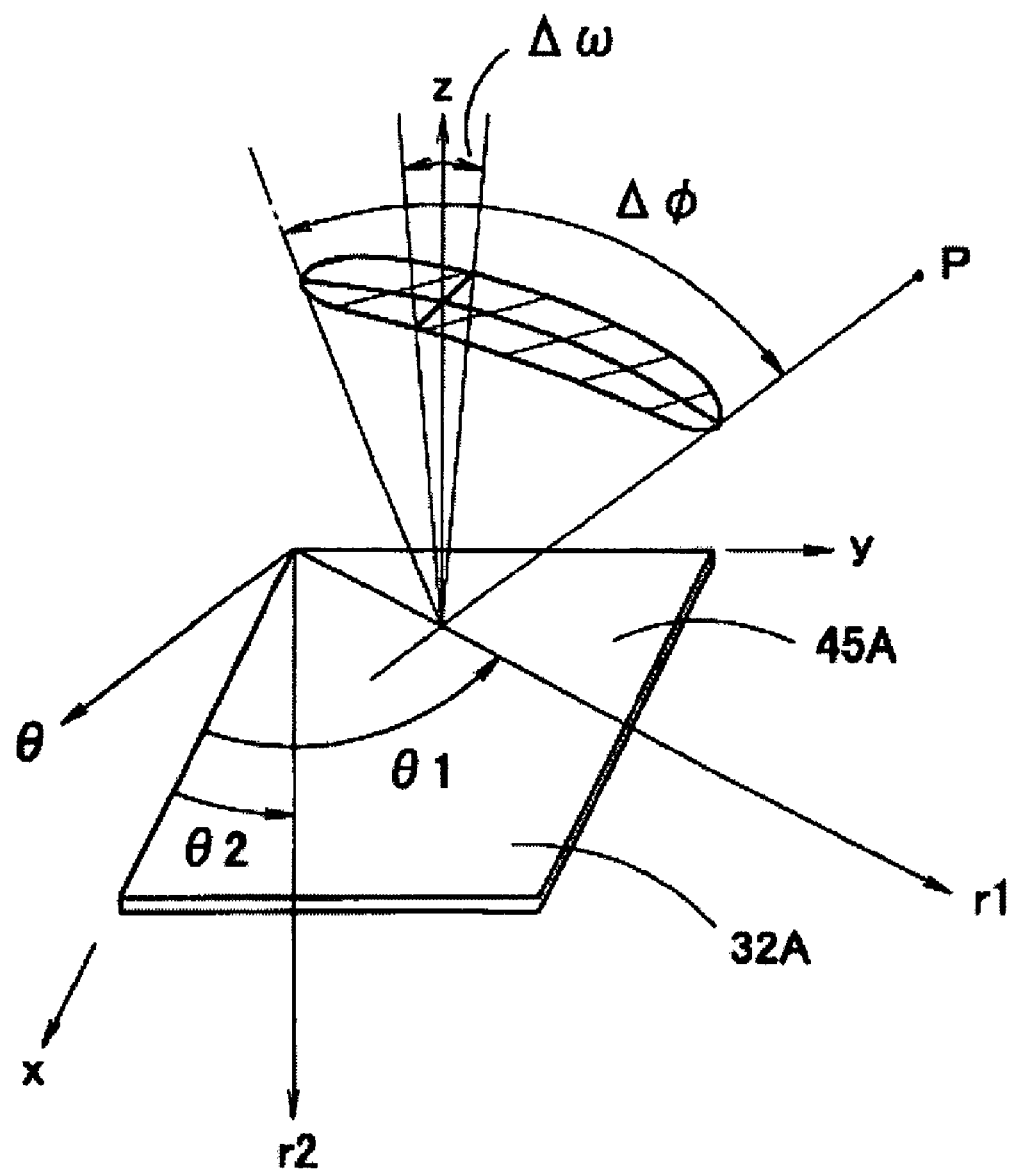
[FIG. 25]
Figure 26:
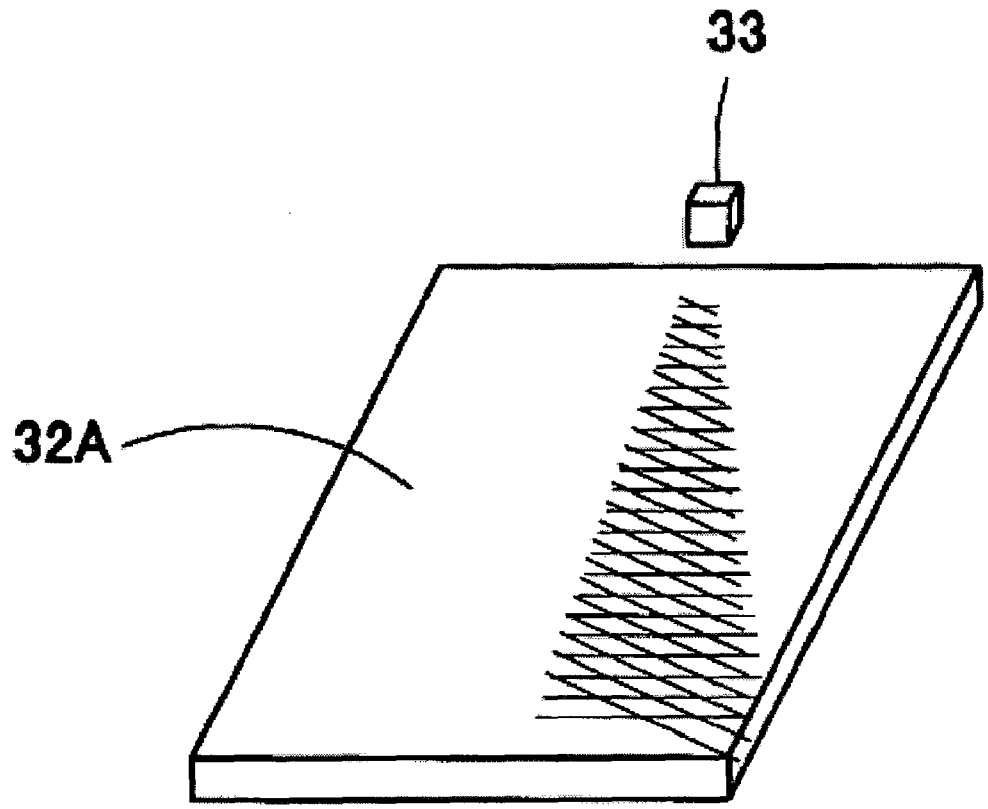
[FIG. 26]

FIG. 25 shows a light having the directivity shown in FIG. 24. As shown in FIG. 25, a light outgoing from a light outgoing surface 45A (a region of oblique lines represents a region, from which a light outgoes, and so forth.) spreads in a range of Δφ in a φ direction and spreads in a range of Δω in a ω direction (in a z θ plane, which is perpendicular to the z r plane and includes the z-axis, ω indicates an angle relative to the z-axis, and Δω indicates a directional angle in a ω direction), and a directional angle Δφ in the φ direction is considerably wide as compared with the directional angle Δω in the ω direction. Besides, as shown in FIG. 25, a wide directional angle Δφ is different in direction between a light outgoing from the light outgoing surface 45A after being propagated in a r 1 direction in the light conductive plate 32A and a light outgoing from the light outgoing surface 45A after being propagated in a r 2 direction in the light conductive plate 32A. Therefore, when a surface light source equipment is viewed from a direction toward a point P, a light propagated in the r 1 direction in the light conductive plate 32A is seen but a light propagated in the r 2 direction is not seen, so that radial unevenness R in brightness as shown in FIG. 26 is seen on the light conductive plate 32A.

In addition, radial unevenness in brightness did not disappear even when a diffusion plate was placed on a light conductive plate 32A of the comparative example shown in FIG. 23. Also, with such light conductive plate 32A, a quantity of light included in a range of φ=±10° amounted to about 30% of the total, and a rapid decrease in light outgoing efficiency was caused when a diffusion plate was placed on the light conductive plate 32A in order to lessen radial unevenness in brightness.

Figure 27:
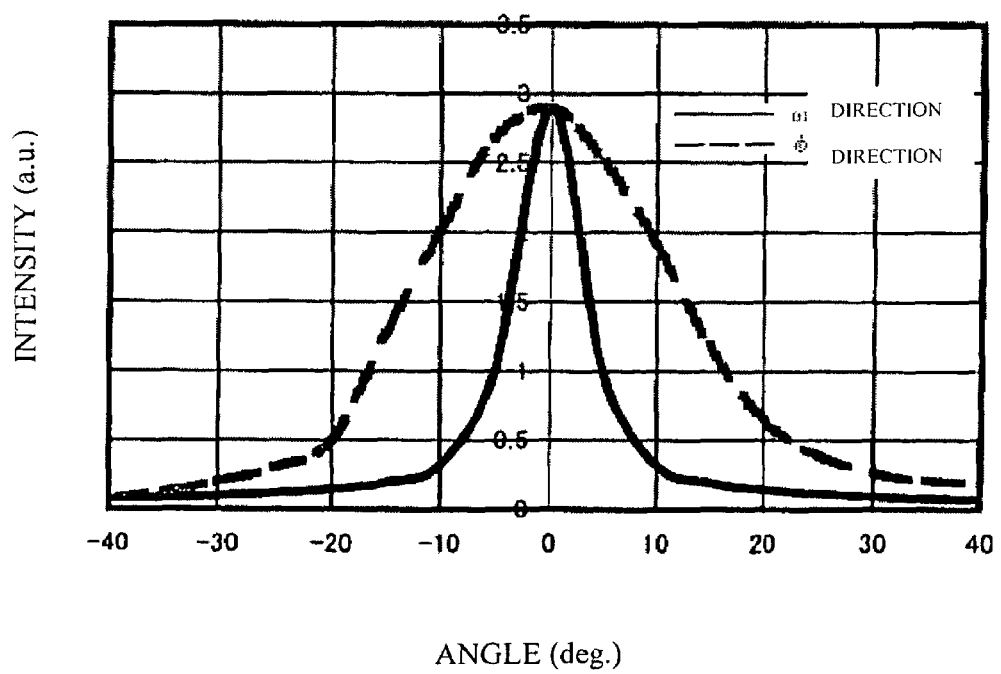
[FIG. 27]

In contrast, in case of placing the prism sheet 40 on the light conductive plate 32, it is unnecessary to have a light outgoing in a vertical direction with the diffusion patterns 36, and a light outgoing along the light outgoing surface 45 is caused by the prism sheet 40 to be bent in the vertical direction. FIG. 27 is a view illustrating directivity of a light transmitted through the prism sheet 40 placed on the light conductive plate 32 in a ω direction and directivity in a φ direction, the both indicating symmetrical profiles. As seen from FIG. 27, an angle (a half-value width), at which light intensity becomes half a peak value, is about 5° in the ω direction while it is about 15° in the φ direction, and a directional angle Δφ in the φ direction is narrow as compared with the comparative example, in which any prism sheet is not used.

Figure 28:
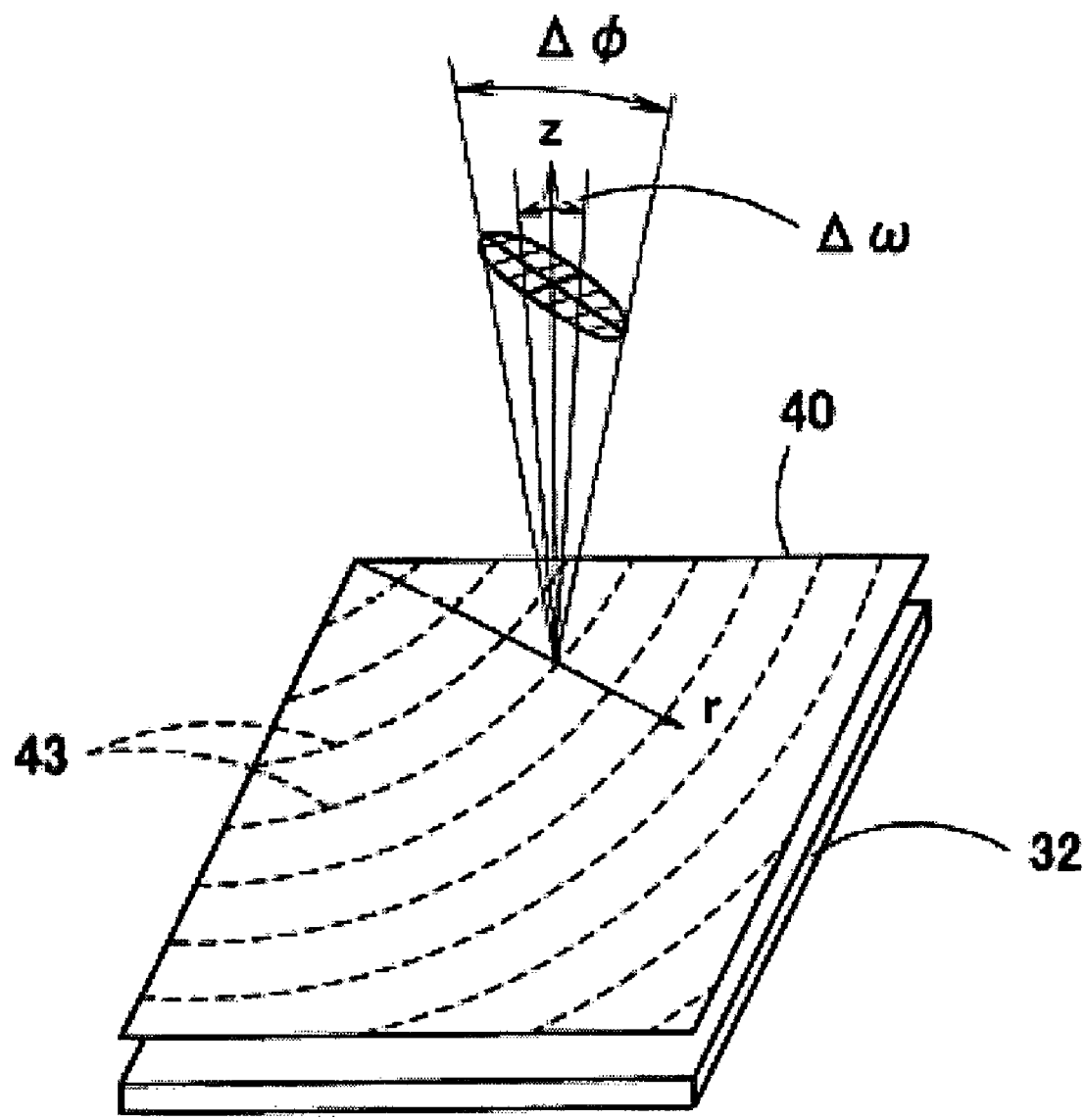
[FIG. 28]

In this manner, when the prism sheet 40 composed of the arcuate prisms 43, which are centered on the light emission part 33, is used, a light transmitted through the prism sheet 40 is not varied in directivity in the ω direction as shown in FIG. 28 but a light is collected in the φ direction to become narrow in directivity in the φ direction. Therefore, a difference Δφ−Δω between a directional angle Δω in the ω direction and a directional angle Δφ in the φ direction becomes small and a decrease in radial unevenness in brightness is caused.

Actually, however, only the prism sheet 40 cannot adequately decrease a difference in directivity between in the ω direction and in the φ direction (since a half-value total width in the ω direction is 10° and a half-value total width in the φ direction is 30°, there is a difference of 20° in half-value total width.), and unevenness in brightness is intensely seen although a decrease in radial unevenness in brightness is caused. Also, a light is spread (half-value width) as small as around 5° in the ω direction, and use in general usage is not enabled unless a light is spread further in the ω direction.

Figure 29:
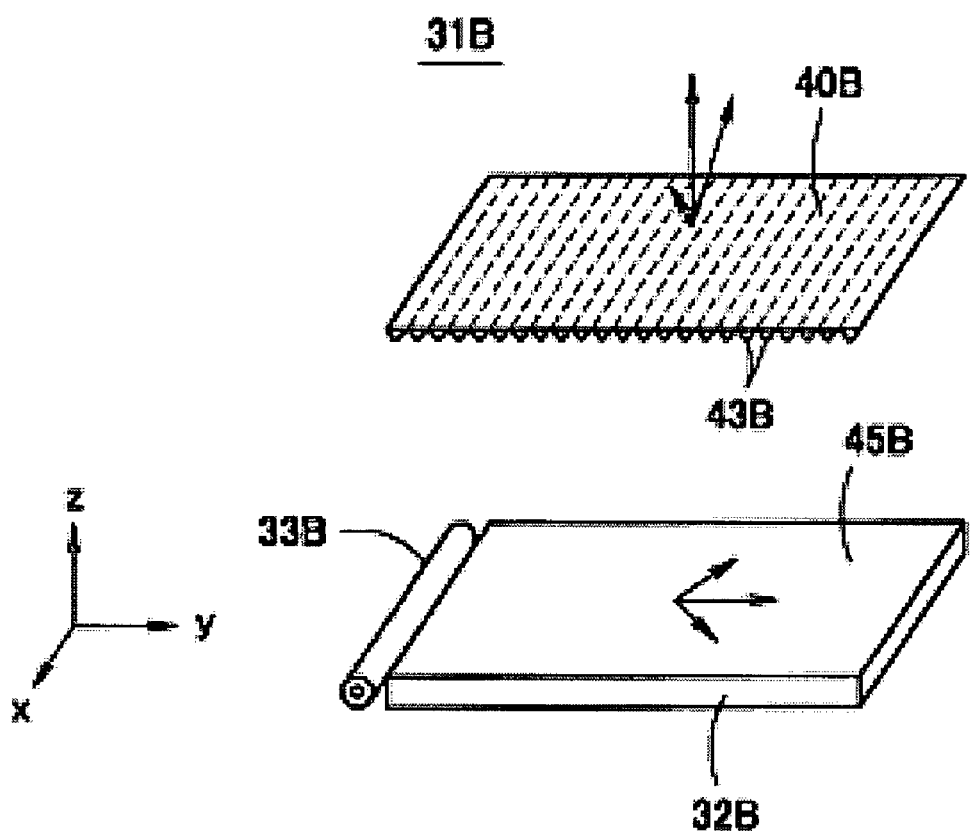
[FIG. 29]
Figure 30:
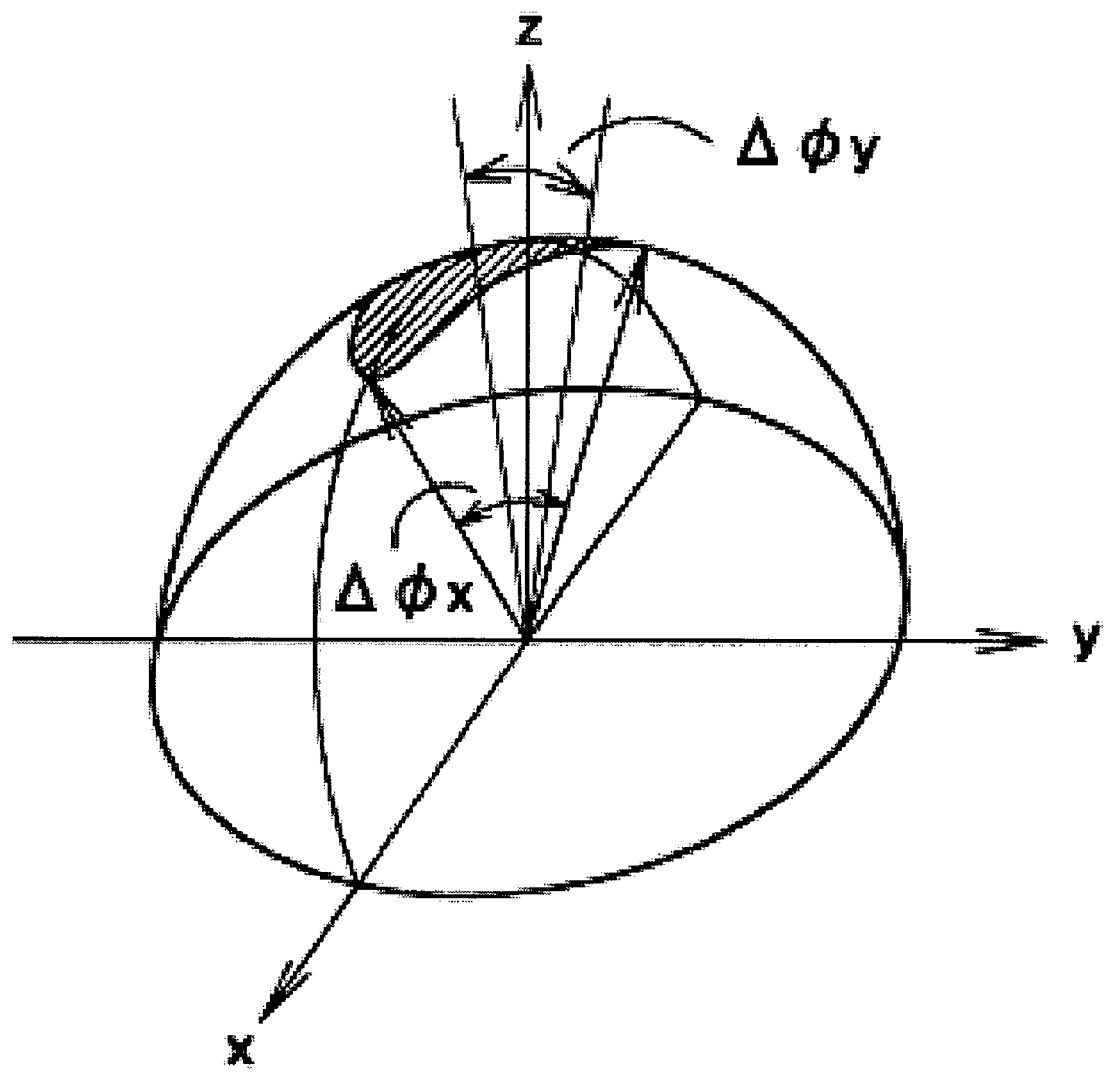
[FIG. 30]

As shown in FIG. 29, there has been proposed a surface light source equipment, in which a cold-cathode tube or a linear light source is used, of a type, in which a light L is caused to outgo along a light conductive plate surface 32B and caused by a prism sheet 40B to be deflected in a vertical direction (for example, JP-A-11-8411). In this case, a direction, in which a prism 43B of the prism sheet 40B extends, was in parallel to a linear light source 33B, and a directional angle Δφx in a x-axis direction in parallel to the prism 43B was considerably large as compared with a directional angle Δφy in a y-axis direction perpendicular to the prism 43B as shown in FIG. 30 and the directional angle was large in anisotropy. With such surface light source equipment 31B, however, since a direction of anisotropy of the directional angle was not varied according to a position of a light outgoing surface 45B, no radial unevenness in brightness was generated.

In contrast, with the surface light source equipment 31 according to the invention, since a light outgoing radially from the light emission part 33 being a point light source is diffusion-reflected by the diffusion patterns 36, which are formed on the lower surface of the light conductive plate 32 in a concentric manner, to outgo from the light outgoing surface 45, an outgoing light is varied in directivity and anisotropy according to a position of the light outgoing surface 45 and radial unevenness in brightness is generated. That is, radial unevenness in brightness causes a problem peculiar to a surface light source equipment, which comprises a light emission part 33 being a point light source and concentric diffusion patterns 36, and the invention is directed to improving such unevenness in brightness.

Also, while a light L is large in directivity in a prism length direction (the x-axis direction) of the prism sheet 40B according to the surface light source equipment 31B shown in FIG. 29, a light L is narrow in directivity in a prism length direction (a θ direction) of the prism sheet 40 according to the surface light source equipment 31 according to the invention, and thus quite reverse to that in the surface light source equipment 31B. That is, with the system of the invention, it is necessary to make a light large in directivity in a prism length direction and narrow in directivity in a direction perpendicular to the direction, but when such measures are taken, quite reverse results are produced in the surface light source equipment 31B shown in FIG. 29 that a directional angle becomes much large in anisotropy, surplus light is increased in a prism length direction, and a necessary angle of visibility cannot be ensured in a direction perpendicular to the direction. In this manner, the invention is directed to solving a problem generated in a surface light source equipment of a unique system.

Figure 31:
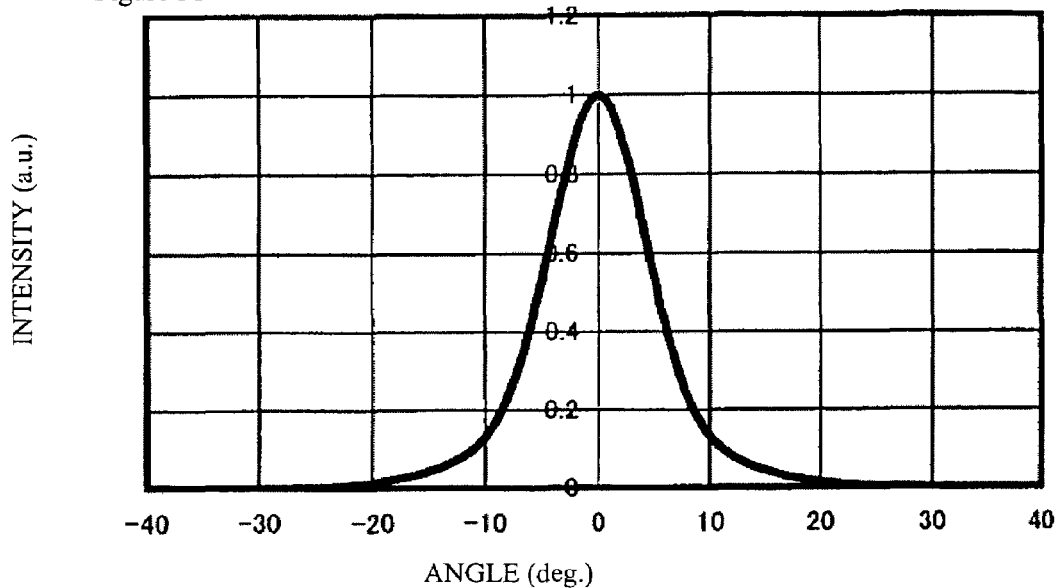
[FIG. 31]
Figure 32:
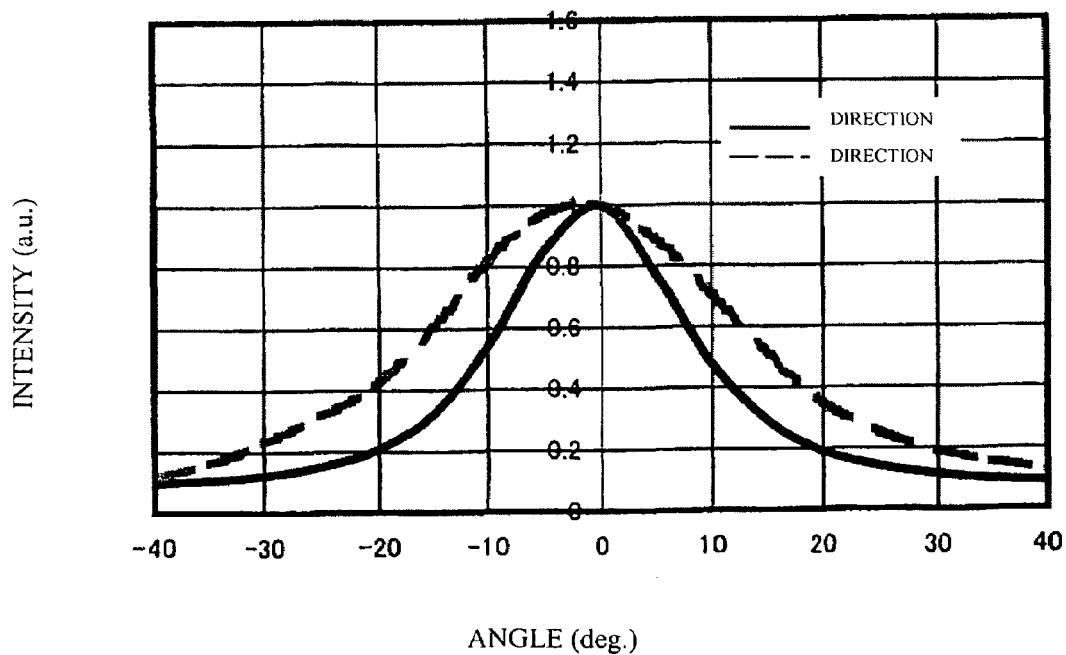
[FIG. 32]

Subsequently, an explanation will be given to the function and effect of the irregular diffusion plate 39 used in the surface light source equipment 31 according to the invention. For the sake of comparison, an explanation will be given first to the case where a general diffusion plate commonly used is used. A diffusion plate, of which directivity when a parallel light is incident normally is one shown in FIG. 31 (a half-value width is 10°), was used as a general diffusion plate. In the case where such general diffusion plate was placed on the prism sheet 40, directivity in a ω direction and in a φ direction was made as shown in FIG. 32. Here, ω indicates an angle formed relative to a z-axis in a z θ plane and φ indicates an angle formed relative to the z-axis in a z r plane. A half-value total width $\Delta\omega$, $\Delta\phi$ in the ω direction and in the φ direction, respectively, are $\Delta\omega=20°$ and $\Delta\phi=33°$, a difference therebetween is $\Delta\phi-\Delta\omega=13°$, and a difference in half-value total width is decreased 38% as compared with the case of only the prism sheet 40. Therefore, radial unevenness in brightness is decreased to some extent but unevenness in brightness is still seen well. Also, considering a light outgoing in an actually effective direction, a light of about 23% is included in a half-value total width $\Delta\omega=20°$. That is, a light of as much as 77% is wasted. Also, there is caused a problem that when being apart ω=2.5° from the vertical, brightness is decreased some 20% and seen to be different in left and right eyes, thus making seeing hard.

Figure 8:
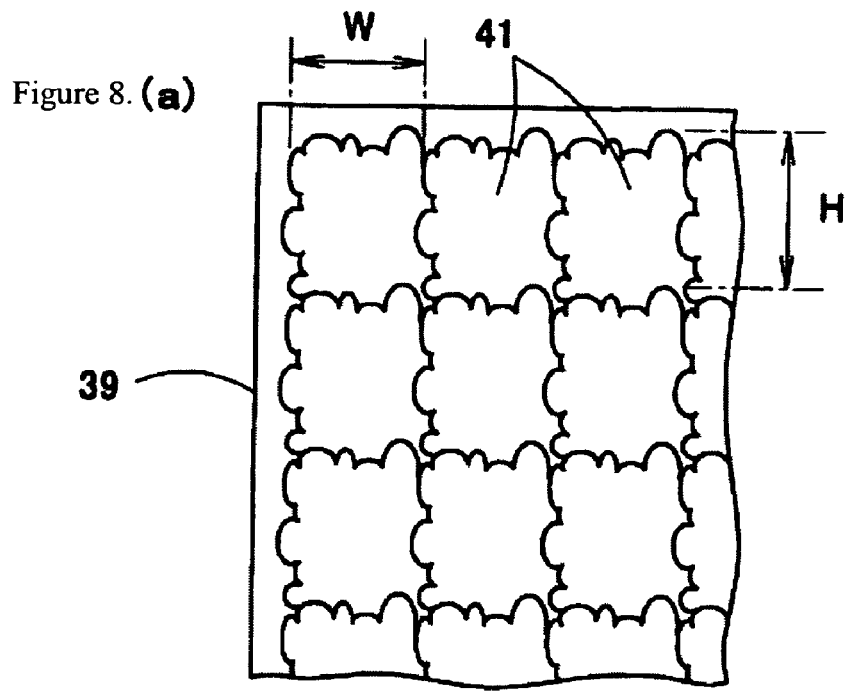
[FIG. 8]
Figure 8:
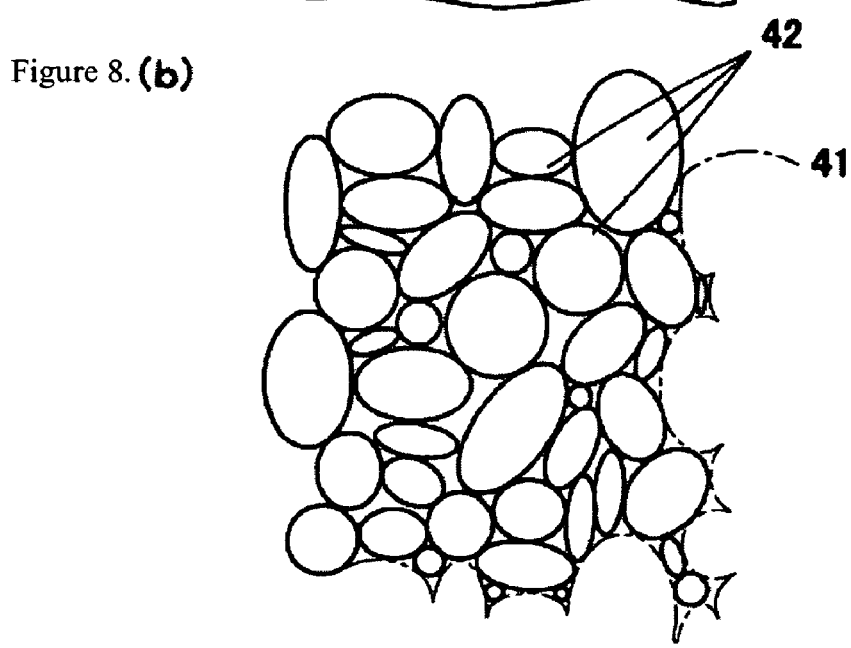
Figure 8:
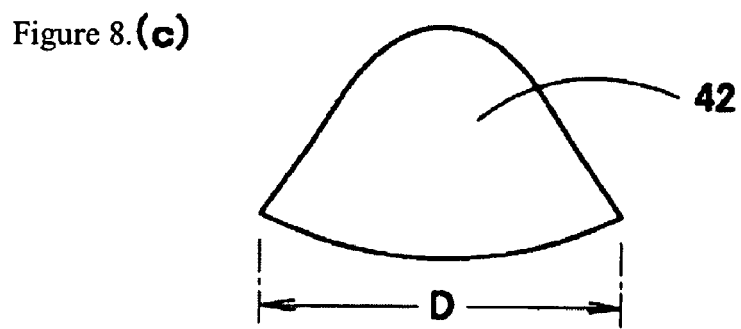
Figure 33:
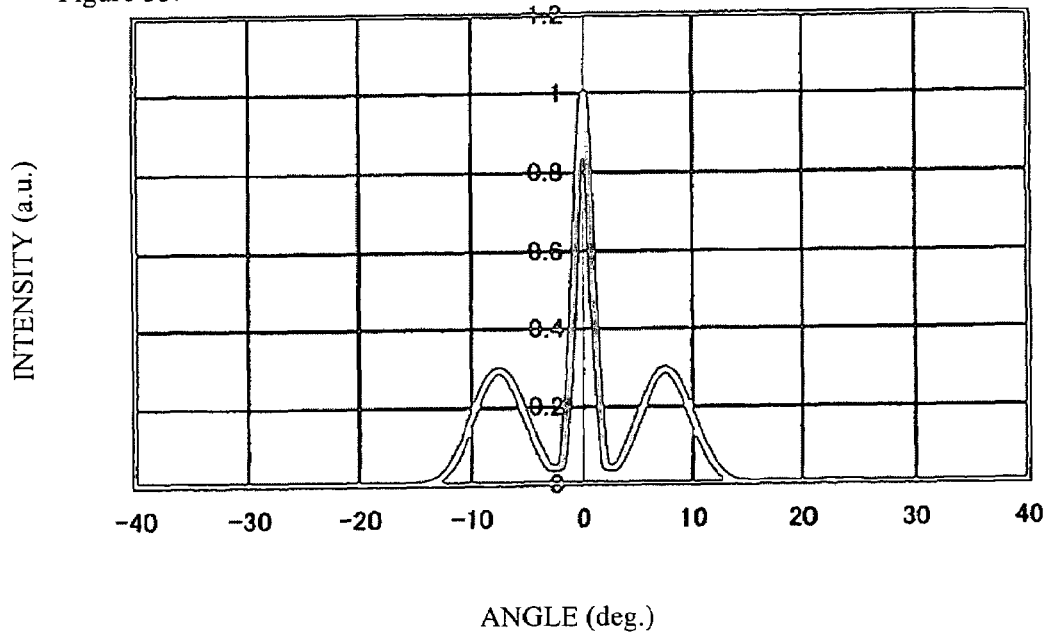
[FIG. 33]
Figure 34:
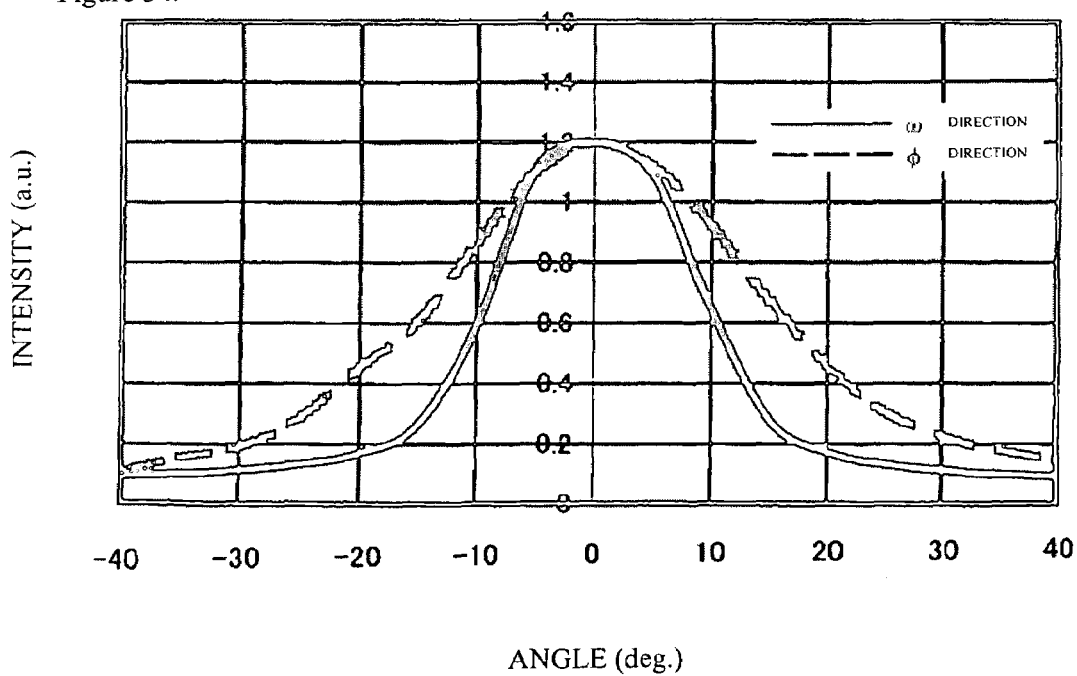
[FIG. 34]

In contrast, FIG. 33 illustrates directivity when a parallel light is incident normally upon the irregular diffusion plate 39 shown in FIG. 8. In case of placing the irregular diffusion plate 39 the prism sheet 40, directivity in the ω direction and in the φ direction is as shown in FIG. 34. That is, a half-value total width $\Delta\omega$, $\Delta\phi$ in the ω direction and in the φ direction, respectively, are $\Delta\omega=20°$ and $\Delta\phi=29°$, a difference therebetween is $\Delta\phi-\Delta\omega=9°$, and a difference in half-value total width is decreased 58% as compared with the case of only the prism sheet 40. Therefore, radial unevenness in brightness can be considerably decreased. Also, a quantity of light included in a half-value total width $\Delta\omega=20°$ in a further narrow direction amounts to about 30% of the total quantity of light, and a useless light is decreased to 70%. Therefore, brightness in the vertical direction is improved around 20% as compared with general diffusion plates, and a brightness falling rate in a location apart ω=5° from the vertical direction falls below 10%, so that a state of being hard to see due to unevenness in brightness is substantially dissolved.

The reason for this is described below. A light outgoing from the light conductive plate 32 exhibits a little gentle profile as shown in FIG. 35(*a*). In contrast, in the case where an irregular diffusion plate possesses a gentle profile as shown in FIG. 35(*b*) in diffusion characteristic (directivity relative to a normal incident light) in the same manner as that for a light outgoing from the light conductive plate, a light outgoing from the light conductive plate and transmitting the irregular diffusion plate becomes further gentle, of which a profile is as shown in FIG. 35(*b*)' (just similar to a phenomenon, in which a center is pointed in auto-correlation). With such directivity, when it is tried to spread a light to some extent in the ω direction, a very intense diffusion is needed, so that a light is spread in the φ direction and $\Delta\phi-\Delta\omega$ is not so much decreased. Also, a useless light in an oblique direction is increased.

In contrast, in the case where an irregular diffusion plate is nearly rectangular in diffusion characteristic as shown in FIG. 35(*c*), a profile of a light outgoing from the light conductive plate and transmitting the irregular diffusion plate becomes nearly rectangular as shown in FIG. 26(*c*)'. While $\Delta\omega$ is enlarged much owing to such relatively small diffusion, $\Delta\phi$ is not enlarged so much, so that $\Delta\phi-\Delta\omega$ is decreased. For example, in the case where a diffusion plate possessing a diffusion characteristic shown in FIG. 36(*a*), which is fairly larger than a directional angle $\Delta\omega$ (shown in FIG. 36(*b*)) of the diffusion plate in the ω direction and fairly smaller than a directional angle $\Delta\phi$ (shown in FIG. 36(*b*)') of the diffusion plate in the φ direction is placed on the light conductive plate, a directional angle $\Delta\omega$ of a light having transmitted the irregular diffusion plate in the ω direction is dependent upon a directivity of a diffusion plate possessing a larger diffusion characteristic than a directional angle of a light outgoing from the light conductive plate as shown in FIG. 36(*c*). In contrast, since a directivity of a light outgoing from the light conductive plate in the φ direction is originally enlarged as shown in FIG. 36(*b*)', a directivity of a light having transmitted the irregular diffusion plate is only a little gentle in a center and in end portions as shown in FIG. 36(*c*)' and is not varied in half-value width. Therefore, in the case where a directional angle of a light outgoing from the light conductive plate is narrow in the ω direction and large in the φ direction, there is produced an effect that $\Delta\phi-\Delta\omega$ is decreased by the use of a diffusion plate having a small diffusion.

Further, in case of a diffusion characteristic having peaks on both sides of a direction perpendicular to a light conductive plate as shown in FIG. 35(*d*), a profile of a light outgoing from the light conductive plate and transmitting an irregular diffusion plate becomes further nearly rectangular as shown in FIG. 35(*d*)' and a ratio of a light entering in a necessary angle is increased.

Figure 37:
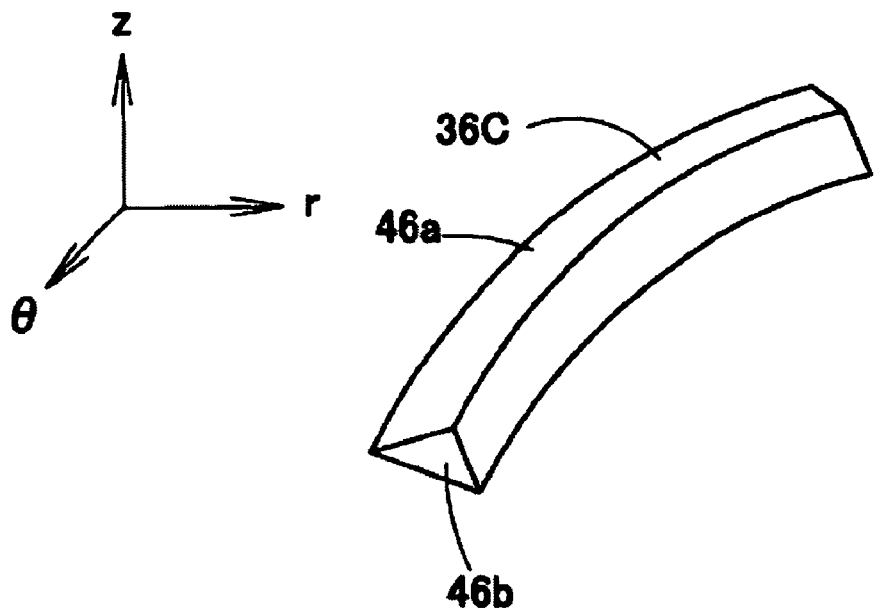
[FIG. 37] FIG. 37(*a*) is a perspective view showing a diffusion pattern of another configuration, FIG. 37(*b*) is a plan view showing the diffusion pattern, and FIG. 37(*c*) is a side view showing the diffusion pattern.
Figure 37:
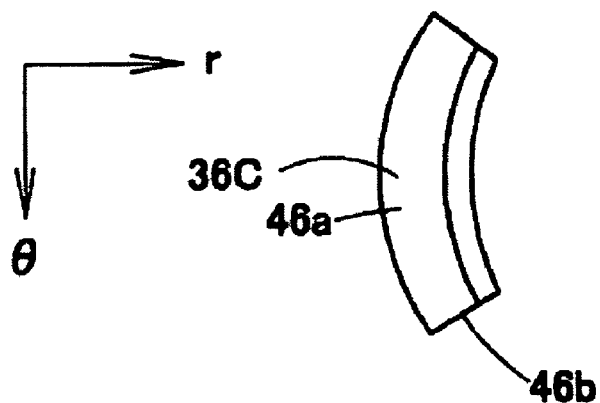
Figure 37:
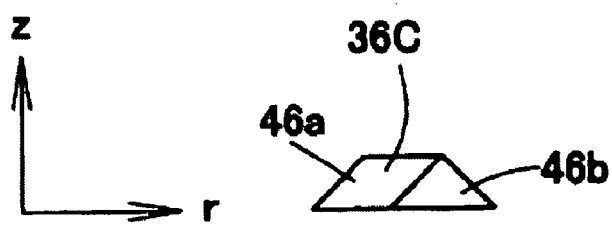
Figure 38:
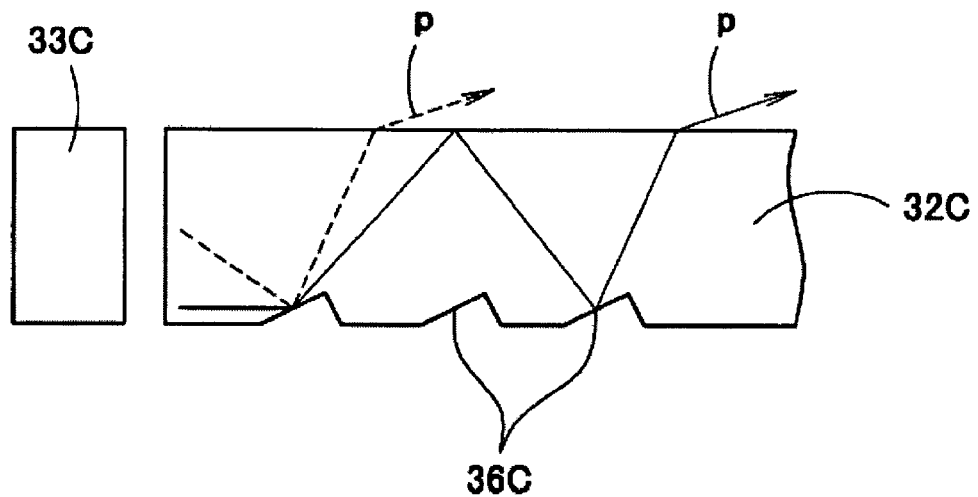
[FIG. 38]

In addition, in order to enlarge a directivity of an outgoing light in the θ direction and in the ω direction, a method of curving along the θ direction is also conceivable as in a diffusion pattern 36C shown in FIGS. 37(*a*), 37(*b*), and 37(*c*). In addition, a θ axis is defined in a direction perpendicular to the z r plane. With such method, however, a light impinging on the diffusion pattern 36C at a large angle like a light L indicated by broken lines in FIG. 38, among a light L impinging on the diffusion pattern 36C to be deflected, outgoes once while a light impinging first on the diffusion pattern 36C at a small angle a light L indicated by solid lines in FIG. 38 is reflected plural times by the diffusion pattern 36C and then outgoes from the diffusion pattern 36C, so that there is caused a problem that spread in the θ direction becomes large and as it is distant from the light emission part 33C, spread of an outgoing light L in the θ direction becomes large. With the surface light source equipment 31 according to the invention, the diffusion pattern 36 is linear in shape and so such problem is not caused.

Also, with the diffusion pattern 36C shown in FIGS. 37(*a*), 37(*b*), and 37(*c*), when viewed in a direction perpendicular to a light conductive plate 32C, an advancing direction of a light is bent after the light impinges on the diffusion pattern 36C at a first time, so that the diffusion pattern becomes difficult to design so as to provide for a uniform brightness. Therefore, a deflection angle on the diffusion pattern 36C in the θ direction cannot be increased so much, and when such deflection angle is made large, an ordinary system, in which a light is diffused and spread, results unlike a system, in which a light is straight spread radially to outgo in a concentric pattern as intended by the invention. A deflection angle in the z r plane and a deflection angle in the x y plane are preferably present in average at 4:1 (desirably, 10:1), but due to the above reason, it is difficult with the diffusion pattern 36C shown in FIGS. 37(*a*), 37(*b*), and 37(*c*) to realize such deflection angle.

Figure 39:
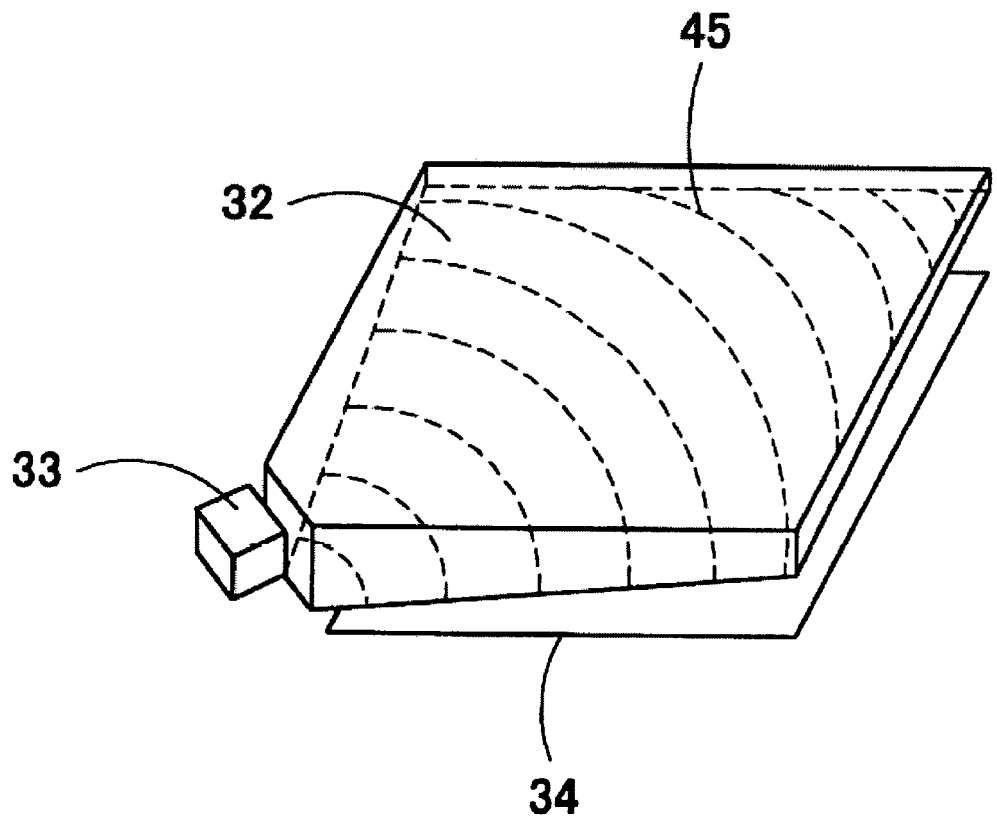
[FIG. 39]

Also, a wedge-shaped light conductive plate 32, which becomes thin on a side distant from a light emission part 33 as shown in FIG. 39, may be used in a method, in which a light in the light conductive plate 32 is caused to outgo from a light outgoing surface 45. With the light conductive plate 32 being rectangular as viewed in plan view, the light conductive plate, which emits a light, is varied in the area according to a θ direction (see FIG. 10), and a quantity of light outgoing from the light emission part 33 is also varied according to an orientation (an angle θ), so that brightness is made uniform by making the light conductive plate 32 wedge-shaped and using the diffusion pattern 36.

Embodiment 2

Figure 40:
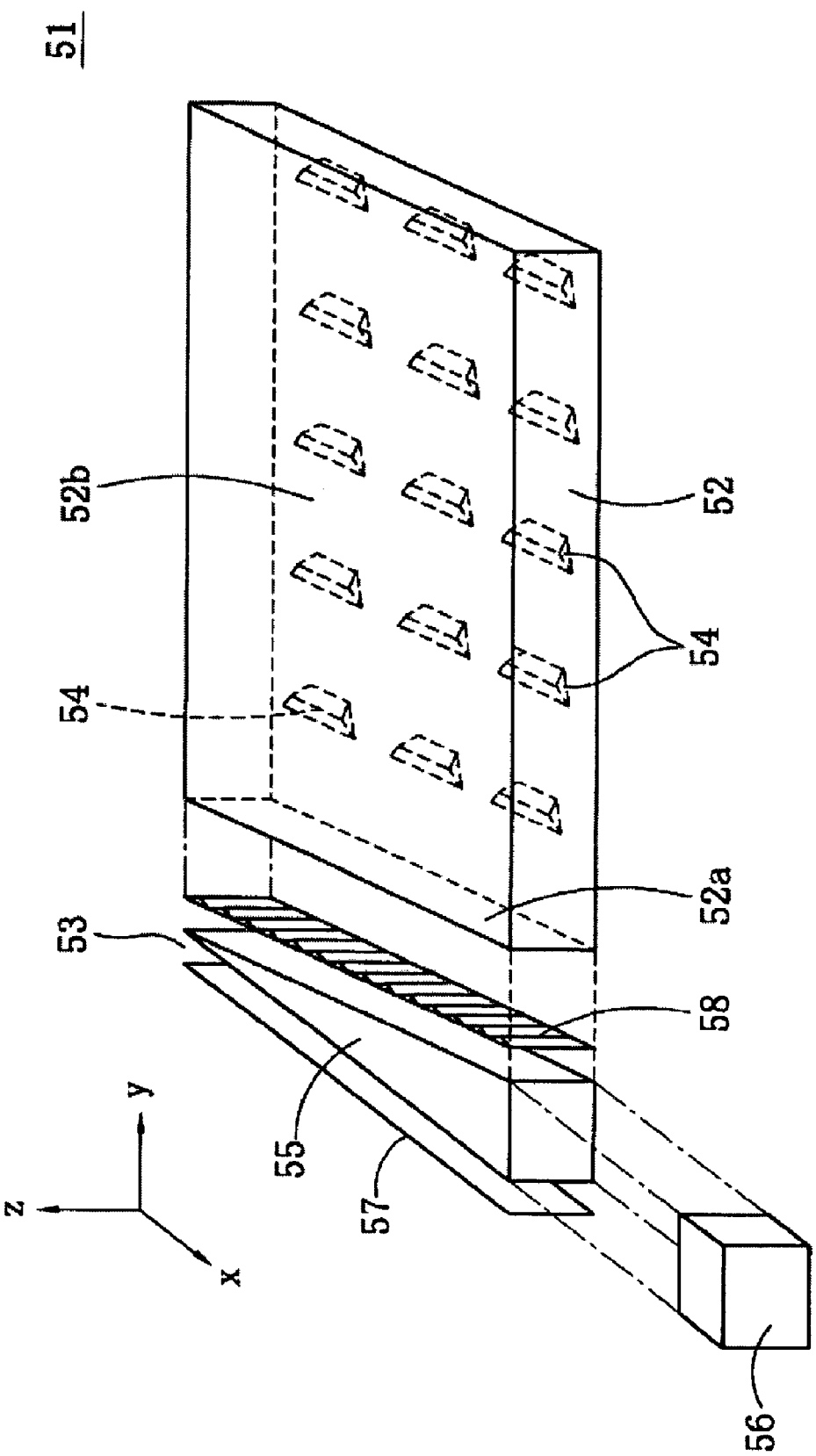
[FIG. 40]

Subsequently, an explanation will be given to Embodiment 2 of the invention, which possesses a characteristic near to an ideal diffusion characteristic. First, FIG. 40 is an exploded perspective view showing a construction of a backlight type surface light source equipment 51 according to Embodiment 2. The surface light source equipment 51 comprises a transparent light conductive plate 52 and a light emission part 53 arranged in opposition to a light incident surface 52a of the light conductive plate 52. The light conductive plate 52 is formed from a transparent resin (for example, polycarbonate resin, methacrylic resin) having a high refractive index to be in the form of a rectangular flat plate, and provided on a lower surface thereof with a plurality of parallel diffusion patterns 54.

The diffusion patterns 54 are formed by recessing a lower surface of the light conductive plate 52 to have a cross sectional shape of a substantially right triangle, an inclined surface thereof toward the light emission part defines a reflection surface 54a, and a back surface (a re-incident surface) 54c is defined by a substantially vertical surface. The diffusion patterns 54 are spaced from one another and arranged in parallel to the light incident surface 52a, and the more distant from the light incident surface 52a, the shorter intervals between the diffusion patterns 54.

Those inclined surfaces of the diffusion patterns 54 having a triangular cross section, which face the light emission part 53, that is, the reflection surfaces 54a desirably have an angle of inclination of around 50°. Also, a direction of a normal line to the reflection surface 54a of each of the diffusion patterns 54 is in parallel to a direction (a y-axis direction) connecting between the light emission part 53 and the diffusion pattern 54 as viewed in plan view. Also, the diffusion patterns 54 are formed so that the more distant from the light emission part 53, the gradually larger a pattern density.

Front edges (edges toward the light emission part 53) of the reflection surfaces 54a of the diffusion patterns 54 are longer than rear edges thereof (edges distant from the light emission part 53). That is, like the diffusion patterns 36 of Embodiment 1 (see FIG. 7), the reflection surfaces 54a of the diffusion patterns 54 are trapezoidal in shape and the back surface 54c are rectangular in shape. Accordingly, when the diffusion patterns 54 are viewed from a side of the light emission part 53, left and right side surfaces 54b of the diffusion patterns 54 hide behind the reflection surfaces 54a and are not seen from a side of the light emission part 53.

The light emission part 53 comprises a wedge-shaped light conductive body (referred below to as a wedge-shaped light conductive body) 55 made of a transparent resin having a high refractive index, a small light source (referred below to as a point light source) 56 arranged in opposition to a side end surface of the wedge-shaped light conductive body 55, a regular reflection plate 57 arranged behind the wedge-shaped light conductive body 55, and a prism sheet 58 arranged in front of the wedge-shaped light conductive body 55. Here, the point light source 56 comprises one or plural LEDs sealed in a transparent resin, a transparent resin except a front surface thereof is covered by a white resin, and a light outgoing from LED is reflected directly or by an inner surface of the white resin and then emitted forward efficiently.

Figure 41:
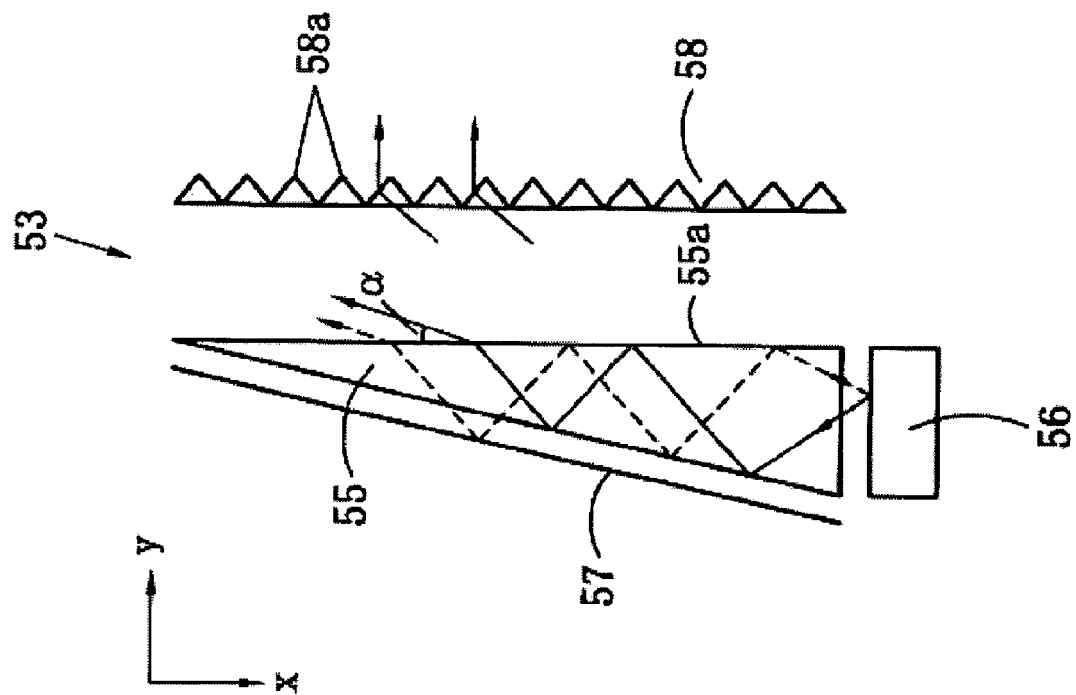
[FIG. 41]

A light L (lambert light) outgoing from the point light source 56 enters the wedge-shaped light conductive body 55 from the side end surface of the wedge-shaped light conductive body 55. The light L incident upon an interior of the wedge-shaped light conductive body 55 is repeatedly reflected by the front surface (light outgoing surface) 55a and the back surface of the wedge-shaped light conductive body 55 to advance in the interior of the wedge-shaped light conductive body 55, and each time the light is reflected by the back surface of the wedge-shaped light conductive body 55, it is decreased in an incidence angle, at which it is incident upon the front surface 55a, and caused to outgo outside from the front surface 55a of the wedge-shaped light conductive body 55 in a location, in which an incidence angle on the front surface 55a of the wedge-shaped light conductive body 55 becomes smaller than a critical angle of total reflection. Also, as shown by broken lines in FIG. 41, the light L outgoing outside from the back surface of the wedge-shaped light conductive body 55 is reflected by the regular reflection plate 57 to return again into the wedge-shaped light conductive body 55 to outgo from the front surface 55a of the wedge-shaped light conductive body 55. In this manner, the light L outgoing from the front surface 55a of the wedge-shaped light conductive body 55 is aligned in a direction (substantially a negative direction of the x axis) substantially in parallel to the front surface 55a of the wedge-shaped light conductive body 55.

The prism sheet 58 arranged on the front surface 55a of the wedge-shaped light conductive body 55 is also made of a transparent resin having a high refractive index (for example, a transparent resin having refractive index of 1.59) and a plurality of prisms 58a are arranged on a front surface of the prism sheet 58. The respective prisms 58a are triangular-shaped in cross section to have an apex angle of 40°, and extend uniformly in a vertical direction (a thickness-wise direction of the light conductive plate 52). Thus, the light L outgoing from the front surface 55a of the wedge-shaped light conductive body 55 transmits the prisms 58a to be refracted, whereby it is deflected in a direction substantially perpendicular to the prism sheet 58 and thereafter is made incident substantially perpendicular to the light conductive plate 52 from the light incident surface 52a. Therefore, the light emission part 53 enables a light outgoing from the point light source 56 to be spread over a substantially total length of the prism sheet 58 to outgo, and thus enables converting the point light source 56 into a linear light source.

In addition, a part of a light transmitted through the prism sheet 58 is in some cases made a stray light due to molding error such as roundness at an apex of a prism cross section in the prism sheet 58, Fresnel reflection or the like. Therefore, when at least a half or more of a light outgoing from the point light source 56 should be deflected by the prism sheet 58 to be made incident upon the light conductive plate 52 at a desired angle (in this embodiment, a direction perpendicular to the light incident surface 52a), a ratio of a light outgoing substantially in parallel to the front surface 55a from the front surface 55a of the wedge-shaped light conductive body 55 desirably amounts to ⅔ or more of a whole light outgoing from the point light source 56.

For the sake of comparison, taking into consideration the case where a diffusion reflection plate is used on the back surface of the wedge-shaped light conductive body 55 in place of the regular reflection plate 57, a light outgoing along the front surface 55a from the front surface 55a of the wedge-shaped light conductive body 55 amounts to at most a half of a total quantity of a light outgoing from the point light source 56. The reason for this is that since like the light L shown by broken lines in FIG. 41, a light L leaking from the back surface of the wedge-shaped light conductive body 55 impinges on the diffusion reflection plate to be reflected substantially in a lambert distribution, little light is caused to outgo along (substantially a negative direction of the x axis) the front surface 55a of the wedge-shaped light conductive body 55.

Figure 42:
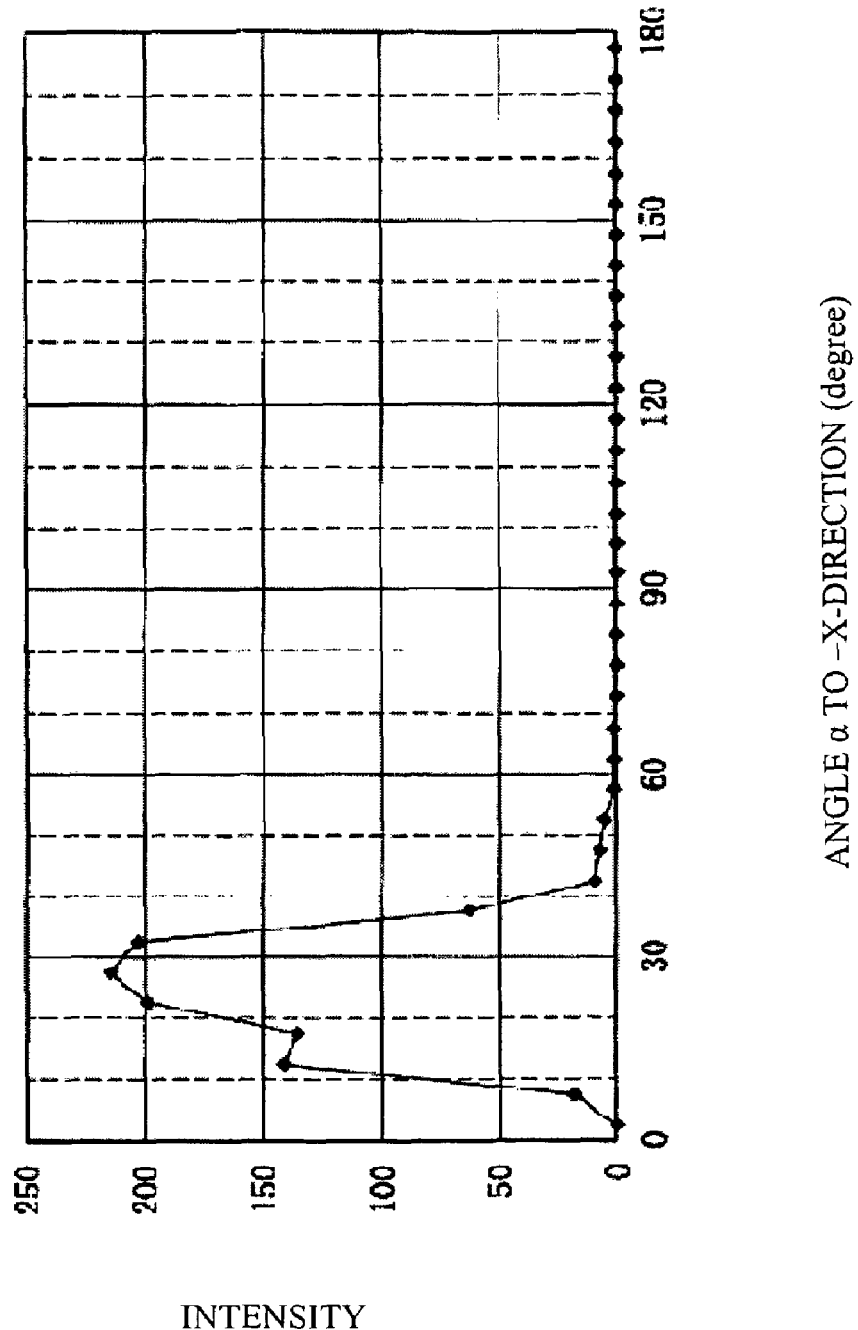
[FIG. 42]
Figure 43:
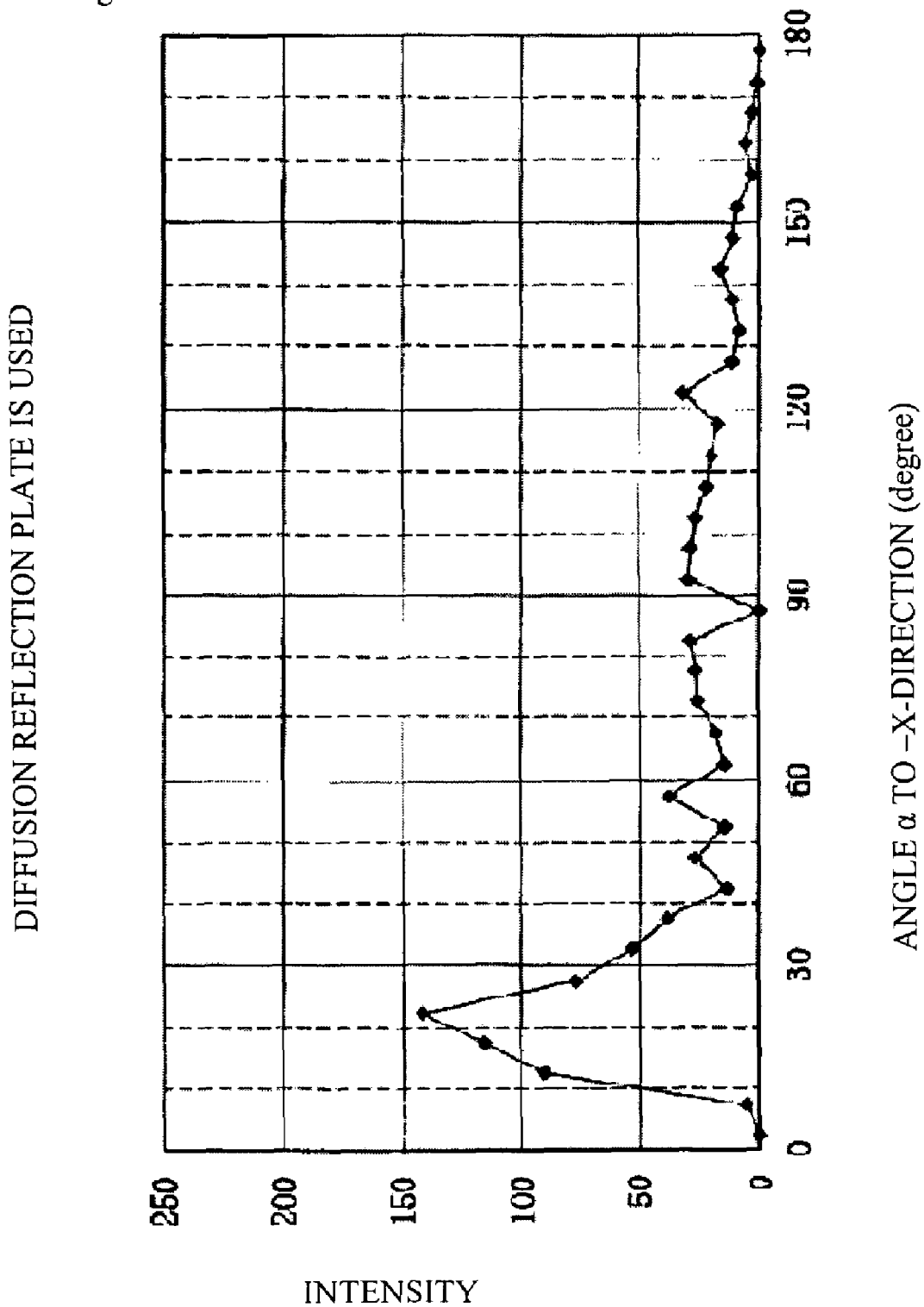
[FIG. 43]

While it has been described that the light emission part 53 constructed according to the embodiment can convert a point light source into a linear light source, a light outgoing from the linear light source can be substantially uniformly aligned in direction. FIG. 42 illustrates results of measurement of the relationship between an angle α (see FIG. 41), which a light outgoing from the wedge-shaped light conductive body 55 forms relative to the front surface 55a (substantially a negative direction of the x axis), and intensity of a light in the direction, for a configuration, where a regular reflection plate, which is free of any diffusion action and in which an incidence angle and an outgoing angle are equal to each other, is arranged at the back of the wedge-shaped light conductive body 55. FIG. 43 illustrates results of measurement of the relationship between an angle α (see FIG. 41), which a light outgoing from the wedge-shaped light conductive body 55 forms relative to the front surface 55a (substantially a negative direction of the x axis), and intensity of a light in the direction, in the case where a regular reflection plate at the back of the wedge-shaped light conductive body 55 is replaced by a diffusion reflection plate. In the measurement, a wedge-shaped light conductive body 55, which had a length of 30 mm and a thickness of 1 mm, of which a side surface opposed to a point light source 56 had a width of 2 mm, and which had a refractive index of 1.53, and a regular reflection plate or a diffusion reflection plate having a length of about 30 mm were used. Also, the measurement was made in a state, in which the prism sheet 58 was removed.

Figure 44:
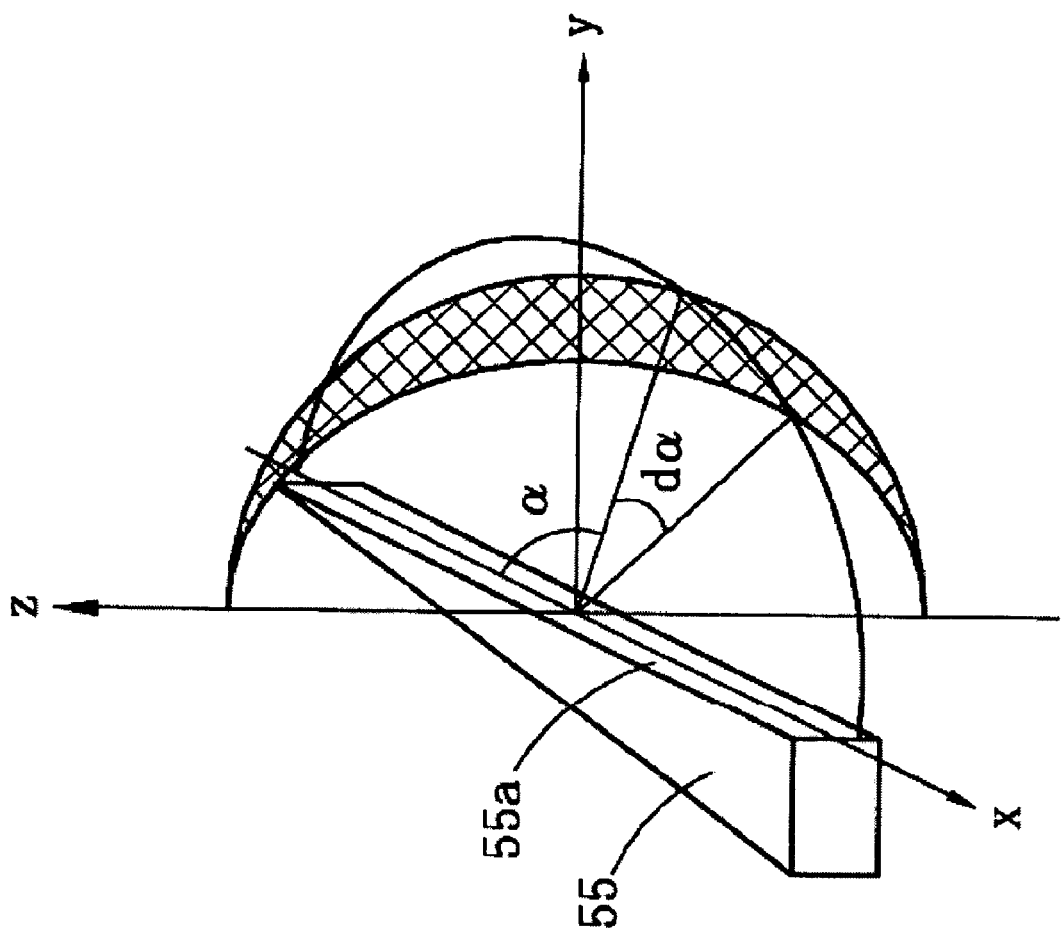
[FIG. 44]

In addition, in graphs illustrated in FIGS. 42 and 43, light intensity (energy) in a α direction do not represent an angle distribution of a light outgoing in the α direction in a plane (x y plane in FIG. 44) perpendicular to the front surface 55a of the wedge-shaped light conductive body 55 but intensity of a light included in a unit angle (dα=1) in the α direction when a whole light outgoing from the front surface 55a is projected onto the plane.

As seen from FIG. 42, in case of using a regular reflection plate, light intensity becomes maximum in a direction of a little less than about 30° and 98% of a total light quantity is concentrated in the range of 0° to 40°. When the light is deflected by the prism sheet 58 to be made incident upon the light conductive plate 52, 80% or more of light is included in the range of ±13° as viewed from above (the z-axis direction) even if loss of about 10% is generated due to fabrication error of the prism sheet 58. In contrast, in case of using a reflection plate commonly used and having an intense diffusion, only 52% of light is concentrated in the range of 0° to 40° as shown in FIG. 43. Besides, when loss attributable to the prism sheet 58 is added, it is not possible to narrow a directivity in the light conductive plate 52.

Accordingly, such light emission part 53 makes it possible to use the point light source 56, which makes use of LED, etc., and the wedge-shaped light conductive body 55 to make light emission over a long region like a linear light source and to substantially uniformly align a lambert light outgoing from the point light source to emit the same as a light having a narrow directivity.

In this manner, a light made incident into the light conductive plate 52 from the light incident surface 52a repeats total reflection between an upper surface (a light outgoing surface 52b) and a lower surface of the light conductive plate 52 to advance in the light conductive plate 52 from a side near to the light emission part 53 to a side distant therefrom. When the light is made incident upon the triangular-shaped diffusion patterns 54 provided on the bottom surface of the light conductive plate 52, a part of the light is reflected by the diffusion patterns 54 to outgo from the light outgoing surface 52b. Since such triangular-shaped diffusion patterns 54 are lengthy in the x-axis direction, a light is not varied in directivity in the x-axis direction even when being reflected by the diffusion patterns 54. Accordingly, the light aligned by the light emission part 53 and having a narrow directivity in the x-axis direction is maintained narrow in directivity in the x-axis direction also after being reflected by the diffusion patterns 54 to outgo in the z-axis direction. On the other hand, a light propagated in the light conductive plate 52 is spread in the z-axis direction and such spread makes spread in the y-axis direction when the light reflected by the diffusion patterns 54 in the z-axis direction. However, such spread in the y-axis direction can be narrowed by restricting an angle of a light reflected by the diffusion patterns, so that directivity, in the y-axis direction, of a light after outgoing from the light outgoing surface 52b can be made narrower than directivity, in the z-axis direction, in the light conductive plate 52. In a typical example, in the case where a light outgoing from the light outgoing surface 52b of the light conductive plate 52 is viewed from in the x-axis direction, directivity is included in the range of about 55° substantially centered on the z-axis direction in terms of total width, and in case of being viewed from in the y-axis direction, directivity is included in the range of about 25° centered on the z-axis direction in terms of total width.

Accordingly, the surface light source equipment 51 enables emitting a light in a direction perpendicular to the surface light source equipment 51 without the use of any prism sheet or the like, narrowing its directivity, and realizing a directional characteristic near to an ideal directional characteristic. Since any prism sheet is not used, the surface light source equipment 51 can be made low in cost and thinned.

Figure 45:
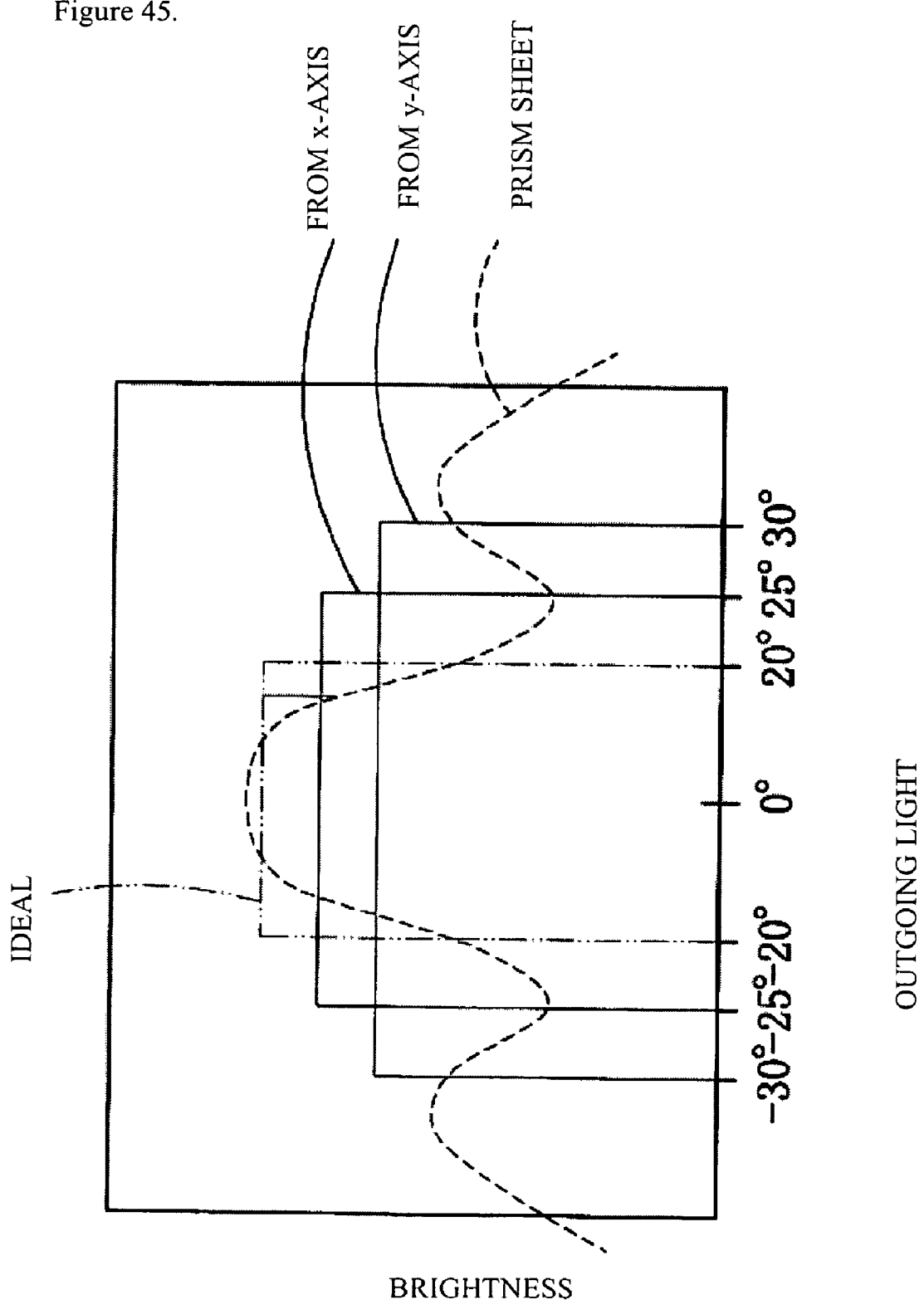
[FIG. 45]

In contrast, with a method, in which two prism sheets with pattern directions made perpendicular to each other overlap together to heighten a light in directivity, the directional characteristic of a light assumes a pattern indicated by a broken line in FIG. 45. Even when the directivity of a light before being incident upon the prism sheets were ±30°, a half or more of the light could not be caused to outgo in the range of ±20° after passing through the two overlapped prism sheets.

Also, with the surface light source equipment 51, the whole light outgoing surface 52b of the light conductive plate 52 is made uniform in brightness by arranging the diffusion patterns 54 at large intervals in a region close to the light emission part 53 and arranging the diffusion patterns 54 gradually at short intervals as they are spaced from the light emission part 53.

Figure 46:
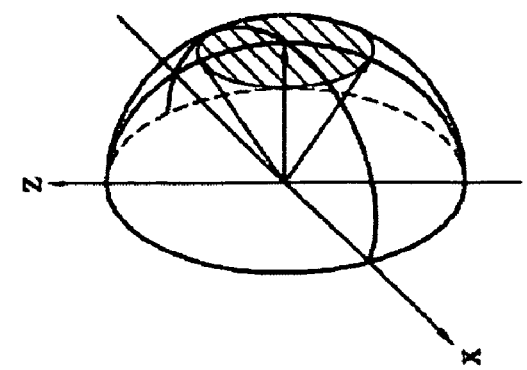
[FIG. 46]
Figure 46:
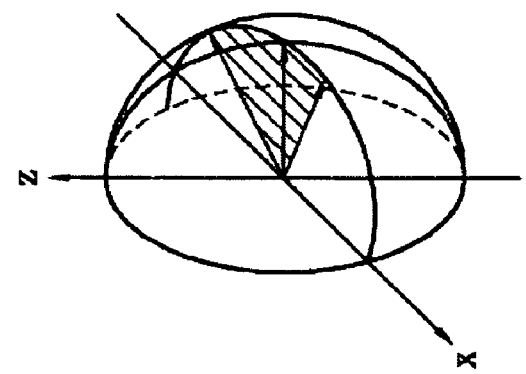
Figure 46:
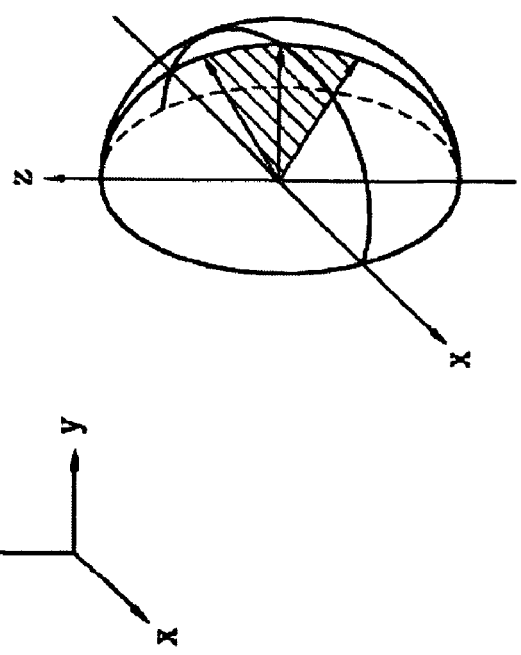

Subsequently, an explanation will be given to an action of the diffusion patterns 54, which are triangular-shaped in cross section. For the directivity of a light before being incident upon the diffusion patterns 54, let consider one being narrow only in the x-axis direction as shown in FIG. 46(a), one being narrow only in the z-axis direction as shown in FIG. 46(b), and one being narrow in the x-axis direction and in the z-axis direction as shown in FIG. 46(c). Among these, the case shown in FIG. 46(c) is excepted since a narrow directivity as shown in FIGS. 46(a) and 46(b) is not presented in any direction.

Figure 47:
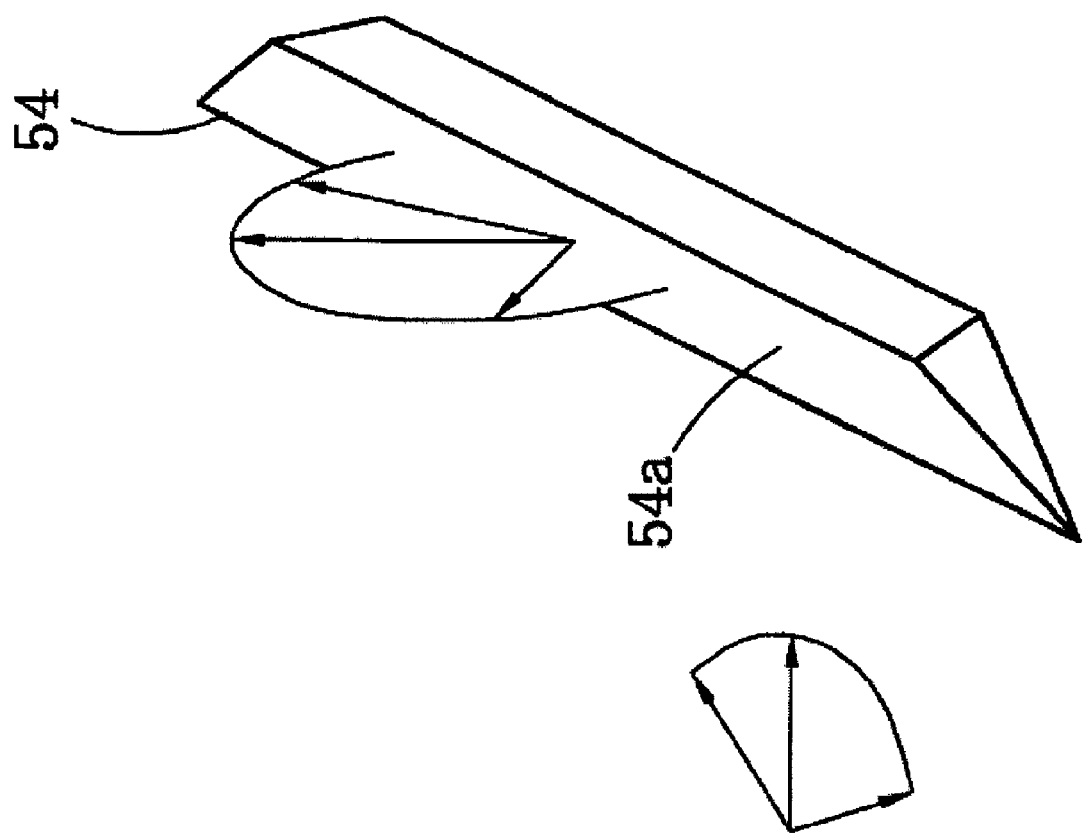
[FIG. 47]
Figure 48:
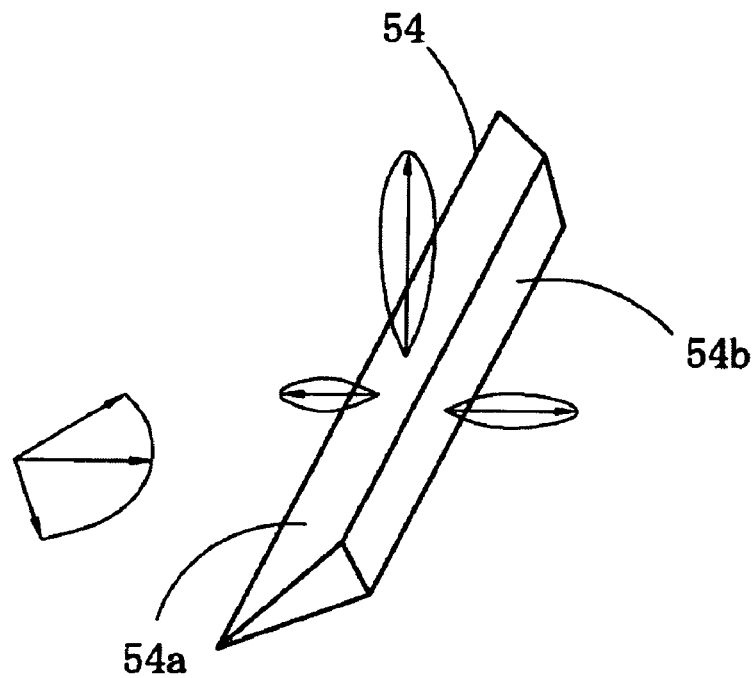
[FIG. 48]
Figure 48:
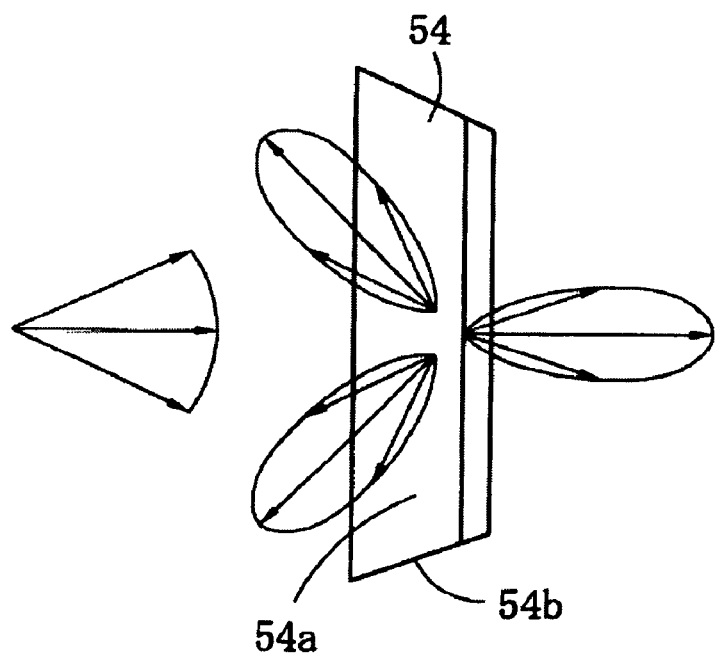
Figure 49:
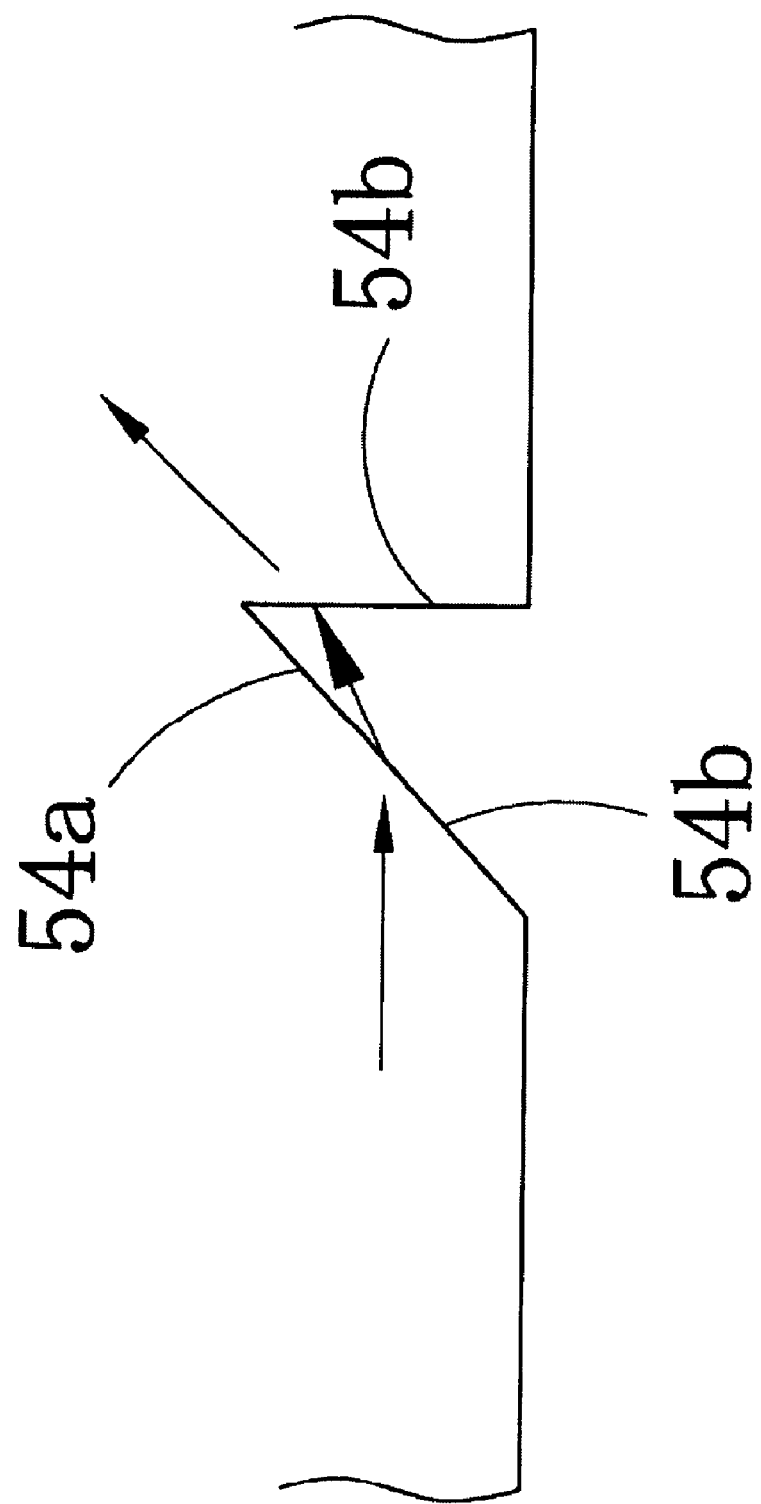
[FIG. 49]

Subsequently, let consider the case where a light being narrow in directivity only in the z-axis direction as shown in FIG. 46(b) is made incident upon the diffusion pattern 54. In this case, when a whole light made incident upon the diffusion pattern 54 is totally reflected by the reflection surface 54a of the diffusion pattern 54 as shown in FIG. 47, a light reflected by the diffusion pattern 54 is not varied in directivity. In particular, the directivity in the x-axis direction is not made narrow. Hereupon, when the reflection surface 54a of the diffusion pattern 54 is increased in angle of inclination, a part of a light is reflected by the diffusion pattern 54, and a part of a light is transmitted through the diffusion pattern as shown in FIGS. 48(a) and 48(b), a light totally reflected by the reflection surface 54a of the diffusion pattern 54 outgoes in a direction inclined much relative to the z-axis, and a light transmitted through the reflection surface 54a of the diffusion pattern 54 and made re-incident from the back surface 54c is also varied in angle when being made re-incident, so that the directivity in the z-axis direction is destroyed. Accordingly, with a light being narrow in directivity only in the z-axis direction as shown in FIG. 46(b), it is very difficult to narrow the directivity also in the x-axis direction.

In contrast, even in the case where a light having a narrow directivity only in the x-axis direction as shown in FIG. 46(a) has a relatively large spread in the z-axis direction, for example, before incidence like lights L1, L2, and L3 shown in FIG. 50(a) when made incident upon the reflection surface 54a of the diffusion pattern 54, which is lengthy in the x-axis direction and triangular-shaped in cross section, a region of a light reflected by the diffusion pattern 54 can be limited to a partial one by causing the reflection surface 54a to total-reflect partial lights L1, L2 as shown in FIG. 50(b) and transmitting partial lights L2, L3 through the reflection surface 54a to make the same incident again from the back surface 54c as shown in FIG. 50(c), so that a light total-reflected by the diffusion pattern 54 and outgoing from the light outgoing surface 52b can be made narrow directivity in the y-axis direction. Besides, a light reflected by the reflection surface 54a can be easily caused to outgo in a direction (the z-axis) substantially perpendicular to the light outgoing surface 52b by setting an angle β of inclination of the reflection surface 54a of the diffusion pattern 54 to an appropriate value. On the other hand, since the diffusion pattern 54 extends uniformly in the x-axis direction, a light is not enlarged in directivity in the x-axis direction even when being total-reflected by the diffusion pattern 54. Also, while a light transmitted through the reflection surface 54a of the diffusion pattern 54 and made incident again from the back surface 54c as shown in FIG. 50(c) is varied in an angle, at which it advances, in the y z plane, it is not originally narrow in directivity in the z-axis direction, so that it is not enlarged in directivity in the z-axis direction. In addition, a light L2 centrally in FIG. 50(a) represents one incident upon the reflection surface 54a of the diffusion pattern 54 at a slightly larger or slightly smaller angle than a critical angle of total reflection.

Figure 50:
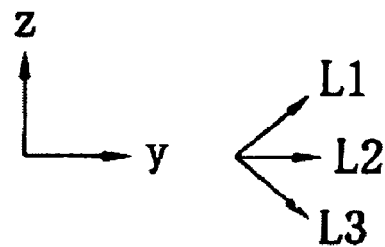
[FIG. 50]
Figure 50:
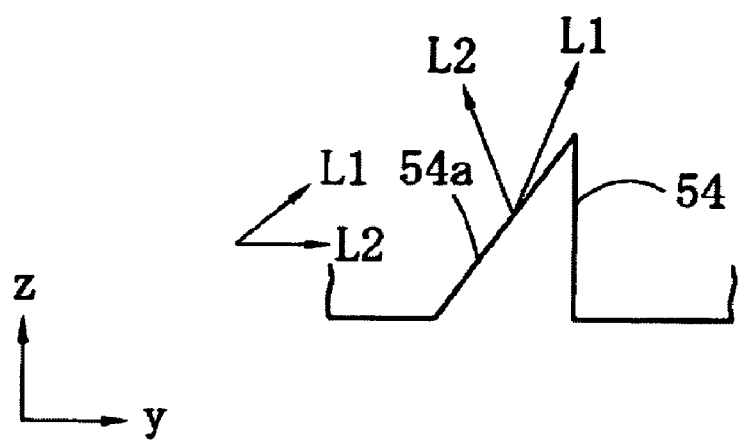
Figure 50:
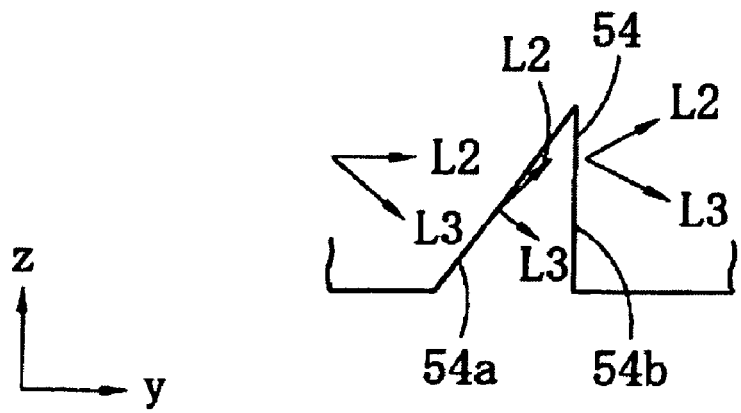
Figure 51:
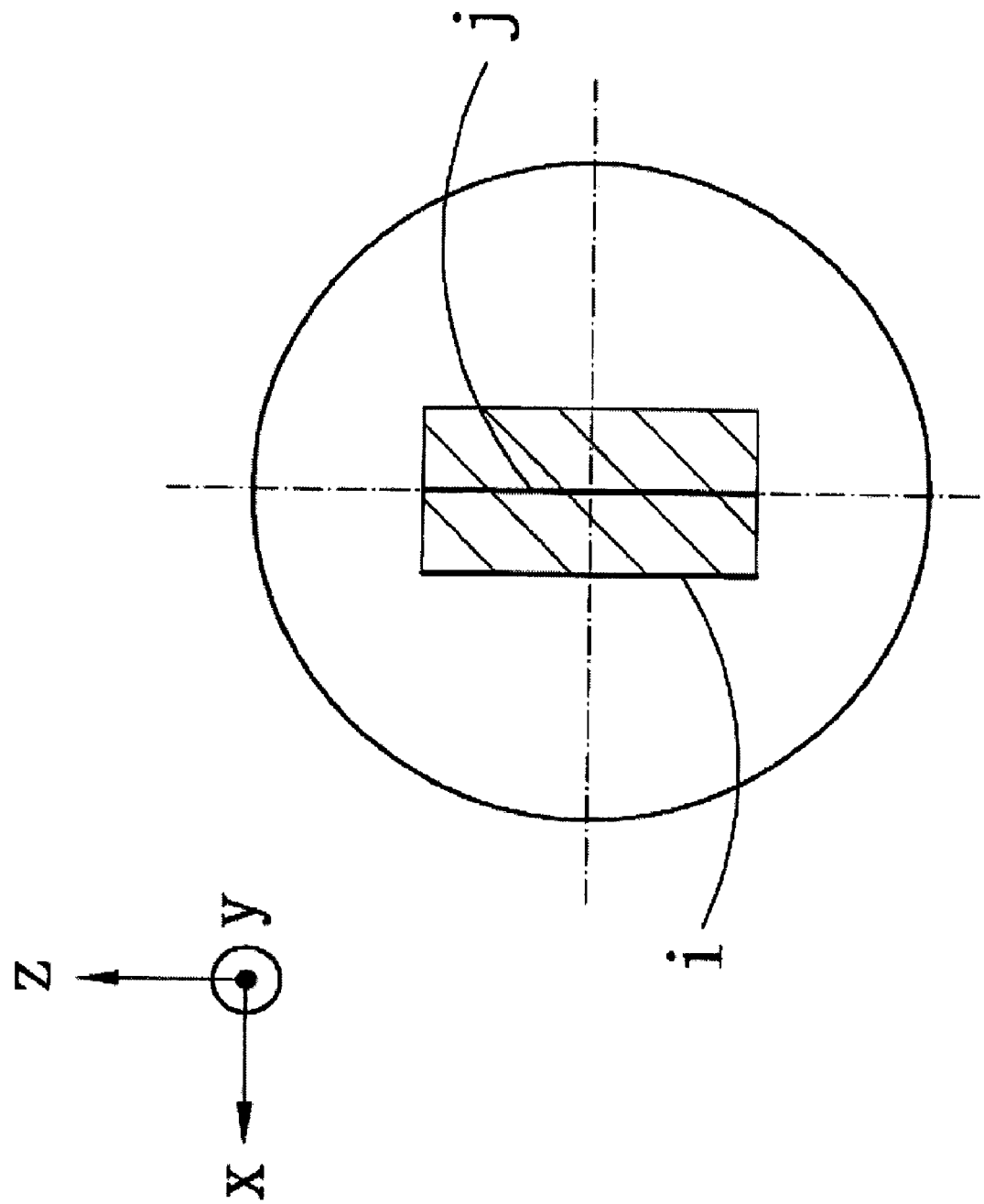
[FIG. 51]

While the case where a light is in no way spread in the x-axis direction has been described with reference to FIGS. 46(a) and 50, a light outgoing from the light emission part 53 is actually spread more or less. For example, taking into consideration a spatial frequency when a light propagated in the light conductive plate 52 is viewed in the y-axis direction, the light is considered to be concentrated on a region of oblique lines in FIG. 51. Here, a light on a center line j in parallel to the z-axis direction is one conducted in the y z plane and a light on a line i in parallel thereto indicates one inclined in the x-axis direction. In the case where the diffusion pattern 54 extends completely in parallel to the x-axis direction and the reflection surface 54a and the back surface 54c of the diffusion pattern 54 extend in parallel to each other as viewed in plan view, a light in the x-axis direction is not varied spatial frequency by reflection or transmission through the diffusion pattern 54. Therefore, a direction of advancement of a light in the light conductive plate 52 is not varied in the x y plane as far as a light is not caused to outgo, a light on the line i only shifts onto the line i, and a light on the line j only shifts onto the line j.

Figure 52:
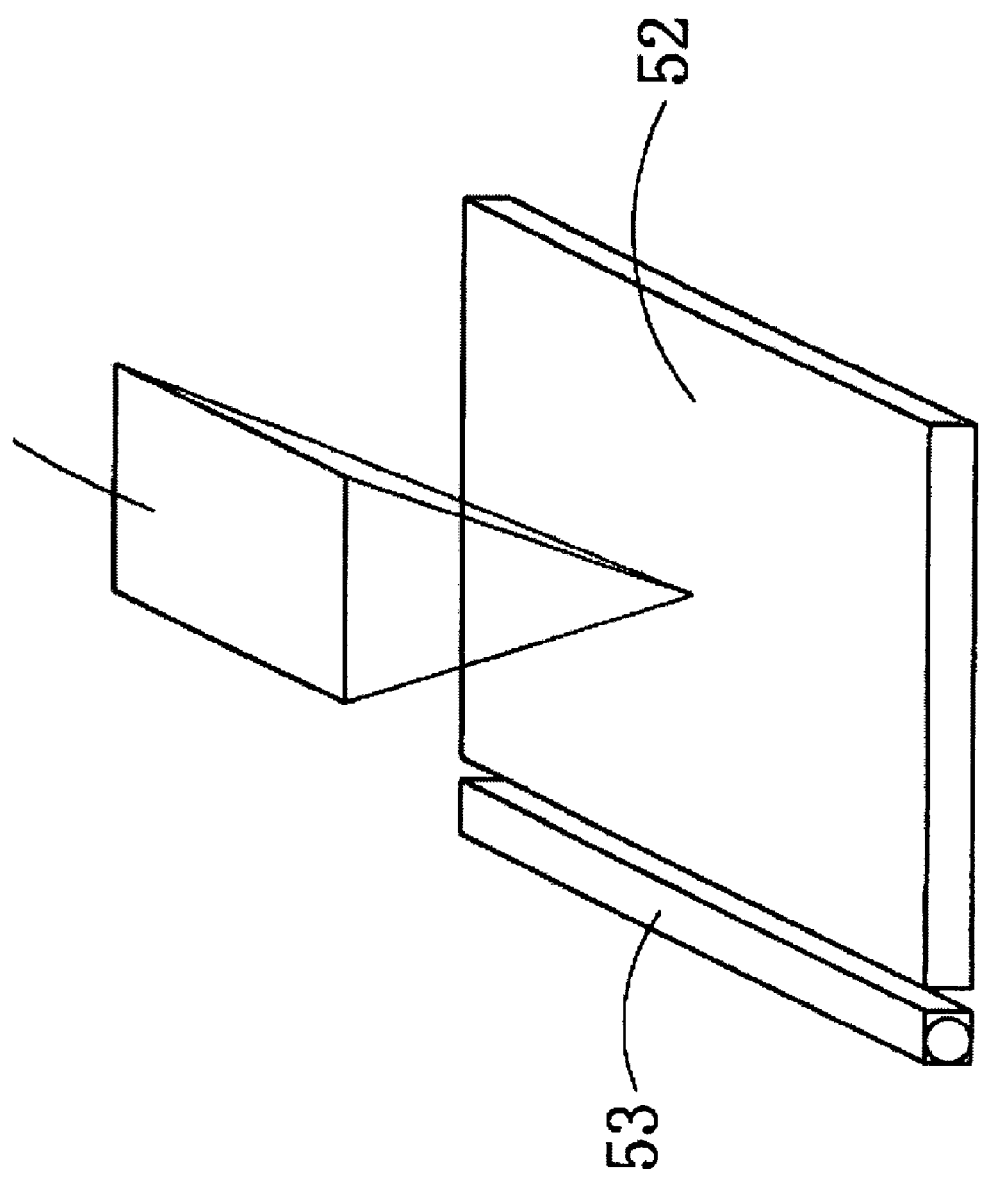
[FIG. 52]

Accordingly, in the case where a light is made narrow in directivity in the x-axis direction at the light emission part 53 and then the light is reflected by the diffusion pattern 54 to be made narrow in directivity in the y-axis direction, a light outgoing from the surface light source equipment 51 in the z-axis direction becomes narrow both in the x-axis direction and in the y-axis direction, and finally it is possible to emit a light having a narrow directivity in all directions as shown in FIG. 52. In addition, the character S in FIG. 52 indicates a directional characteristic of an outgoing light.

By the way, in order that the directivity of a light outgoing from the light conductive plate 52 in the x-axis direction be made ±20° or less, the directivity in the x-axis direction in the light conductive plate 52 is needed to be equal to ±13° or less. While the value of ±13° or less is calculated assuming that the light conductive plate 52 has a refractive index of 1.53, a transparent resin usable for the light conductive plate 52 has a refractive index in the range of 1.4 to 1.65 and thus that a directivity angle in the x-axis direction, which is needed in the light conductive plate 52, is not so much varied in the range. Also, even when the refractive index is further varied, the value of 13° or less in practical use is not so much varied. Accordingly, it suffices in designing the light emission part 53 to target the value.

Also, in the case where a center (a center of a spread of ±13° or less) of a direction of advancement of a light is in parallel to the y-axis direction, it suffices to make the diffusion pattern 54 in parallel to the x-axis direction, and in the case where a center of a direction of advancement of a light is inclined to the y-axis direction, in order to correct this, it suffices to also arrange a direction, in which the diffusion pattern 54 extends, oblique relative to the x-axis direction, so that a direction of advancement of a light and that direction, in which the diffusion pattern 54 extends, are made perpendicular to each other as viewed in plan view (in the x y plane).

Figure 53:
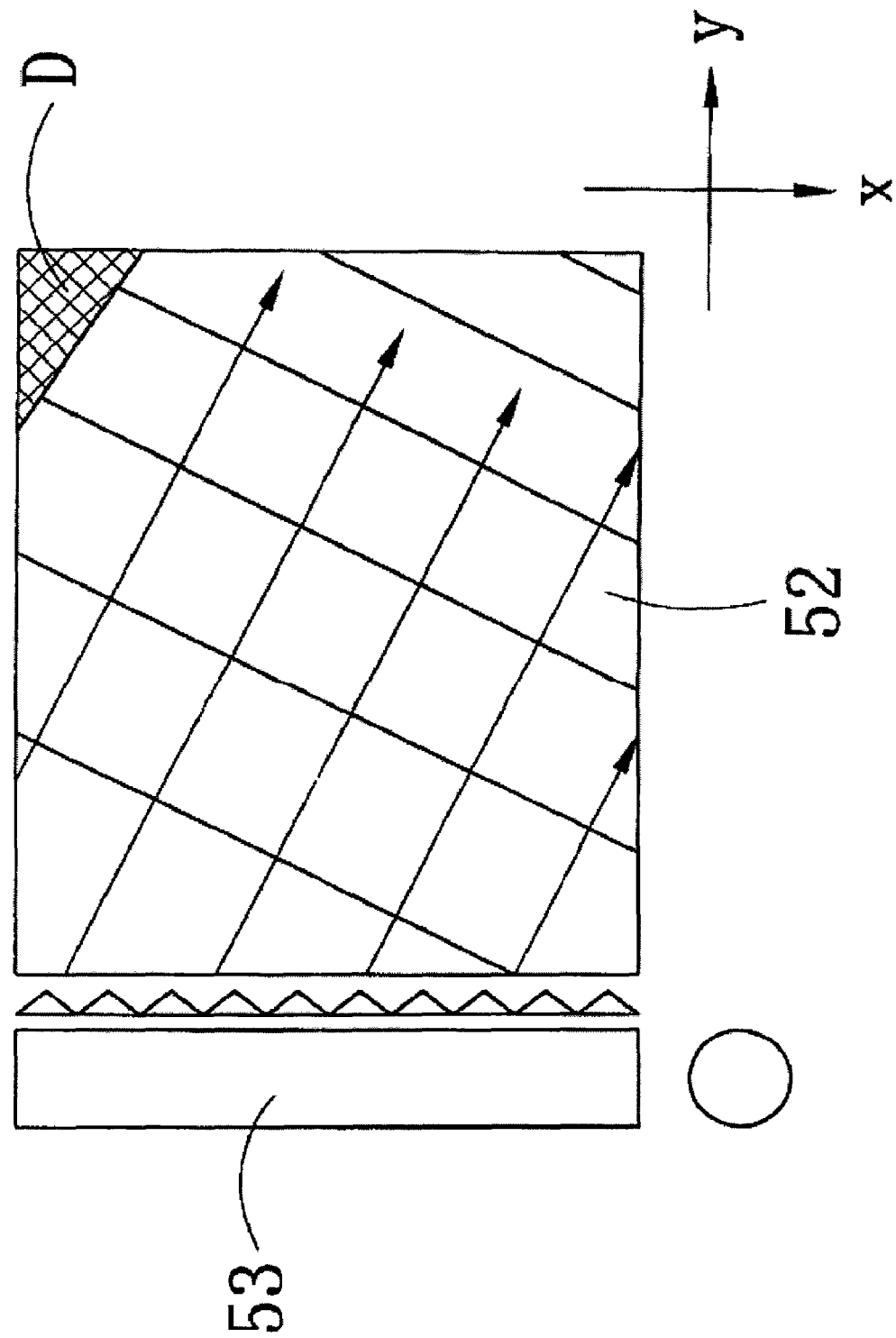
[FIG. 53]

Since with the surface light source equipment of this type, a light advancing in the light conductive plate 52 is very narrow in directivity, however, a corner E of the light conductive plate 52 becomes dark as shown in FIG. 53 in the case where a center of a direction of advancement of a light is inclined to the y-axis direction. Therefore, it is desired in a light conductive plate 52 having such rectangular light emission area that a center of a direction of advancement of a light is in a direction perpendicular to the light incident surface 52a, or at least within ±13° or less from the direction perpendicular to the light incident surface 52a. Also, there is caused no problem in the diffusion pattern 54 since a direction perpendicular to the light outgoing surface 52b of the surface light source equipment 51 is included in an angular range of ±20° of an outgoing light provided that a center of a direction of advancement of a light and the diffusion pattern 54 are in the range of ±13° even if they are completely perpendicular to each other.

Figure 54:
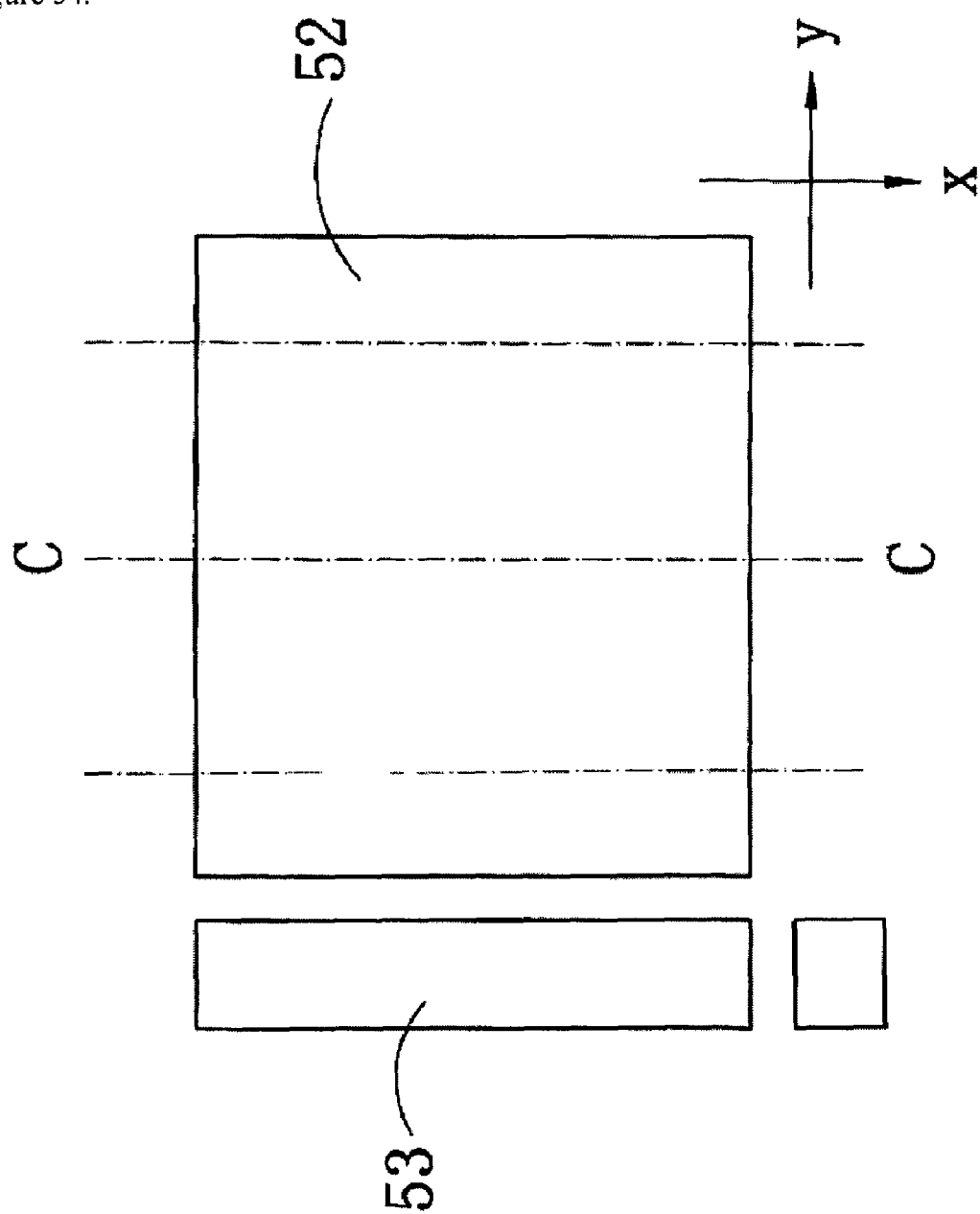
[FIG. 54]

In addition, in case of examining the directional characteristic of a light in the light conductive plate 52, as shown in FIG. 54 the angle intensity distribution in the light conductive plate 52 can be calculated from the Snell's law by cutting the light conductive plate 52 along a plane in parallel to the z-axis direction and substantially perpendicular to a direction of advancement of a light and measuring the angle intensity distribution of a light outgoing from the cut plane C-C.

Since both side surfaces 54b of such diffusion pattern 54 hide behind the reflection surface 54a as viewed from the light emission part 53, a light is hard to strike against the both side surfaces 54b even when molded sagging is generated on the side surfaces 54b of the diffusion pattern 54, so that it is possible to prevent a light from being scattered by the side surfaces 54b to make a loss light.

Figure 55:
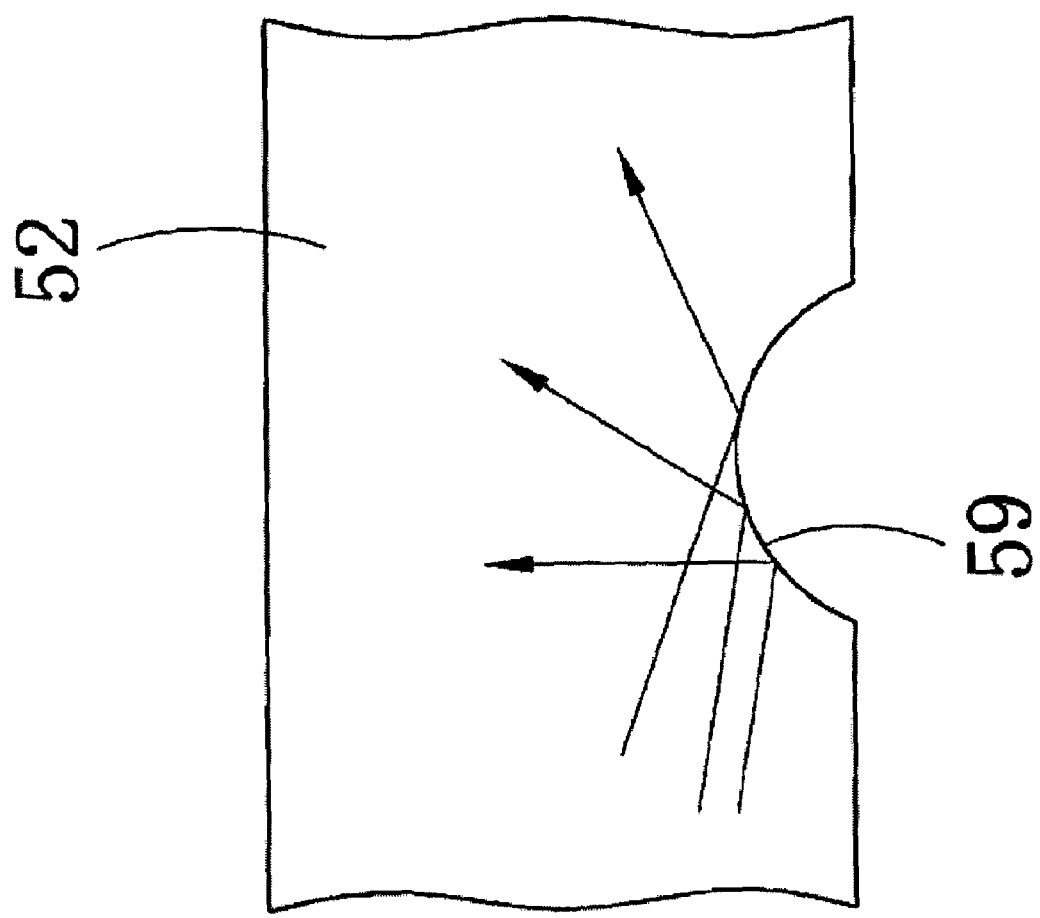
[FIG. 55]
Figure 56:
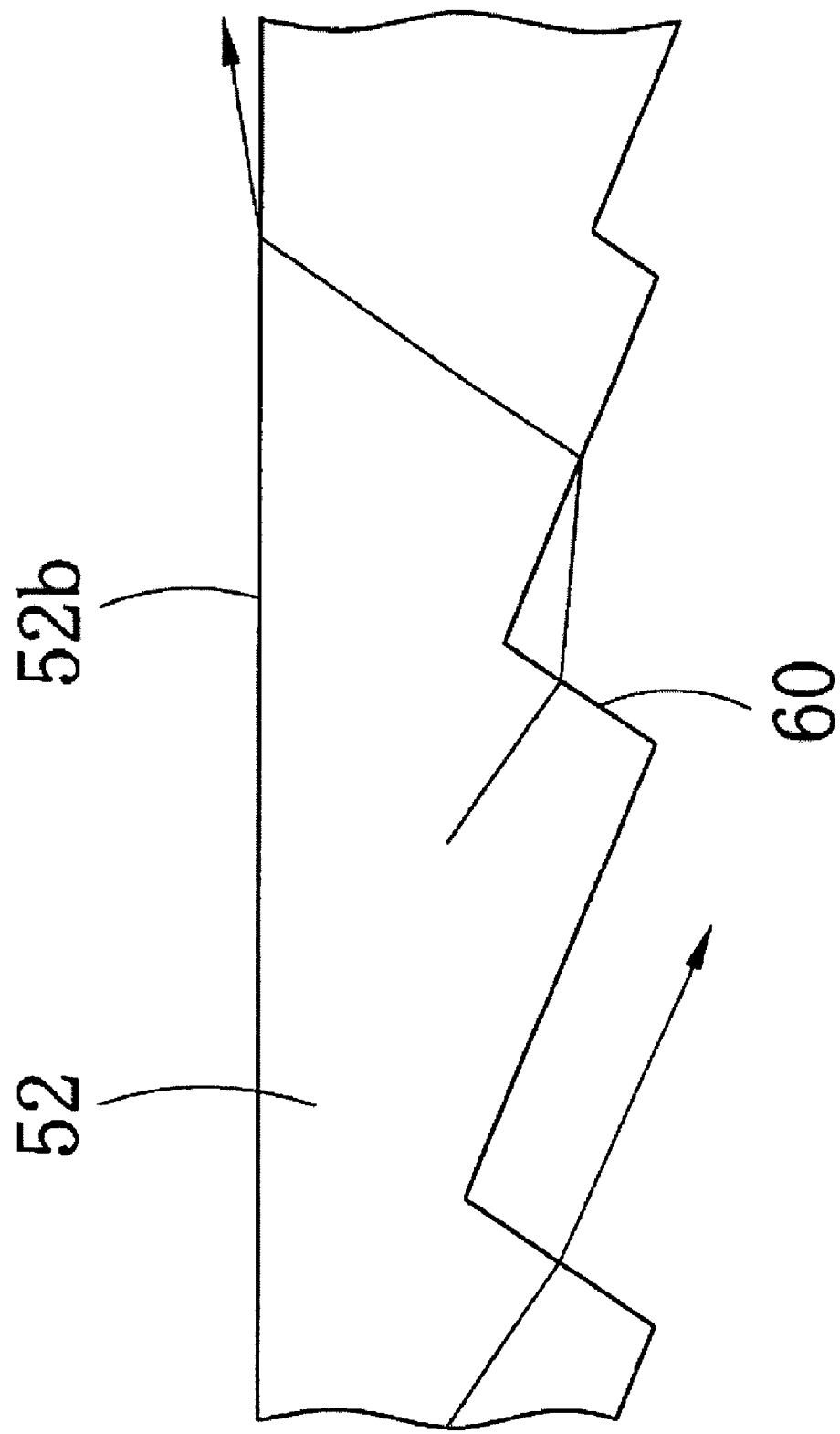
[FIG. 56]

Subsequently, an explanation will be given to a shape of individual diffusion patterns, a method of designing the same, or the like. In case of arranging the diffusion pattern 54 substantially perpendicular to a direction of advancement of a light in the light conductive plate 52, a pattern having a cross section in the form of a right-angled triangle is suited to the diffusion pattern 54 as described above. With a diffusion pattern 54 defined by a curved surface as shown in FIG. 55, a direction of deflection of a light L is different according to a position, in which the light L is reflected, and an outgoing light is increased in angular range. Accordingly, such pattern, of which a cross section perpendicular to a longitudinal direction is defined by a curved surface, is not desirable. Also, with a diffusion pattern 54 in the form of saw teeth as shown in FIG. 56, a light L transmitted through the diffusion pattern 54 does not outgo in a direction perpendicular to a light outgoing surface 52b and all the light outgoes in a useless direction. Accordingly, such diffusion pattern 54 in the form of saw teeth is also not preferable.

Figure 57:
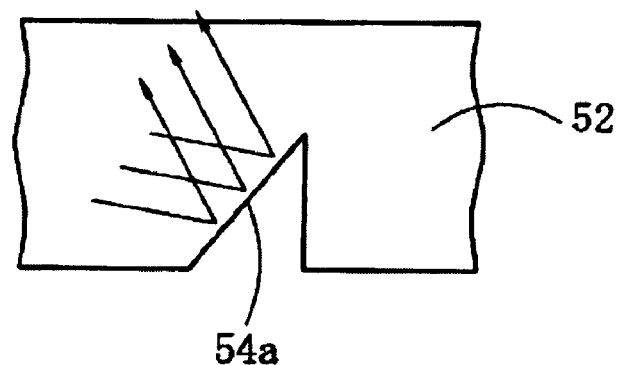
[FIG. 57]
Figure 57:
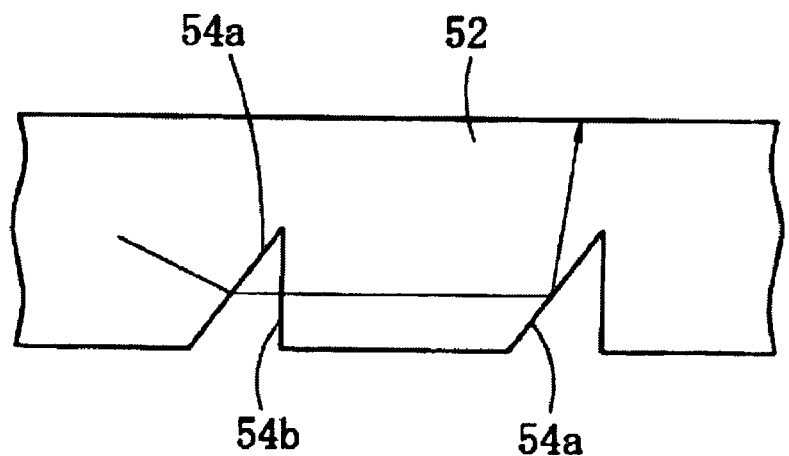

In contrast, with a diffusion pattern 54, of which a back surface 54c is perpendicular to a lower surface of a light conductive plate 52 and which has a cross section in the form of a right-angled triangle, a light L total-reflected by a reflection surface 54a as shown in FIG. 57(a) is reflected while being maintained in directivity even in the case where all the light L is reflected, and narrowed in directivity in the case where a part of the light transmits the diffusion pattern 54. Also, as shown in FIG. 57(b), a light L transmitted through the diffusion pattern 54 is again made incident from a back surface 54c without damage to directivity, and thereafter can be total-reflected by a further diffusion pattern 54. In addition, while the back surface 54c is desirably perpendicular to the lower surface of the light conductive plate 52, it is inclined a little since drawing of a mold become difficult at the time of molding.

With such diffusion pattern 54 having a cross section in the form of a right-angled triangle, however, a ratio of a light L striking perpendicularly against the diffusion pattern 54 is decreased and a light L striking obliquely against the diffusion pattern is increased in the case where a light L in the light conductive plate 52 is not aligned in direction (spread in the x-axis direction is large) as viewed from above. A light L striking obliquely against the diffusion pattern as viewed from above is increased in an angle of inclination upon the diffusion pattern 54 and a ratio of the light reflected is increased as compared with a light L, which strikes perpendicularly against the diffusion pattern 54. That is, an effect of being made incident upon the diffusion pattern 54 (an effect of narrowing the directivity without reduction in light efficiency) is decreased. Therefore, with a diffusion pattern 54 having a cross section in the form of a right-angled triangle, it is required that a direction of advancement of a light L be aligned in the light conductive plate 52 and the diffusion pattern 54 be arranged perpendicular to the direction of advancement in order to heighten the effect of the diffusion pattern 54. Alternatively, for the embodiment, it is prerequisite to narrow the directivity in the x-axis direction with the light emission part 53.

Figure 58:
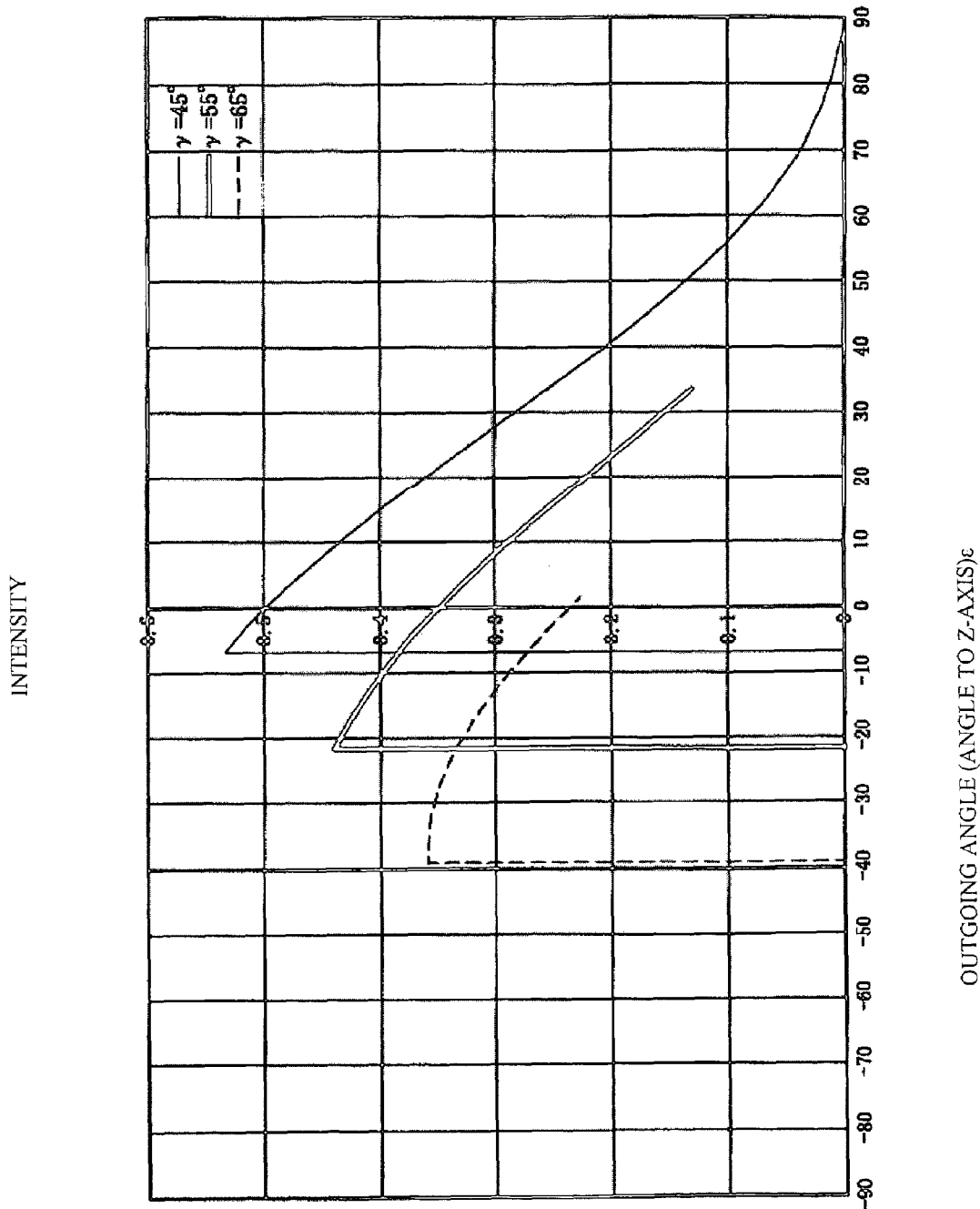
[FIG. 58]
Figure 59:
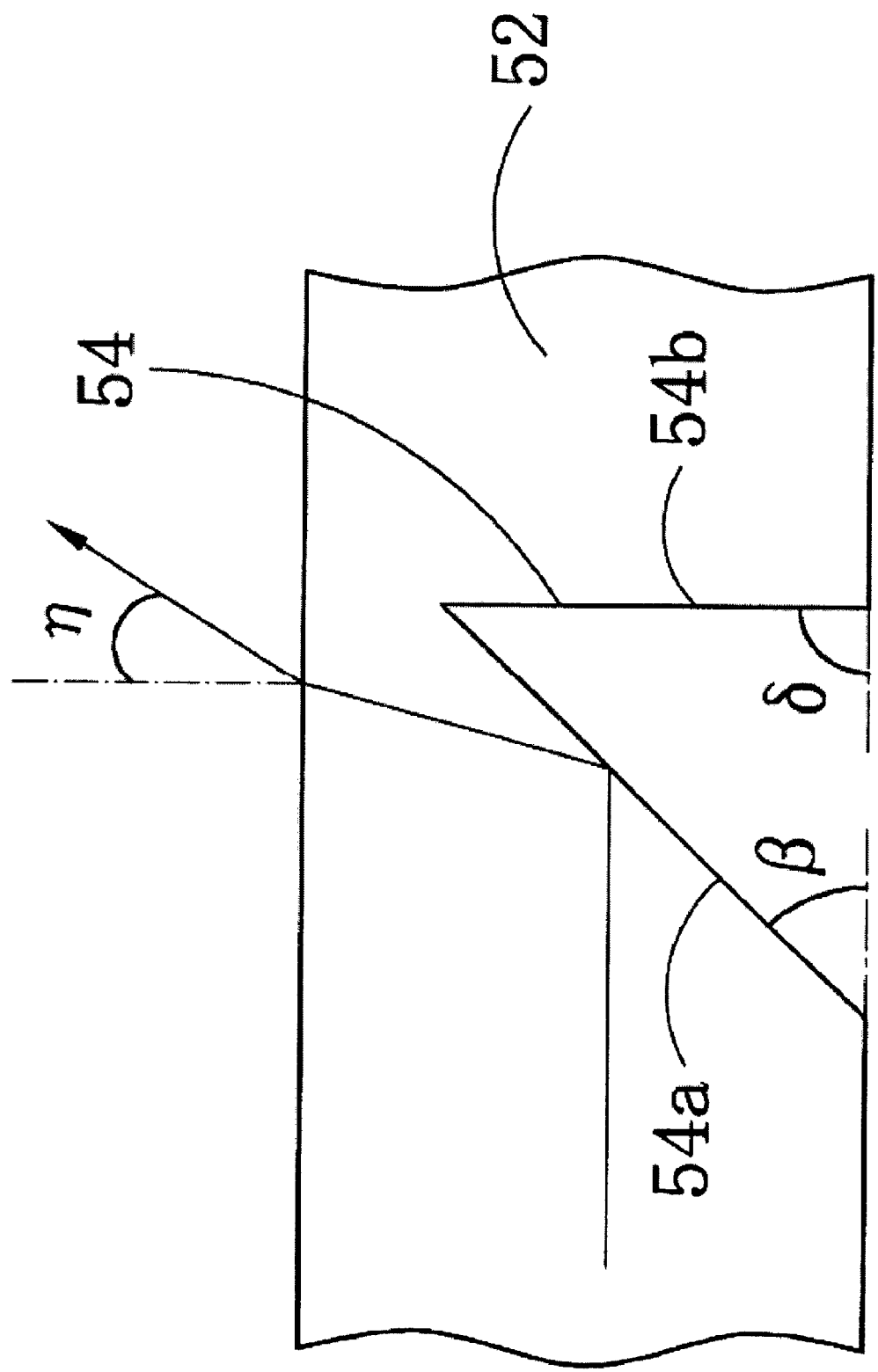
[FIG. 59]
Figure 60:
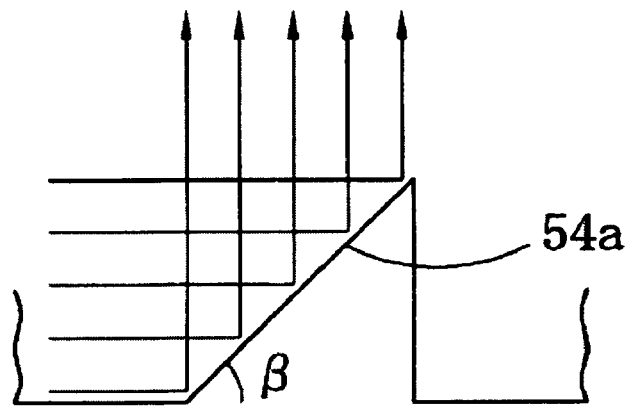
[FIG. 60]
Figure 60:
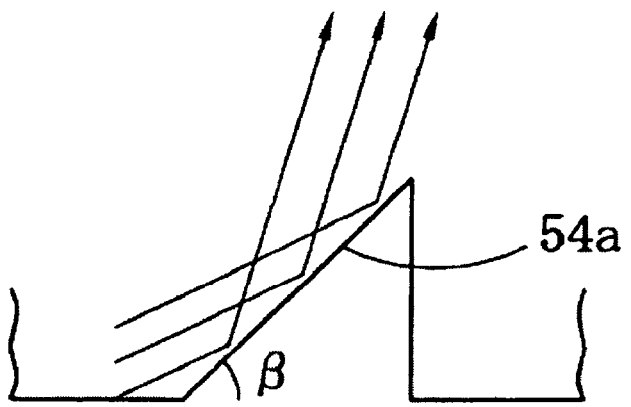

Let consider an angle $\beta$ of inclination of a reflection surface 54a of a diffusion pattern 54. FIG. 58 illustrates an angle distribution of an outgoing light intensity when an angle $\beta$ of inclination assumes 45°, 55°, and 65°, an abscissa represents an outgoing angle $\phi$ of an outgoing light shown in FIG. 59, and an ordinate represents an intensity of an outgoing light. In FIG. 58, the reason why a luminous intensity is large on a negative side of an outgoing angle $\phi$ is that a light L having a large outgoing angle $\phi$ includes less light L striking against a reflection surface 54a as shown in FIGS. 60(a) and 60(b). Alternatively, the reason is that as viewed in the y z plane, a light L substantially in parallel to the reflection surface 54a, out of a light L in a light conductive plate 52 becomes zero in intensity of an outgoing light (such light is not existent in many cases), and as being apart from such angle, that is, an outgoing angle $\phi$ decreases (increases on the negative side), an outgoing light is increased in intensity. Referring to FIG. 58, while an angular range of an outgoing light is a little small on a negative side of an outgoing angle $\phi$ in case of an angle $\beta$ of inclination $\beta$=55°, balance is kept on a negative side and a positive side of an outgoing angle $\phi$ since the intensity is large correspondingly.

Figure 61:
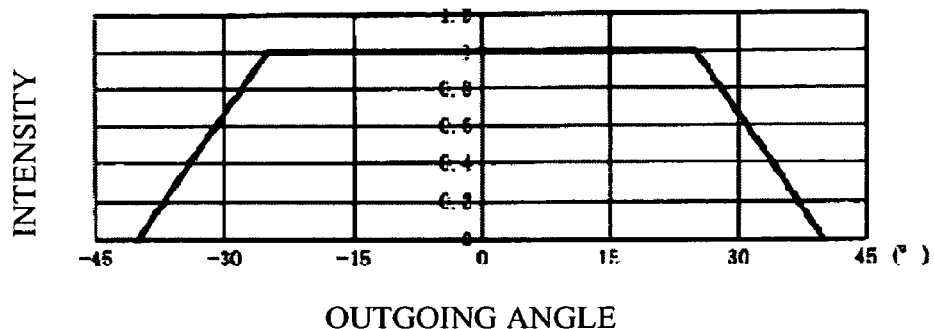
[FIG. 61]
Figure 61:
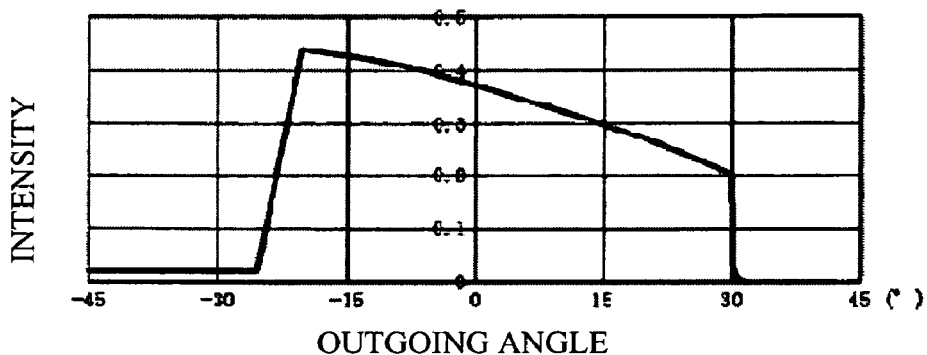
Figure 61:
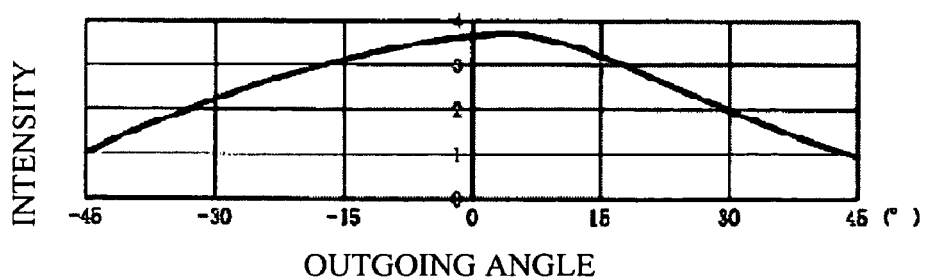

FIG. 61(a) illustrates a diffusion characteristic of a reflection type liquid-crystal display panel having a diffusion action of around 25°, FIG. 61(b) illustrates an outgoing light angle characteristic of a surface light source equipment having a diffusion pattern of an angle $\beta$ of inclination=55°, and FIG. 61(c) represents an outgoing light angle characteristic from a reflection type liquid-crystal display panel when a light of a surface light source equipment having a characteristic as shown in FIG. 61(b) is made incident upon a reflection type liquid-crystal display panel having a characteristic as shown in FIG. 61(a). As shown in the figures, when a light is caused to outgo to a reflection type liquid-crystal display panel having a diffusion action of around 25° from a surface light source equipment provided with a diffusion pattern 54 of an angle $\beta$ of inclination=55°, an outgoing light becomes maximum in an axial direction perpendicular to the liquid-crystal display panel and an optimum direction of emission is obtained. On the other hand, when an angle $\beta$ of inclination becomes outside the range of 45° to 65°, any light does not outgo in a direction (the z-axis direction) perpendicular to a light outgoing surface 52b, so that a prism sheet or the like is needed. Accordingly, a magnitude of an angle $\beta$ of inclination of a reflection surface 54a of a diffusion pattern 54 is preferably in the range of 45° to 65°.

Figure 62:
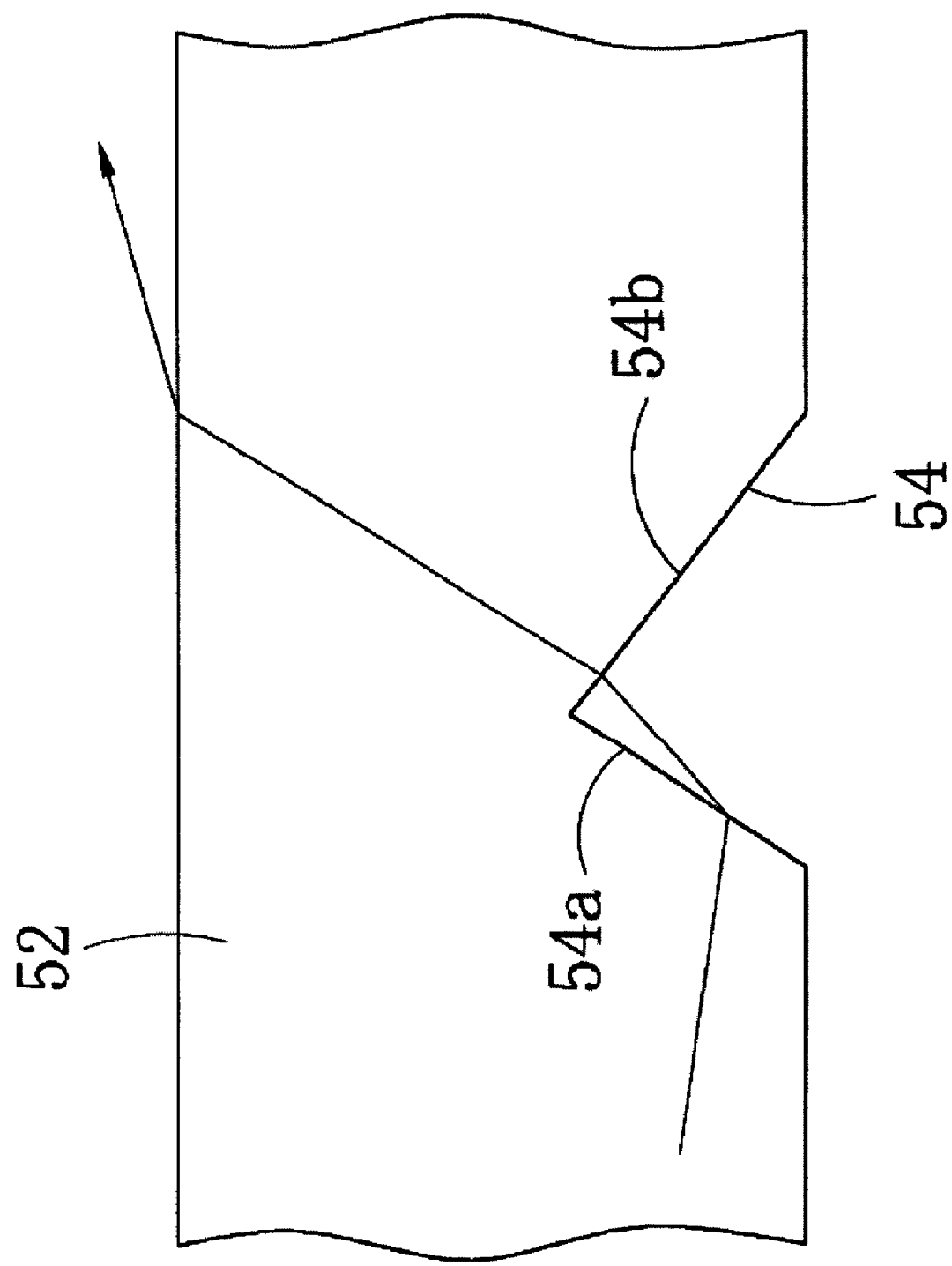
[FIG. 62]

Subsequently, let consider an angle $\rho$ of a back surface 54c of a diffusion pattern 54. As shown in the FIG. 62, when an angle $\rho$ of the back surface 54c is too small, the diffusion pattern 54 becomes saw-tooth shaped, so that a light transmitted through a reflection surface 54a of the diffusion pattern 54 and again made incident from the back surface 54c is made incident upon a light outgoing surface 52b before striking against the diffusion pattern 54 disposed rearward and outgoes along the light outgoing surface 52b to make a loss. Therefore, an angle $\rho$ of the back surface 54c is preferably large and preferably larger than at least an angle $\beta$ of inclination of the reflection surface 54a ($\beta<\rho$).

Figure 63:
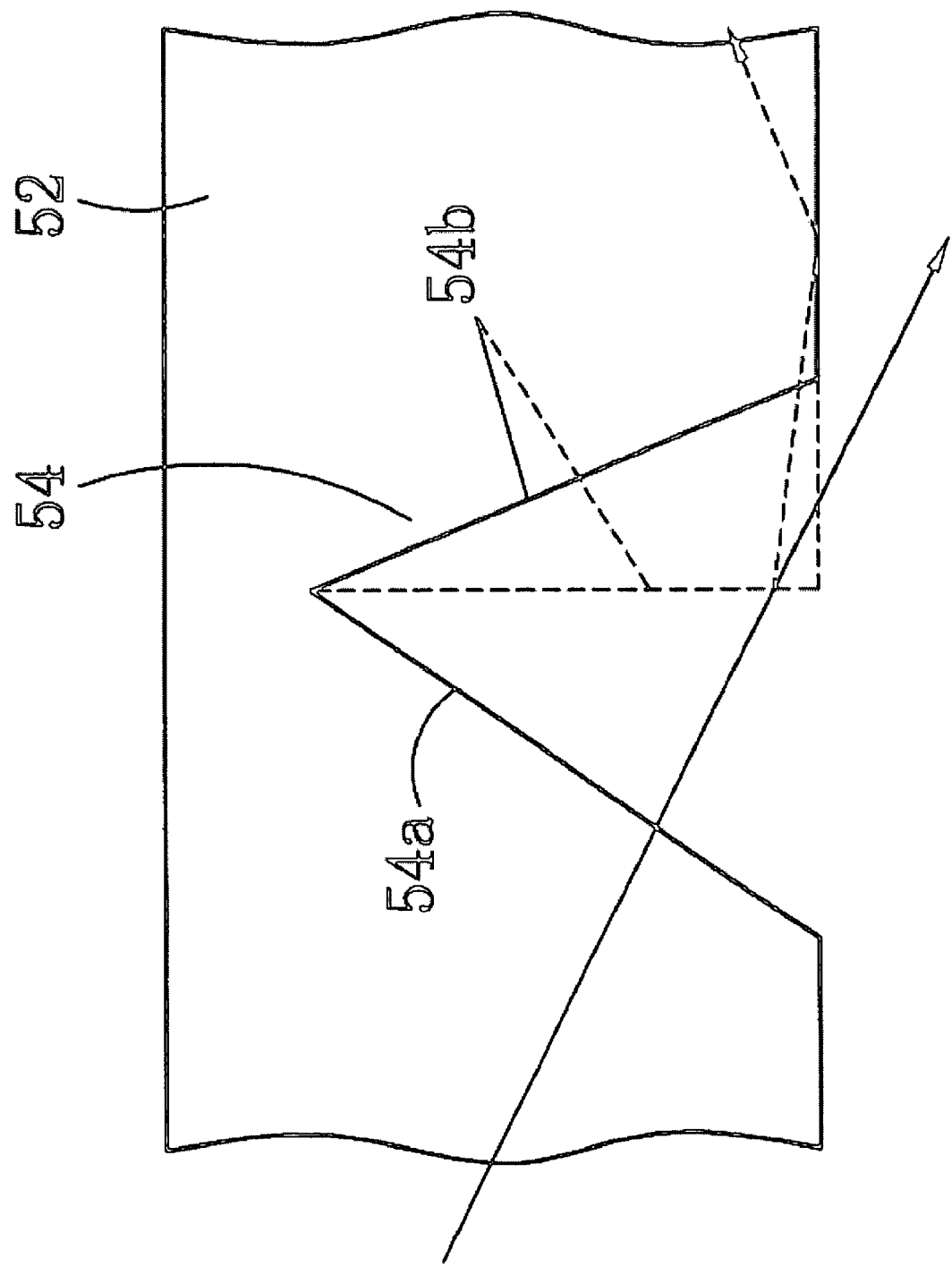
[FIG. 63]

Also, as shown in FIG. 63, when an angle ρ of the back surface 54c is small, a light transmitted through the reflection surface 54a becomes liable to leak from a light conductive plate 52 while as an angle ρ of the back surface 54c approaches 90° as indicated by broken lines in FIG. 63, a ratio of a light again made incident from the back surface 54c is increased. On the other hand, when an angle ρ exceeds 90°, the light conductive plate 52 cannot be molded. Therefore, an angle ρ of the back surface 54c is preferably in the range of 80° to 90° as a criterion and further desirably 85° to 90°.

Figure 64:
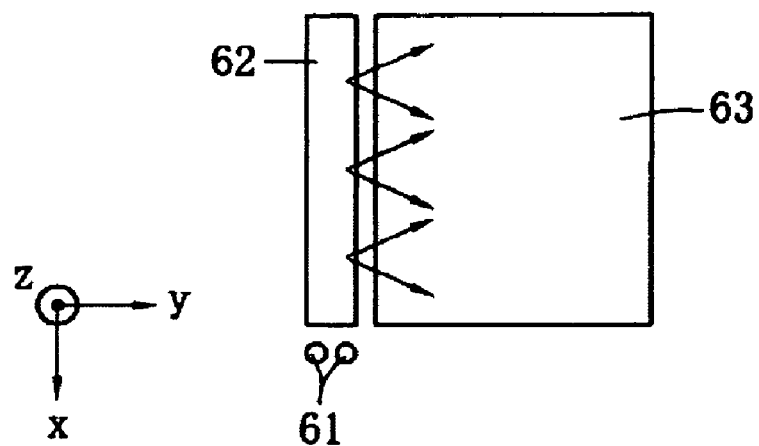
[FIG. 64]
Figure 64:
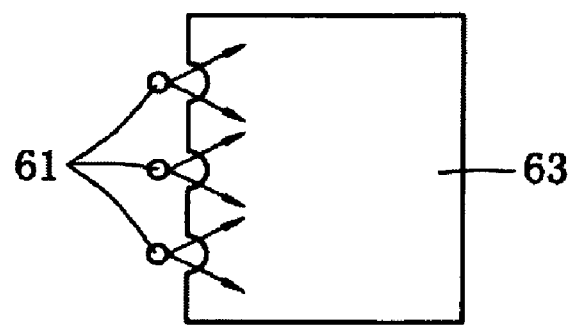
Figure 64:
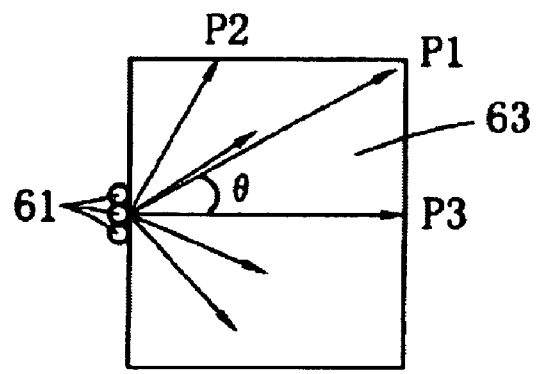

In addition, FIGS. 64(a), 64(b), and 64(c) show a construction of a conventional light emission part. There are three constructions of the light emission part, that is, (i) one, in which a point light source 27 such as LED is converted into a linear light source by a light conductive body 28, etc. and a light L of the point light source 27 is spread in a surface manner as shown in FIG. 64(a), (ii) point light sources 27 are arranged at equal intervals to make a linear light source in simulation and its light L is spread in a surface manner as shown in FIG. 64(b), and (iii) a light L outgoing from a point light source 27 is directly spread in a surface manner as shown in FIG. 64(c).

An improvement in directivity at respective points on a light conductive plate 22 as viewed from above the light conductive plate 22 can be realized relatively simply with the construction (iii). In this case, however, there is caused a problem that a light L leaking from a side of the light conductive plate 22 in locations P2, P3 in FIG. 64(c) is increased in quantity and an increase in efficiency is hard to attain. Also, while a necessary quantity of light is very large at a corner P1 of the light conductive plate 22 as compared with the locations P2, P3, it is actually difficult to increase a quantity of a light led in a direction toward P1 as compared with the locations P2, P3. Therefore, by increasing a quantity of a light leaking at the locations P2, P3, it is actually compelled to conform brightness of P2, P3 to brightness at the location P1 to uniformize brightness, so that a quantity of a light leaking at the locations P2, P3 is increased to lead to reduction in efficiency.

In contrast, with the constructions (i) and (ii), attention is paid only to uniformization of brightness in a surface but it has not been taken into consideration to increase the directivity of a light outgoing from the light conductive plate 22. In particular, any one of (i), (ii), and (iii) does not disclose that a light outgoing from the light conductive plate 22 is made uniform in brightness in the range of ±10° to 30°, which is peculiar to the invention.

Figure 65:
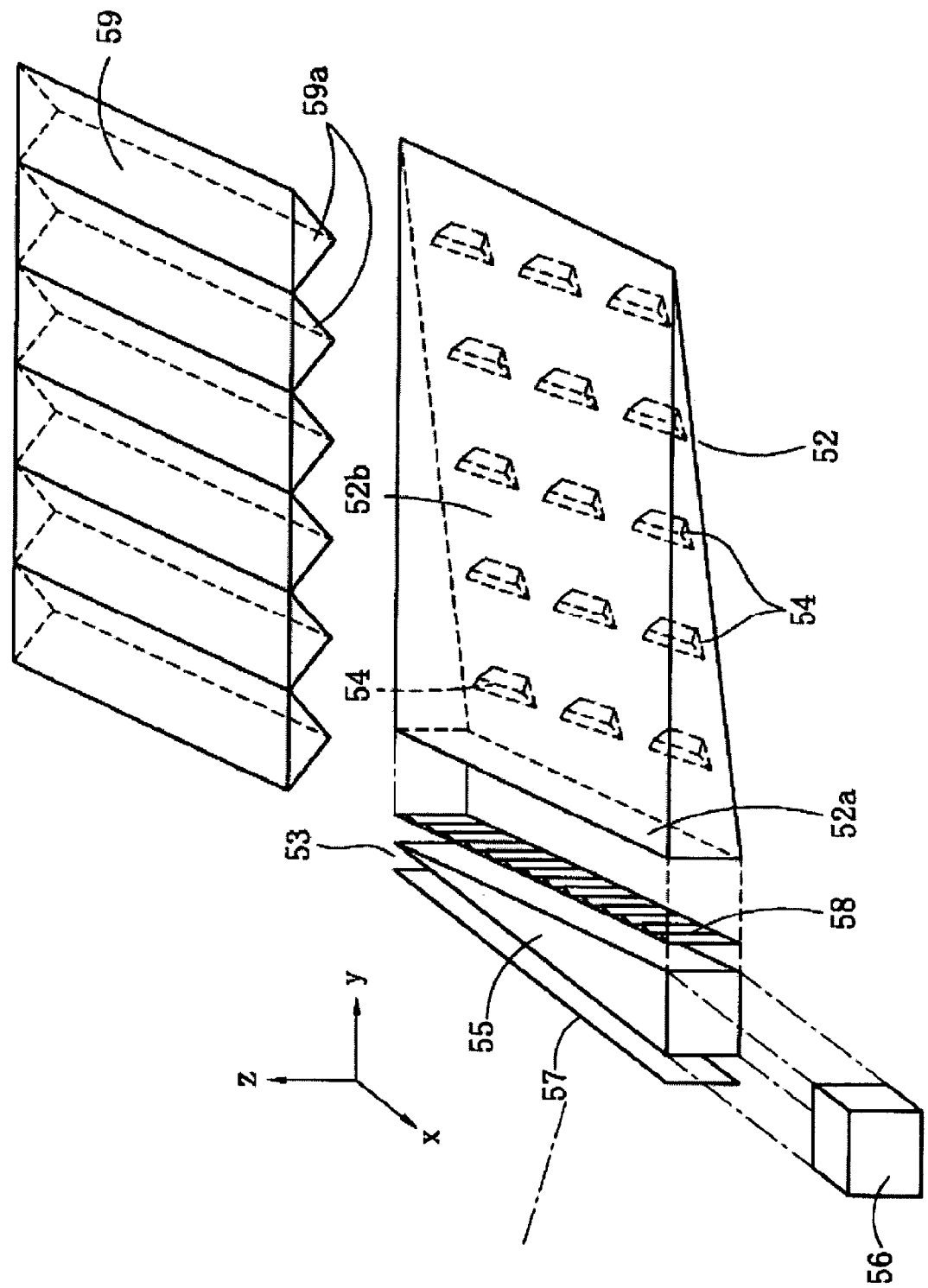
[FIG. 65]

FIG. 65 shows a modification of Embodiment 2, in which a lower surface of a light conductive plate 52 is inclined to make the light conductive plate 52 wedge-shaped, large in thickness on a side close to a light emission part 53 and small in thickness on a side distant from the light emission part 53, and a diffusion pattern 54 provided on the lower surface of the light conductive plate 52 is shaped such that a reflection surface 54a becomes substantially trapezoidal in shape. Also, arranged in a position opposed to a light outgoing surface 52b of the light conductive plate 52 is a prism sheet 59, on which prisms 59a extending in a x-direction and being triangular-shaped in cross section are arranged. Thus, a light entering the light conductive plate 52 from the light emission part 53 is propagated in the light conductive plate 52 while being reflected by upper and lower surfaces of the light conductive plate 52, and a light reflected by the lower surface (inclined surface) of the light conductive plate 52 or the diffusion pattern 54 and outgoing from the light outgoing surface 52b outgoes in a vertical direction by the prism sheet 59.

Embodiment 3

Figure 66:
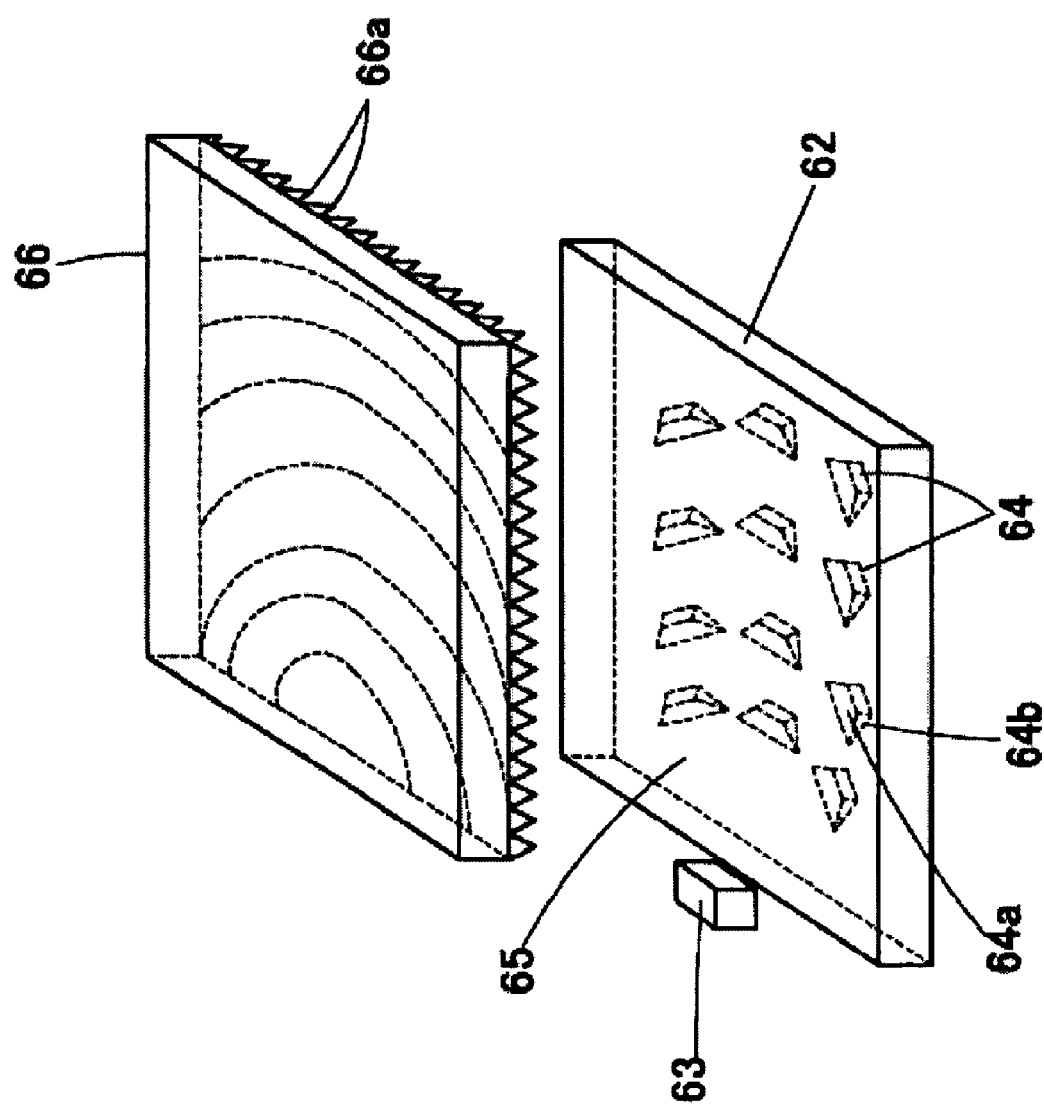
[FIG. 66]

FIG. 66 is a perspective view showing a surface light source equipment 61 according to Embodiment 3 of the invention. With the surface light source equipment 61, a light emission part 63 is arranged to face a center of a side of a light conductive plate 62, and diffusion patterns 64 are arranged on a lower surface of the light conductive plate 62 to be centered concentrically on the light emission part 63. A reflection surface 64a of each of the diffusion patterns 64 is formed to be trapezoidal in shape, so that a light is hard to be made incident upon side surfaces 64b of the diffusion patterns 64. Also, a prism sheet 66 is arranged in a position opposed to a light outgoing surface 65 of the light conductive plate 62. Arcuately extending prisms 66a are formed concentrically on a lower surface of the prism sheet 66.

Figure 67:
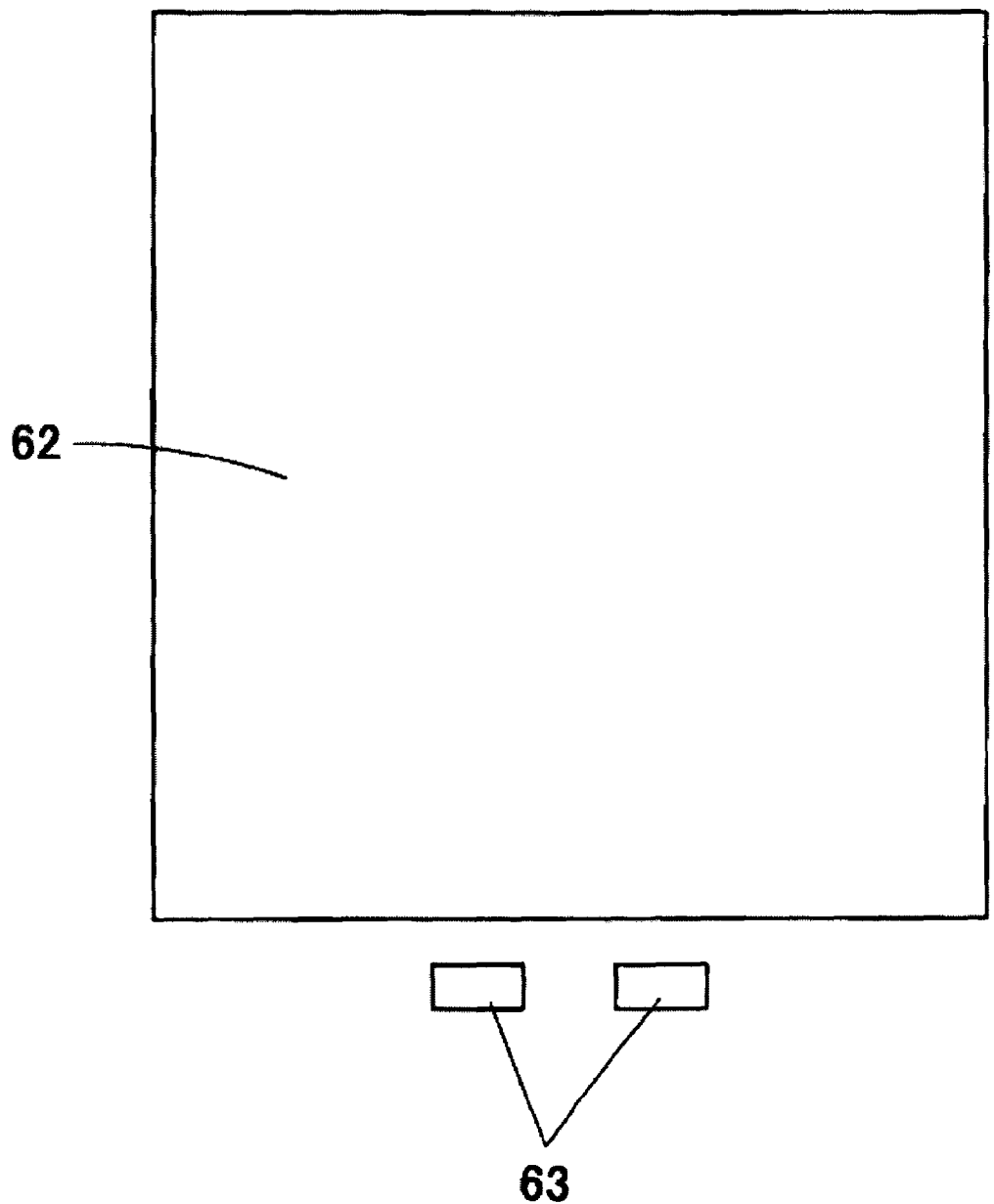
[FIG. 67]

In addition, also in this case, it is not required that the light emission part 63 be single, and a plurality of light emission parts 63 may be arranged adjacent to one another as shown in FIG. 67.

Embodiment 4

Figure 68:
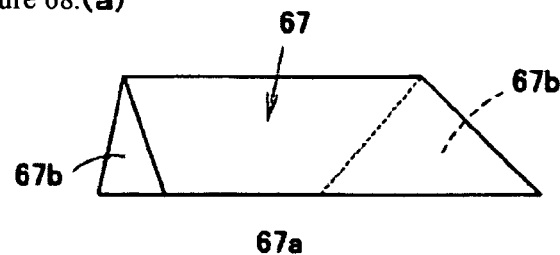
[FIG. 68]
Figure 68:
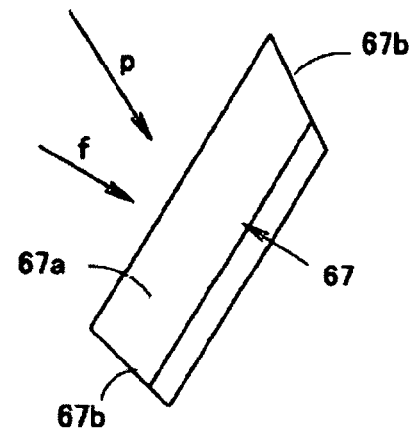
Figure 68:
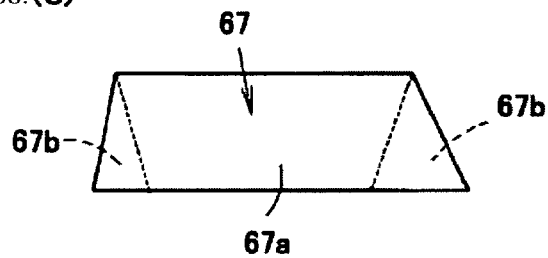

FIGS. 68(a) and 68(b) are a front view and a plan view showing a further configuration of a diffusion pattern. The front view of FIG. 68(a) is a front of a reflection surface 67a of a diffusion pattern 67, that is, a view as viewed from a direction indicated by an arrow f in FIG. 68(b). With the diffusion pattern 67, while a length (a width of the reflection surface 67a) of a side distant from a light source of the reflection surface 67a is shorter than a length (a width of the reflection surface 67a) of a side close to the light source of the reflection surface 67a, one side surface 67b of the diffusion pattern 67 is exposed in a state of being viewed from the front side.

With the diffusion pattern 67, however, a light L is made incident obliquely upon the diffusion pattern 67 as shown in FIG. 68(b), and the side surfaces 67b of the diffusion pattern 67 hides behind the reflection surface 67a as shown in FIG. 68(c) in a state of being viewed in a direction (a direction toward a light source), so that a light L is made not incident obliquely upon the side surfaces 67b of the diffusion pattern 67. Therefore, even in the case where molded sagging is generated on the side surfaces 67b, it is possible to inhibit scatter of a light L due to the side surfaces 67b of the diffusion pattern 67.

Surface light source equipments, in which a light is made incident obliquely upon diffusion patterns, include a front light disclosed in Japanese Patent Application No. 2003-138023 and Japanese Patent Application No. 2003-347514, which were filed by the applicant of the present application.

Subsequently, an explanation will be given to applications of the invention.

(Liquid-Crystal Display)

Figure 69:
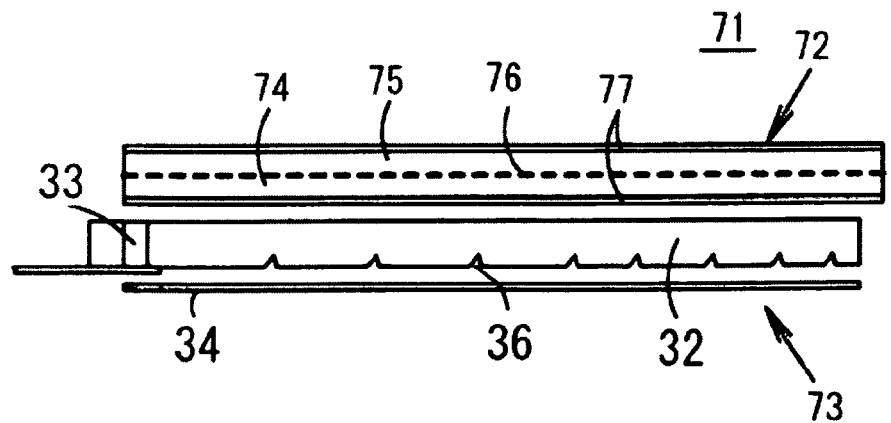
[FIG. 69]

FIG. 69 is a schematic cross sectional view showing a liquid-crystal display 71 according to the invention. With the liquid-crystal display 71, a surface light source equipment 73 according to the invention is arranged on a back surface of a liquid-crystal display panel 72. The liquid-crystal display panel 72 comprises a liquid-crystal layer 76 interposed and sealed between a back surface side substrate 74, on which switching elements, such as TFT (thin film transistor) and wiring are formed, and a front surface side substrate 75, on which a transparent electrode and a color filter are formed, and polarizing plates 77 overlapped on both front and back surfaces. With the liquid-crystal display 71, the surface light source equipment 73 is lighted to irradiate the liquid-crystal display panel 72 from a back surface side to ON and OFF control respective pixels of the liquid-crystal display panel 72, thus generating a picture.

In addition, since a surface light source equipment according to the invention can be applied to a front light, it can also be used for a reflection type liquid-crystal display although not shown.

(Application)

Figure 70:
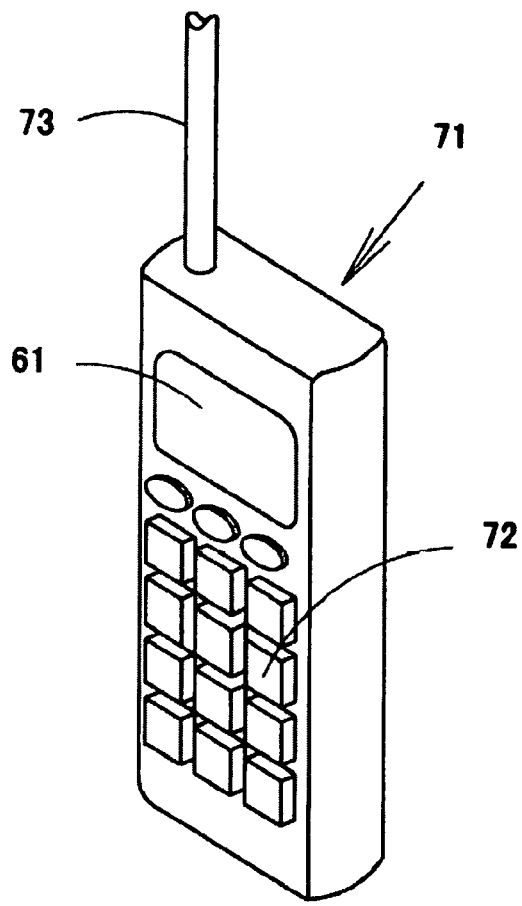
[FIG. 70]

FIG. 70 shows a portable telephone 81, into which the liquid-crystal display 71 according to the invention is assembled. With the portable telephone 81, the liquid-crystal display 71 is assembled as a display onto a dial part 82 provided with ten keys, etc., and an antenna 83 is provided on an upper surface thereof.

Figure 71:
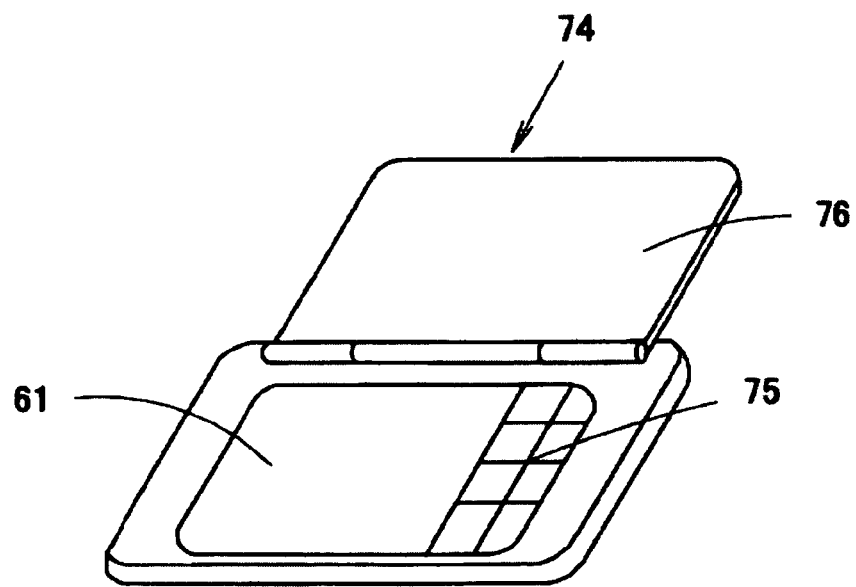
[FIG. 71]

FIG. 71 shows a portable information terminal 84, such as PDA into which the liquid-crystal display 71 according to the invention is assembled as a display. The portable information terminal 84 comprises an input unit 85 for pen input, etc., provided laterally of the liquid-crystal display 71, and a lid 86 pivotally mounted to an upper end thereof.

By using the liquid-crystal display 71 of the invention for the portable telephone 81, the portable information terminal 84, etc. in this manner, a loss light is reduced to enable improving a screen in brightness and uniformizing brightness, and visibility of a screen is improved.

INDUSTRIAL APPLICABILITY

The surface light source equipment according to the invention is usable as a back light and a front light for liquid-crystal display panels, etc., or illuminating lamp, etc.

The invention claimed is:

1. A surface light source equipment comprising:
a point light source; and
a light conductive plate having a light outgoing surface from which a light introduced from the light source outgoes, the light conductive plate being configured so that the outgoing light is spread across substantially the entire surface of the light outgoing surface, and a plurality of patterns for reflection of a light conducted in the light conductive plate is formed on an opposite surface to the light outgoing surface of the light conductive plate, wherein
the respective patterns are structured such that, as viewed from a direction perpendicular to the light outgoing surface, a light is incident from a substantially fixed direction determined for every pattern, and
each of the patterns has an inclined surface on a light incident side, the inclined surface characterized in that, as viewed from the direction perpendicular to the light outgoing surface, the inclined surface is trapezoidal in shape, and an edge of the inclined surface positioned farther from the light source has a smaller width than an edge positioned closer to the light source, and the inclined surface substantially wholly shields both side surfaces of the pattern as viewed from a direction of light incidence.

2. The surface light source equipment according to claim 1, wherein
a prism sheet is arranged on an observation side of the light conductive plate, and
after a light conducted in the light conductive plate and deflected by the pattern outgoes from the light outgoing surface in a direction inclined relative to a normal line to the light outgoing surface of the light conductive plate, the light is deflected by the prism sheet.

3. An image display unit comprising:
an image display panel; and
the surface light source equipment according to claim 2, arranged on an observation side of the image display panel, or an opposite side thereto.

4. A portable information terminal comprising the surface light source equipment according to claim 2.

5. An image display unit comprising: an image display panel; and the surface light source equipment according to claim 1, arranged on an observation side of the image display panel, or an opposite side thereto.

6. A portable information terminal comprising the surface light source equipment according to claim 1.

* * * * *

UNITED STATES PATENT AND TRADEMARK OFFICE
CERTIFICATE OF CORRECTION

| | | |
|---|---|---|
| PATENT NO. | : 7,507,011 B2 | Page 1 of 1 |
| APPLICATION NO. | : 11/431943 | |
| DATED | : March 24, 2009 | |
| INVENTOR(S) | : Yoshihiro Ueno et al. | |

It is certified that error appears in the above-identified patent and that said Letters Patent is hereby corrected as shown below:

On the title page,

{*} Notice    Subject to any disclaimer, the term of this patent is extended or adjusted under 35 USC 154(b) "by 155 days"

Delete the phrase "by 155 days" and insert --by 215 days--.

Signed and Sealed this

Sixteenth Day of March, 2010

David J. Kappos
*Director of the United States Patent and Trademark Office*